(12) United States Patent
Kitagawa et al.

(10) Patent No.: US 10,853,727 B2
(45) Date of Patent: Dec. 1, 2020

(54) MACHINE LEARNING SYSTEM

(71) Applicant: TOYOTA JIDOSHA KABUSHIKI KAISHA, Aichi (JP)

(72) Inventors: Eiki Kitagawa, Susono (JP); Masato Ehara, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/486,836

(22) PCT Filed: Feb. 5, 2019

(86) PCT No.: PCT/JP2019/004080
§ 371 (c)(1),
(2) Date: Aug. 19, 2019

(87) PCT Pub. No.: WO2019/151536
PCT Pub. Date: Aug. 8, 2019

(65) Prior Publication Data
US 2020/0234136 A1 Jul. 23, 2020

(30) Foreign Application Priority Data

Feb. 5, 2018 (JP) .................................. 2018-018425
Nov. 19, 2018 (JP) .................................. 2018-216766
Nov. 19, 2018 (JP) .................................. 2018-216850

(51) Int. Cl.
*G06N 3/08* (2006.01)
*G06N 20/00* (2019.01)
(Continued)

(52) U.S. Cl.
CPC ......... *G06N 3/084* (2013.01); *F02D 41/1405* (2013.01); *G05B 13/024* (2013.01);
(Continued)

(58) Field of Classification Search
CPC ............ G06N 3/02; G06N 3/08; G06N 3/084; G06N 20/00; G06N 3/082; G06N 3/0481;
(Continued)

(56) References Cited

U.S. PATENT DOCUMENTS 5,033,006 A 7/1991 Ishizuka et al.
5,093,899 A 3/1992 Hiraiwa
(Continued)

FOREIGN PATENT DOCUMENTS

JP H2-83656 A 3/1990
JP H2-238560 A 9/1990
(Continued)

*Primary Examiner* — Shane D Woolwine
(74) *Attorney, Agent, or Firm* — Hauptman Ham, LLP

(57) ABSTRACT

A machine learning system using a neural network to output an output value corresponding to values of operating parameters of the machine. When the value of an operating parameter of a machine is outside a preset range, the number of nodes of the hidden layer one layer before the output layer of the neural network is increased and training data obtained by actual measurement for a newly acquired value of an operating parameter of the machine is used to learn the weights of the neural network so that the difference between the output value changing in accordance with the values of the operating parameters of the machine and training data corresponding to the values of the operating parameters of the machine becomes smaller.

8 Claims, 28 Drawing Sheets

(51) Int. Cl.
*G05B 13/02* (2006.01)
*G06N 3/02* (2006.01)
*G05B 23/02* (2006.01)
*G06N 3/04* (2006.01)
*G05B 11/36* (2006.01)
*F02D 41/14* (2006.01)

(52) U.S. Cl.
CPC ....... *G05B 13/027* (2013.01); *G05B 23/0254* (2013.01); *G06N 3/02* (2013.01); *G06N 3/08* (2013.01); *G06N 3/082* (2013.01); *G06N 20/00* (2019.01); *F02D 41/1459* (2013.01); *F02D 41/1461* (2013.01); *F02D 2200/0414* (2013.01); *F02D 2200/101* (2013.01); *F02D 2200/1004* (2013.01); *G05B 11/36* (2013.01); *G06N 3/0481* (2013.01)

(58) Field of Classification Search
CPC ................ G05B 13/024; G05B 13/027; G05B 23/0254; G05B 11/36; F02D 41/1459; F02D 41/1461; F02D 41/1405; F02D 2200/1004; F02D 2200/101; F02D 2200/0414

USPC .......................................................... 706/25
See application file for complete search history.

(56) References Cited

U.S. PATENT DOCUMENTS

| | | | |
|---|---|---|---|
| 5,331,550 A * | 7/1994 | Stafford | ............... G06K 9/3233 |
| | | | 382/128 |
| 6,098,012 A | 8/2000 | Stander et al. | |
| 6,269,351 B1 | 7/2001 | Black | |
| 7,483,868 B2 | 1/2009 | Meng et al. | |
| 2007/0185825 A1 | 8/2007 | Ito et al. | |
| 2010/0050025 A1* | 2/2010 | Grichnik | ............... G05B 17/02 |
| | | | 714/47.2 |
| 2015/0371149 A1 | 12/2015 | Iso | |
| 2019/0073580 A1* | 3/2019 | Dzhulgakov | ........ G06N 3/0454 |
| 2019/0242318 A1 | 8/2019 | Kitagawa et al. | |

FOREIGN PATENT DOCUMENTS

| | | |
|---|---|---|
| JP | H11-82137 A | 3/1999 |
| JP | 2007-299366 A | 11/2007 |
| JP | 2012-112277 A | 6/2012 |
| JP | 2016-4547 A | 1/2016 |

\* cited by examiner

L=1    L=2    L=3

FIG. 11
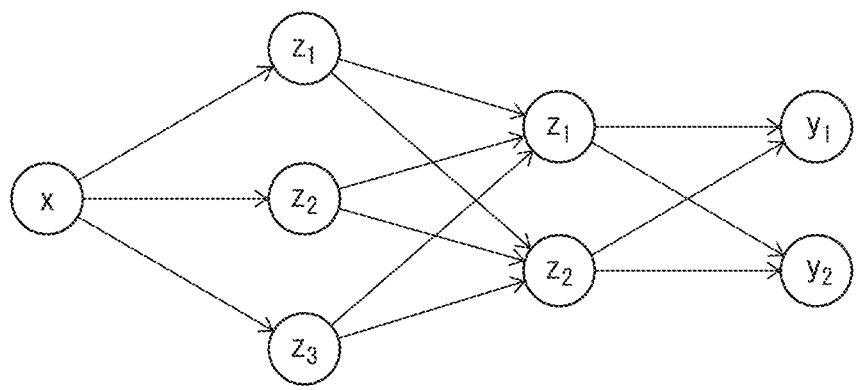
L=1    L=2    L=3    L=4
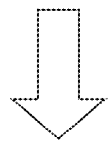
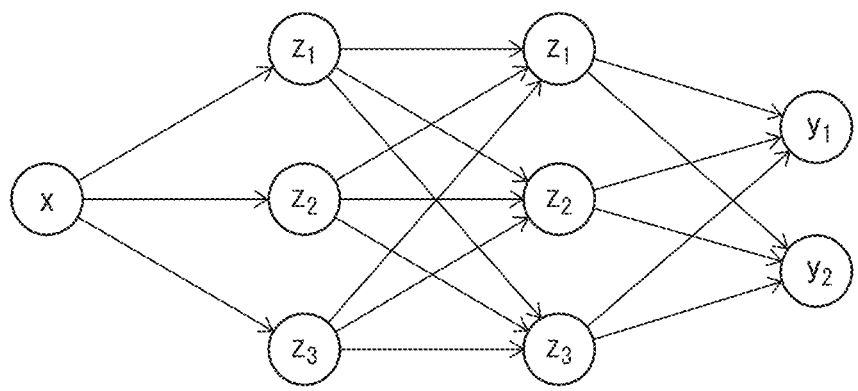
L=1    L=2    L=3    L=4

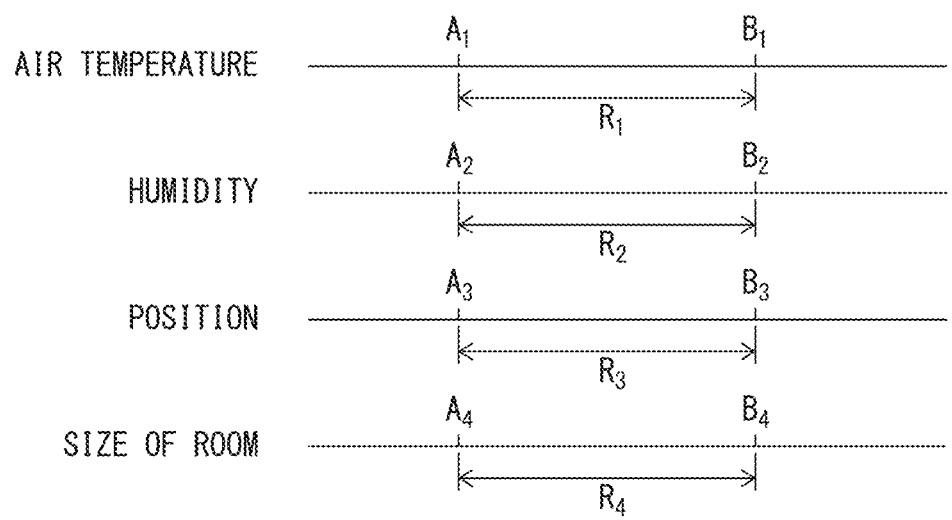
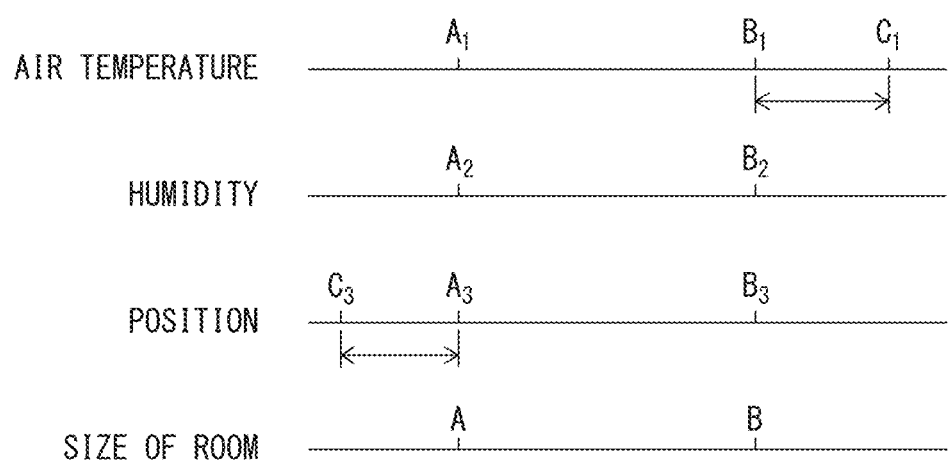

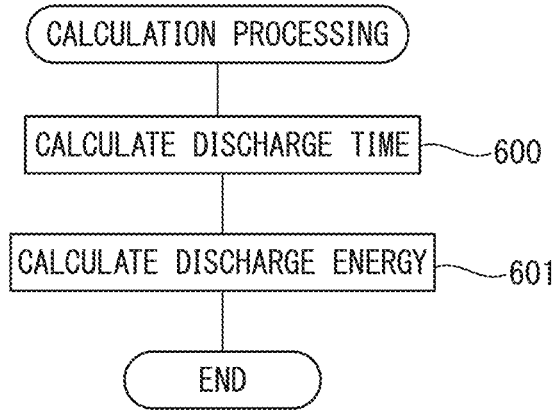
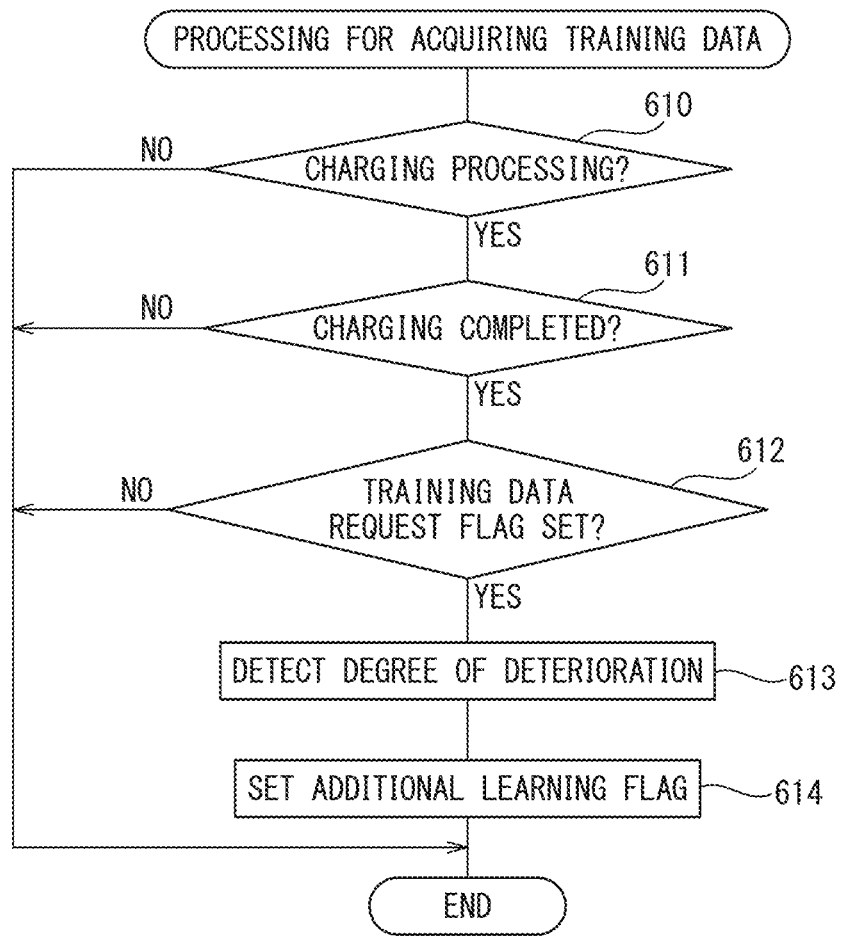

FIG. 32
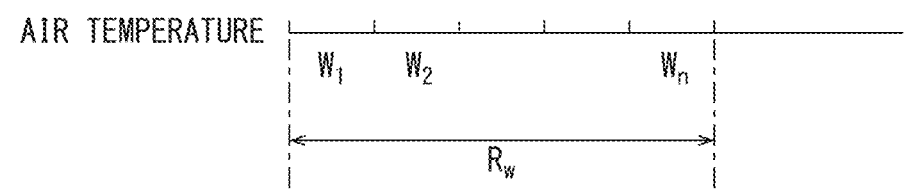
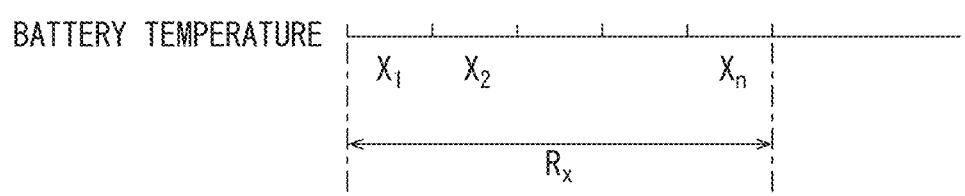
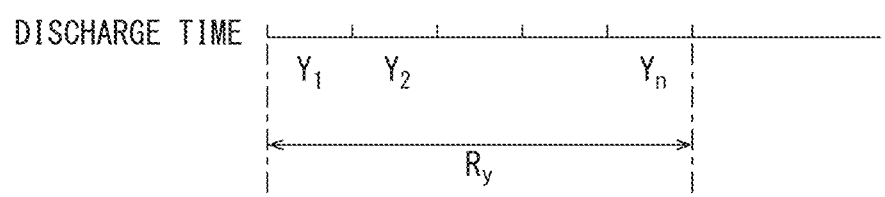
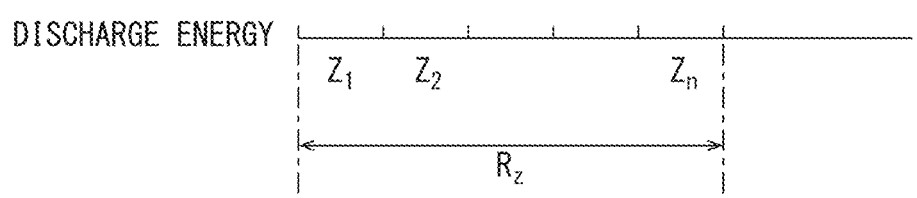

MACHINE LEARNING SYSTEM

RELATED APPLICATIONS

The present application is a National Phase of International Application No. PCT/JP2019/004080, filed Feb. 5, 2019, and claims priority based on Japanese Patent Application No. 2018-018425, filed Feb. 5, 2018, Japanese Patent Application No. 2018-216766, filed Nov. 19, 2018, and Japanese Patent Application No. 2018-216850, filed Nov. 19, 2018.

FIELD

The present invention relates to a machine learning system.

BACKGROUND

In control devices of internal combustion engines using neural networks, there is known a control device of an internal combustion engine designed to learn in advance the weights of a neural network so that an amount of gas sucked into combustion chambers matches an actual amount of gas sucked into the combustion chambers based on values of an engine speed, amount of intake air, and other operating parameters of the engine and to use the neural network with the learned weights at the time of engine operation so as to estimate the amount of gas sucked into the combustion chambers from the values of the operating parameters of the engine (for example, see PTL 1).

CITATION LIST

Patent Literature

PTL 1: Japanese Unexamined Patent Publication No. 2012-112277

SUMMARY

Technical Problem

In this regard, a range of use of a value of a specific type of operating parameter relating to an internal combustion engine such as an engine speed can be estimated in advance according to the type of engine. Therefore, normally, the weights of the neural network are learned in advance so that, for the estimated range of use of the value of the operating parameter of the engine, the difference between the output value of the neural network and the actual value such as the actual amount of gas sucked into the combustion chambers becomes smaller. However, in actuality, the value of an operating parameter of an engine sometimes is outside the estimated range of use. In this case, since learning based on the actual value is not performed outside of the estimated range of use, there is the problem that the output value calculated using the neural network ends up greatly deviating from the actual value. Such a problem is not limited to the field of internal combustion engines and arises in various fields of machines in which machine learning is performed.

To solve this problem, according to a first aspect of the invention, there is provided a machine learning system using a neural network to output an output value corresponding to a value of an operating parameter of a machine, wherein a range of a value of a specific type of operating parameter relating to the machine is set in advance, numbers of nodes of hidden layers of the neural network are set in advance corresponding to the range of the value of the specific type of operating parameter relating to the machine, when a newly acquired value of the specific type of operating parameter relating to the machine is outside a preset range, the number of nodes of the hidden layer one layer before the output layer of the neural network is made to increase, training data obtained by actual measurement for the newly acquired value of the specific type of operating parameter relating to the machine and training data obtained by actual measurement for the value of the operating parameter of the machine in the preset range are used to learn weights of the neural network, and an output value corresponding to the value of the specific type of operating parameter relating to the machine is output by using the neural network with the learned weights.

To solve the above problem, according to a second aspect of the invention, there is provided a machine learning system using a neural network to output an output value corresponding to values of operating parameters of a machine, wherein ranges of values of a plurality of types of operating parameters relating to the machine are set in advance, numbers of nodes of hidden layers of the neural network are set in advance corresponding to the ranges of values of the plurality of types of operating parameters relating to the machine, when newly acquired values of the plurality of types of operating parameters relating to the machine are outside the preset ranges, the number of nodes of the hidden layer one layer before the output layer of the neural network is made to increase, training data obtained by actual measurement for the newly acquired values of the plurality of types of operating parameters relating to the machine and training data obtained by actual measurement for the values of the operating parameters of the machine in the preset ranges are used to learn weights of the neural network, and an output value corresponding to the values of the plurality of types of operating parameters relating to the machine is output by using the neural network with the learned weights.

To solve the above problem, according to a third aspect of the invention, there is provided a machine learning system using a neural network to output an output value corresponding to values of operating parameters of a machine, wherein ranges of values of a plurality of types of operating parameters relating to the machine are set in advance, neural networks corresponding to the ranges of the values of the plurality of types of operating parameters relating to the machine are formed in advance, when a value of at least one type of operating parameter among newly acquired values of the plurality of types of operating parameters relating to the machine is outside a preset range, a new neural network is formed, training data obtained by actual measurement for the newly acquired values of the plurality of types of operating parameters relating to the machine is used to learn weights of the new neural network, and an output value corresponding to the values of the plurality of types of operating parameters relating to the machine is output by using the neural network with the learned weights.

Advantageous Effects of Invention

In the above aspects of the invention, when a newly acquired value of an operating parameter of a machine is outside a preset range, the number of nodes of a hidden layer of the neural network can be made to increase or a new neural network can be prepared so as to keep the output value calculated using the neural network from becoming a value greatly deviating from the actual value when a value of an operating parameter of the machine becomes a value outside the estimated range.

BRIEF DESCRIPTION OF DRAWINGS

FIG. 11 is a view showing a modification of a neural network.

FIG. 22A and FIG. 22B are views showing preset ranges of air temperature etc.

FIG. 29 is a flow chart for performing processing for calculation.

FIG. 30 is a flow chart for performing processing for acquiring teacher data.

FIG. 32 is a view showing preset ranges of air temperature etc.

DESCRIPTION OF EMBODIMENTS

Overall Configuration of Internal Combustion Engine

Figure 1:
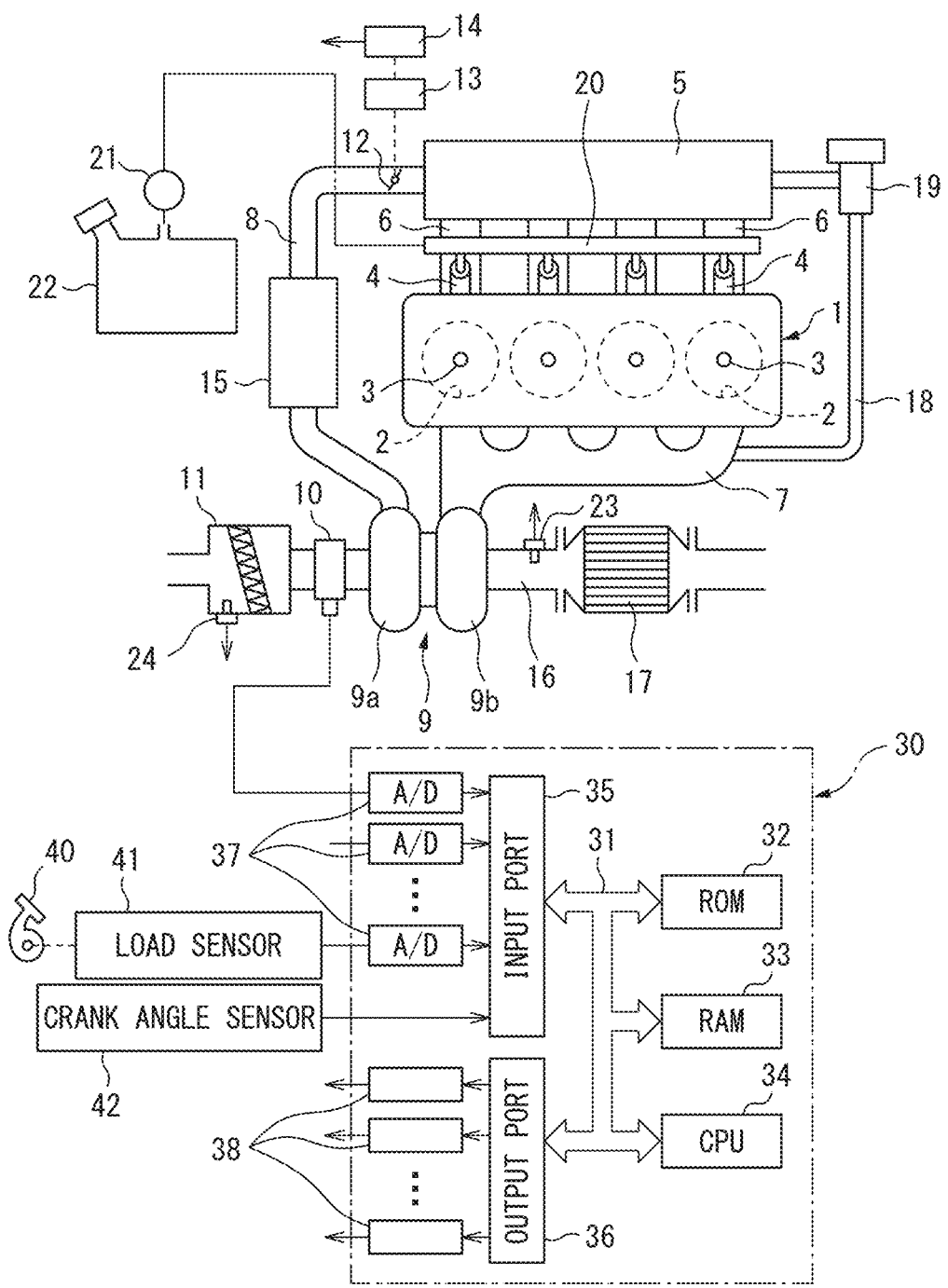
FIG. 1 is an overall view of an internal combustion engine.

First, the case of application of the machine learning system according to the present invention to an internal combustion engine will be explained. Referring to FIG. 1 showing an overall view of an internal combustion engine, 1 indicates an engine body, 2 combustion chambers of the cylinders, 3 spark plugs arranged in the combustion chambers 2 of the cylinders, 4 fuel injectors for injecting fuel, for example, gasoline, to the cylinders, 5 a surge tank, 6 intake runners, and 7 an exhaust manifold. The surge tank 5 is connected through an intake duct 8 to an outlet of a compressor 9a of an exhaust turbocharger 9, while an inlet of the compressor 9a is connected through an intake air detector 10 to an air cleaner 11. Inside the intake duct 8, a throttle valve 12 driven by an actuator 13 is arranged. At the throttle valve 12, a throttle valve opening degree sensor 14 for detecting a throttle valve opening degree is attached. Further, around the intake duct 8, an intercooler 15 is arranged for cooling the intake air flowing through the inside of the intake duct 8.

On the other hand, the exhaust manifold 7 is connected to an inlet of an exhaust turbine 9b of the exhaust turbocharger 9, while the outlet of the exhaust turbine 9b is connected through an exhaust pipe 16 to an exhaust purification use catalytic converter 17. The exhaust manifold 7 and the surge tank 5 are connected with each other through an exhaust gas recirculation (below, referred to as "EGR") passage 18. Inside the EGR passage 18, an EGR control valve 19 is arranged. The fuel injectors 4 are connected to a fuel distribution pipe 20. This fuel distribution pipe 20 is connected through a fuel pump 21 to a fuel tank 22. Inside the exhaust pipe 16, an $NO_X$ sensor 23 is arranged for detecting the concentration of $NO_X$ in the exhaust gas. Further, inside the air cleaner 11, an atmospheric temperature sensor 24 is arranged for detecting the atmospheric temperature.

An electronic control unit 30 is comprised of a digital computer provided with a ROM (read only memory) 32, RAM (random access memory) 33, CPU (microprocessor) 34, input port 35, and output port 36, which are connected to each other by a bidirectional bus 31. At the input port 35, output signals of the intake air detector 10, throttle valve opening degree sensor 14, $NO_X$ sensor 23, and atmospheric temperature sensor 24 are input through corresponding AD converters 37. At an accelerator pedal 40, a load sensor 41 generating an output voltage proportional to the amount of depression of the accelerator pedal 40 is connected. The output voltage of the load sensor 41 is input through a corresponding AD converter 37 to the input port 35. Furthermore, the input port 35 is connected to a crank angle sensor 42 generating an output pulse each time a crankshaft rotates by for example 30°. Inside the CPU 34, the engine speed is calculated based on the output signal of the crank angle sensor 42. On the other hand, the output port 36 is connected through corresponding drive circuits 38 to the spark plugs 3, the fuel injectors 4, the throttle valve drive use actuator 13, EGR control valve 19, and fuel pump 21.

Summary of Neural Network

Figure 2:
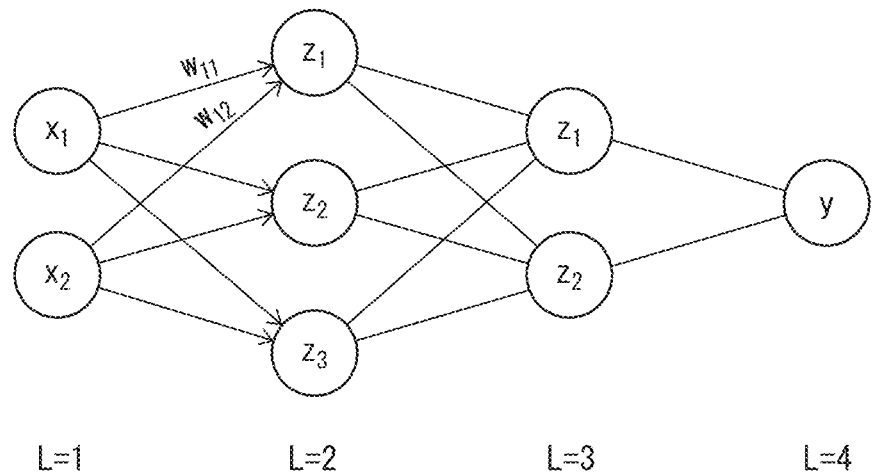
FIG. 2 is a view showing one example of a neural network.

In the embodiments of the present invention, neural networks are used to estimate various values representing the performance of the internal combustion engine. FIG. 2 shows one example of a neural network. The circle marks in FIG. 2 show artificial neurons. In the neural network, these artificial neurons are usually called "nodes" or "units" (in the present application, they are called "nodes"). In FIG. 2, L=1 shows an input layer, L=2 and L=3 show hidden layers, and L=4 shows an output layer. Further, in FIG. 2, $x_1$ and $x_2$ show output values from the nodes of the input layer (L=1), "y" shows the output value from the node of the output layer (L=4), $z_1$, $z_2$, and $z_3$ show output values from the nodes of one hidden layer (L=2), and $z_1$ and $z_2$ show output values from the nodes of another hidden layer (L=3). Note that, the number of hidden layers may be made one or any other number, while the number of nodes of the input layer and number of nodes of the hidden layers may also be made any numbers. Note that, FIG. 2 shows the case where there is one node of the output layer, but the number of nodes of the output layer may be made a plurality of two or more as well.

At the nodes of the input layer, the inputs are output as they are. On the other hand, at the nodes of the hidden layer (L=2), the output values $x_1$ and $x_2$ of the nodes of the input layer are input, while at the nodes of the hidden layer (L=2), the respectively corresponding weights "w" and biases "b" are used to calculate the sum input values "u". For example, a sum input value $u_k$ calculated at a node shown by $z_k$ (k=1, 2, 3) of the hidden layer (L=2) in FIG. 2 becomes as shown in the following equation:

[Equation 1]
$$U_k = \sum_{m=1}^{n} (x_m \cdot w_{km}) + b_k$$

Next, this sum input value $u_k$ is converted by an activation function "f" and is output from a node shown by $z_k$ of the hidden layer (L=2) as an output value $z_k(=f(u_k))$. The same is true for the other nodes of the hidden layer (L=2). On the other hand, the nodes of the hidden layer (L=3) receive as input the output values $z_1$, $z_2$, and $z_3$ of the nodes of the hidden layer (L=2). At the nodes of the hidden layer (L=3), the respectively corresponding weights "w" and biases "b" are used to calculate the sum input values "u" ($\Sigma z \cdot w + b$). The sum input values "u" are similarly converted by an activation function and output from the nodes of the hidden layer (L=3) as the output values $z_1$ and $z_2$. Note that, in the embodiments according to the present invention, as this activation function, a Sigmoid function $\sigma$ is used.

On the other hand, at the node of the output layer (L=4), the output values $z_1$ and $z_2$ of the nodes of the hidden layer (L=3) are input. At the node of the output layer, the respectively corresponding weights "w" and biases "b" are used to calculate the sum input value "u" ($\Sigma z \cdot w + b$) or just the respectively corresponding weights "w" are used to calculate the sum input value "u" ($\Sigma z \cdot w$). In this embodiment according to the present invention, at the node of the output layer, an identity function is used, therefore, from the node of the output layer, the sum input value "u" calculated at the node of the output layer is output as it is as the output value "y".

Expression of Function by Neural Network

Figure 3A:
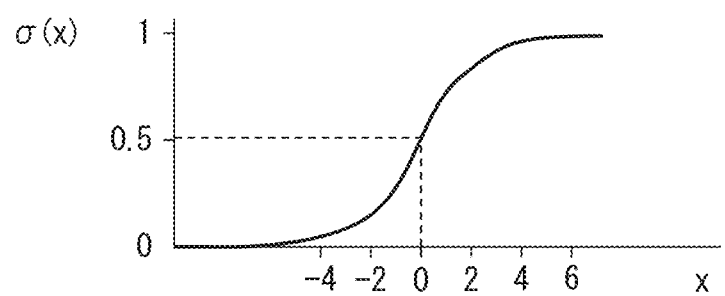
FIG. 3A and FIG. 3B are views showing changes in value of a Sigmoid function σ.
Figure 3B:
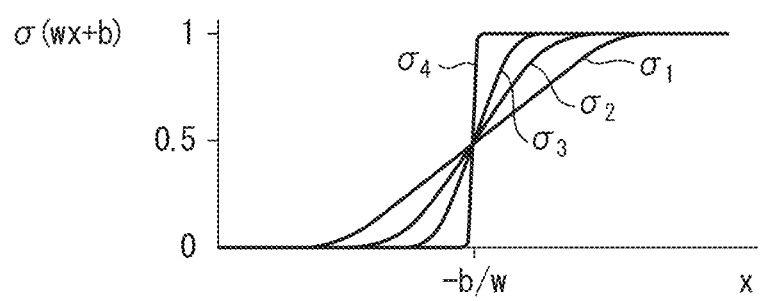

Now then, it is possible to express any function if using a neural network. Next, this will be simply explained. First, if explaining the Sigmoid function $\sigma$ used as the activation function, the Sigmoid function $\sigma$ is expressed as $\sigma(x)=1/(1+\exp(-x))$ and takes a value between 0 and 1 corresponding to the value of "x" as shown in FIG. 3A. Here, if replacing "x" with "wx+b", the Sigmoid function $\sigma$ is expressed as $\sigma(wx+b)=1/(1+\exp(-wx-b))$. Here, if increasing the value of "w", as shown by the curves $\sigma_1$, $\sigma_2$, and $\sigma_3$ in FIG. 3B, the slant of the curved part of the Sigmoid function $\sigma(wx+b)$ gradually becomes steeper. If making the value of "w" infinitely large, as shown by the curve $\sigma_4$ in FIG. 3B, the Sigmoid function $\sigma(wx+b)$ changes in a step as shown in FIG. 3B at the "x" where $x=-b/w(wx+b=0)$, that is, at the "x" where $\sigma(wx+b)=0.5$. If utilizing this property of the Sigmoid function $\sigma$, a neural network can be used to express any function.

Figure 4A:
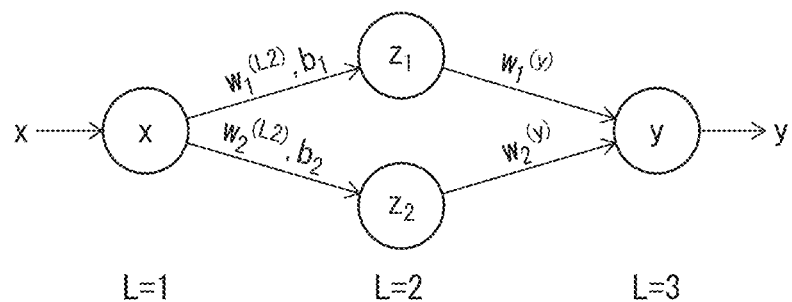
FIG. 4A and FIG. 4B respectively are views showing a neural network and output values from nodes of a hidden layer.

For example, using a neural network such as shown in FIG. 4A comprising an input layer (L=1) comprised of a single node, a hidden layer (L=2) comprised of two nodes, and an output layer (L=3) comprised of a single node, it is possible to express a function approximating a quadratic function. Note that, in this case, even if making the number of nodes of the output layer (L=3) a plurality of nodes, it is possible to express any function, but to enable easy understanding, the case where there is one node of the output layer (L=3) will be explained as an example. Now then, in the neural network shown in FIG. 4A, as shown in FIG. 4A, the node of the input layer (L=1) receives as input the input value "x", while the node shown by $z_1$ at the hidden layer (L=2) receives as input the input value $u=x \cdot w_1^{(L2)}+b_2$ calculated using a weight $w_1^{(L2)}$ and a bias $b_1$. This input value "u" is converted by the Sigmoid function $\sigma(x \cdot w_1^{(L2)}+b_1)$ and output as the output value $z_1$. Similarly, the node shown by $z_2$ at the hidden layer (L=2) receives as input the input value $u=x \cdot w_2^{(L2)}+b_2$ calculated using the weight $w_2^{(L2)}$ and bias $b_2$. This input value "u" is converted by the Sigmoid function $\sigma(x \cdot w_2^{(L2)}+b_2)$ and output as the output value $z_2$.

On the other hand, the node of the output layer (L=3) receives as input the output values $z_1$ and $z_2$ of the nodes of the hidden layer (L=2). At the node of the output layer, the respectively corresponding weights $w_1^{(y)}$ and $w_2^{(y)}$ are used to calculate the sum input value "u" ($\Sigma z \cdot w = z_1 \cdot w_1^{(y)} + z_2 \cdot w_2^{(y)}$). As explained above, in the embodiments according to the present invention, at the node of the output layer, an identity function is used. Therefore, from the node of the output layer, the sum input value "u" calculated at the node of the output layer is output as is as the output value "y".

Figure 4B:
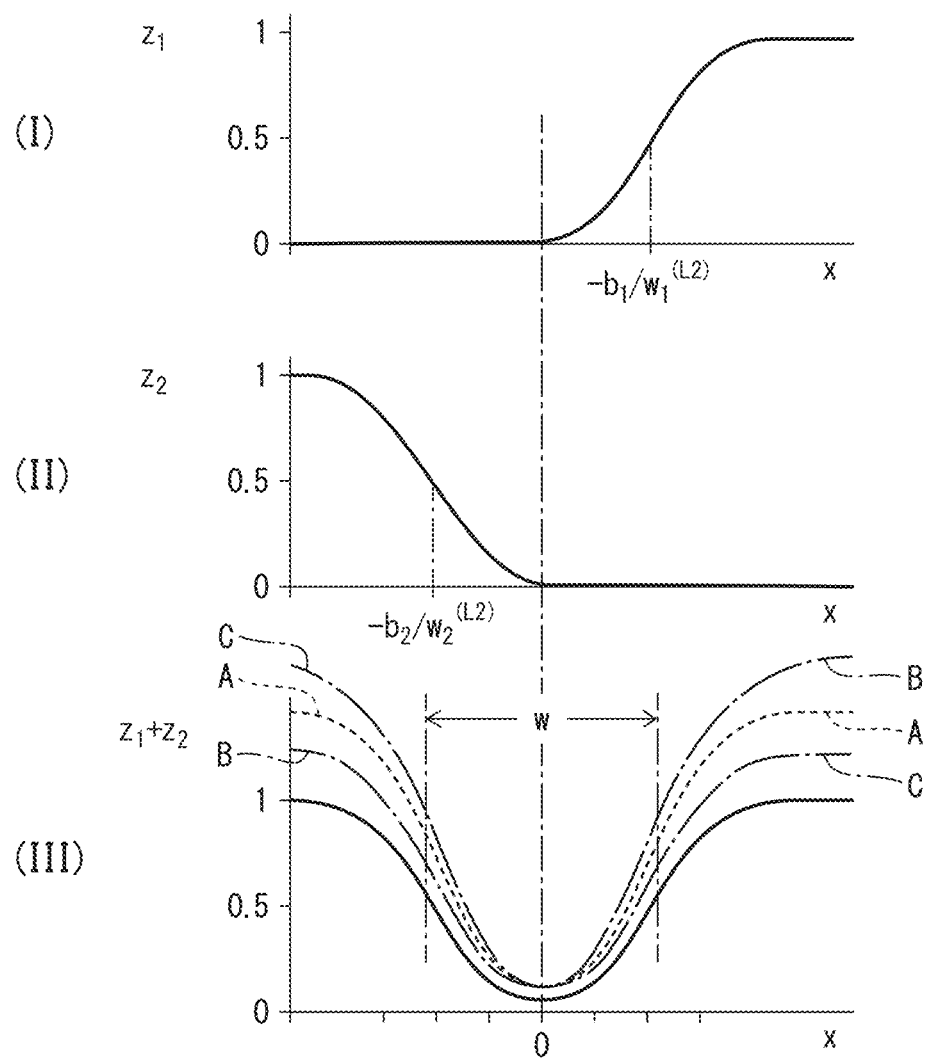

FIG. 4B (I) shows the output value $z_1$ from a node of the hidden layer (L=2) when the weight $w_1^{(L2)}$ and bias $b_1$ are set so that the value of the Sigmoid function $\sigma(x \cdot w_1^{(L2)}+b_1)$ at x=0 becomes substantially zero. On the other hand, at the Sigmoid function $\sigma(x \cdot w_2^{(L2)}+b_2)$, for example, if making the weight $w_2^{(L2)}$ a minus value, the shape of the curve of the Sigmoid function $\sigma(x \cdot w_2^{(L2)}+b_2)$ becomes a shape decreasing along with an increase of "x" such as shown by FIG. 4B

(II). At FIG. 4B (II), the change of the output value $z_2$ from the node of the hidden layer (L=2) when the weight $w_2^{(L2)}$ and bias $b_2$ are set so that the value of the Sigmoid function $\sigma(x \cdot w_2^{(L2)} + b_2)$ at x=0 becomes substantially zero is shown.

On the other hand, in FIG. 4B (III), the sum $(z_1+z_2)$ of the output values $z_1$ and $z_2$ from the nodes of the hidden layer (L=2) is shown by the solid line. Note that, as shown in FIG. 4A, the output values $z_1$ and $z_2$ are multiplied with the respectively corresponding weights $w_1^{(y)}$ and $w_2^{(y)}$. In FIG. 4B (III), the change in the output value "y" when $w_1^{(y)}$ and $w_2^{(y)} > 1$ and $w_1^{(y)} \approx w_2^{(y)}$ is shown by the broken line A. Furthermore, in FIG. 4B (III), the change in the output value "y" when $w_1^{(y)}$ and $w_2^{(y)} > 1$ and $w_1^{(y)} > w_2^{(y)}$ is shown by the one-dot broken line B, while in FIG. 4B (III), the change in the output value "y" when $w_1^{(y)}$ and $w_2^{(y)} > 1$ and $w_1(y) < w_2^{(y)}$ is shown by the one-dot broken line C. In FIG. 4B (III), the shape of the broken line A in the range shown by W shows a curve approximating a quadratic function such as shown by $y=ax^2$ ("a" is a coefficient), therefore, it will be understood that by using a neural network such as shown in FIG. 4A, a function approximating a quadratic function can be expressed.

Figure 5A:
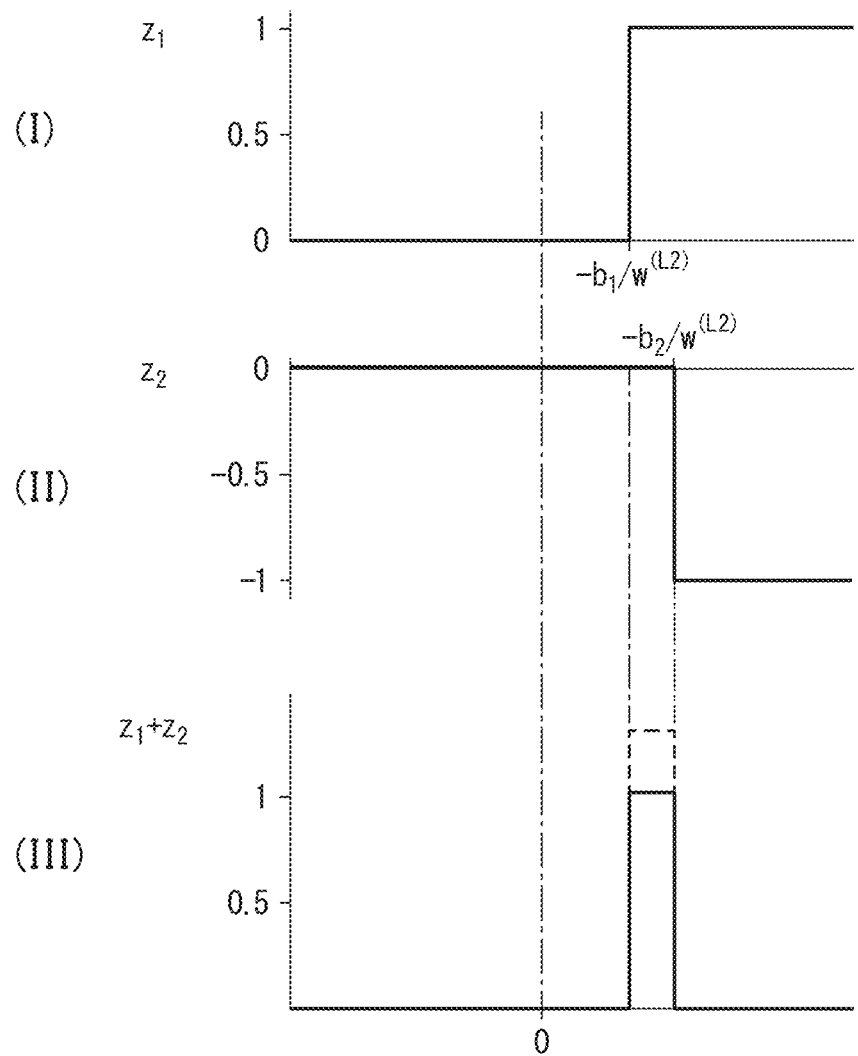
FIG. 5A and FIG. 5B respectively are views showing output values from nodes of a hidden layer and output values from nodes of an output layer.

On the other hand, FIG. 5A shows the case where the values of the weights $w_1^{(L2)}$ and $w_2^{(L2)}$ in FIG. 4A are made larger so as to make the value of the Sigmoid function $\sigma$ change in a step such as shown in FIG. 3B. In FIG. 5A (I), the output value $z_1$ from a node of the hidden layer (L=2) when the weight $w_1^{(L2)}$ and bias $b_1$ are set so that the value of the Sigmoid function $\sigma(x \cdot w_1^{(L2)} + b_1)$ increases in a step at $x=-b_1/w_1^{(L2)}$ is shown. Further, in FIG. 5A (II), the output value $z_2$ from a node of the hidden layer (L=2) when the weight $w_2^{(L2)}$ and bias $b_2$ are set so that the value of the Sigmoid function $\sigma(x \cdot w_2^{(L2)} + b_2)$ decreases in a step at $x=-b_2/w_2^{(L2)}$ slightly larger than $x=-b_1/w_1^{(L2)}$ is shown. Further, in FIG. 5A (III), the sum $(z_1+z_2)$ of the output values $z_1$ and $z_2$ from the nodes of the hidden layer (L=2) is shown by the solid line. As shown in FIG. 4A, the output values $z_1$ and $z_2$ are multiplied with the respectively corresponding weights $w_1^{(y)}$ and $w_2^{(y)}$. In FIG. 5A (III), the output value "y" when $w_1^{(y)}$ and $w_2^{(y)} > 1$ is shown by the broken line.

Figure 5B:
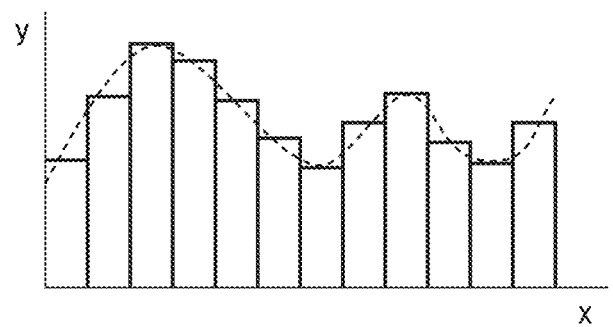
Figure 6A:
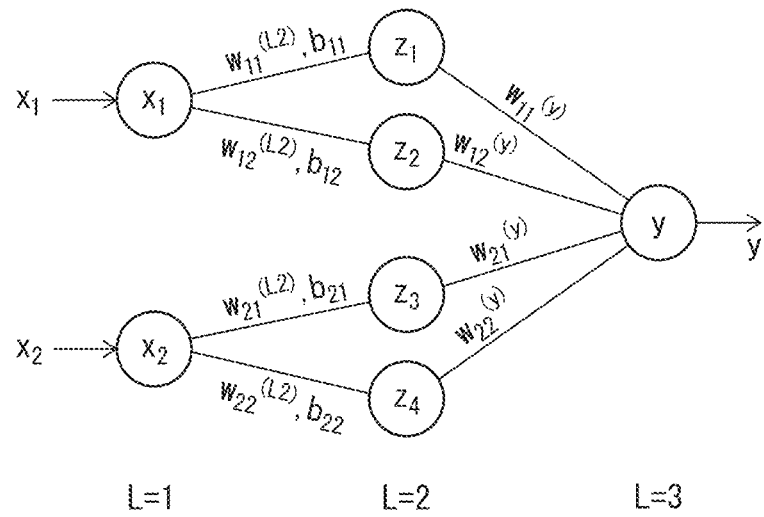
FIG. 6A and FIG. 6B respectively are views showing a neural network and output values from nodes of an output layer.
Figure 6B:
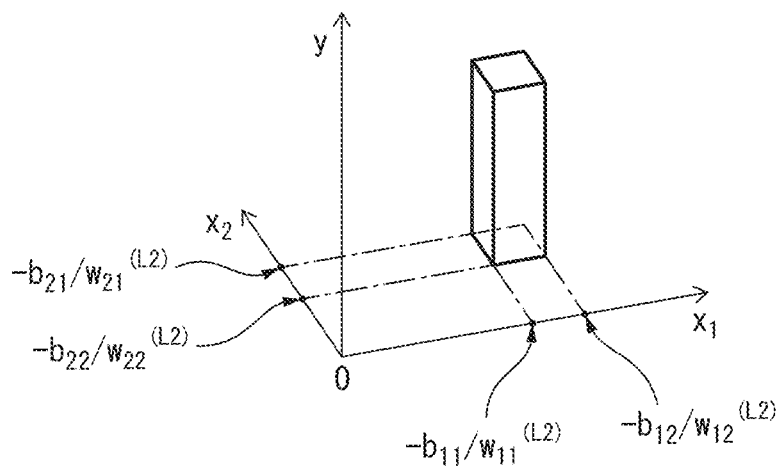

In this way, in the neural network shown in FIG. 4A, from the pair of nodes of the hidden layer (L=2), a bar-shaped output value "y" such as shown in FIG. 5A (III) is obtained. Therefore, if increasing the number of paired nodes in the hidden layer (L=2) and suitably setting the values of the weights "w" and biases "b" at the nodes of the hidden layer (L=2), it becomes possible to express a function approximating the function $y=f(x)$ such as shown by the curved line of the broken line in FIG. 5B. Note that, in FIG. 5B, the bars are drawn contiguous with each other, but in actuality the bars sometimes partially overlap. Further, in actuality, the value of "w" is not infinitely large, so the bars do not become precise bar shapes but become curved shapes like the top half of the curved part shown by $\sigma_3$ in FIG. 3B. Note that, while a detailed explanation will be omitted, as shown in FIG. 6A, if providing pairs of nodes at the hidden layer (L=2) respectively corresponding to the two different input values $x_1$ and $x_2$, as shown in FIG. 6B, a column-shaped output value "y" corresponding to the input values $x_1$ and $x_2$ is obtained. In this case, if providing a large number of paired nodes at the hidden layer (L=2) for the input values $x_1$, $x_2$, a plurality of column-shaped output values "y" respectively corresponding to the different input values $x_1$ and $x_2$ are obtained. Therefore, it will be understood that it is possible to express a function showing the relationship between the input values $x_1$ and $x_2$ and the output value "y". Note that, in the case of three or more different input values "x" as well, similarly, it is possible to express a function showing the relationship between the input values "x" and the output value "y".

Learning in Neural Network

On the other hand, in the embodiments according to the present invention, the error backpropagation algorithm is used to learn the values of the weights "w" and biases "b" in the neural network. This error backpropagation algorithm is known. Therefore, the error backpropagation algorithm will be explained simply below in its outlines. Note that, a bias "b" is one kind of weight "w", so in the following explanation, a bias "b" is deemed one type of weight "w". Now then, in the neural network such as shown in FIG. 2, if the weights at the input values $u^{(L)}$ to the nodes of the layers of L=2, L=3, or L=4 are expressed by $w^{(L)}$, the differential due to the weights $w^{(L)}$ of the error function E, that is, the gradient $\partial E/\partial w^{(L)}$, can be rewritten as shown in the following equation:

[Equation 2]

$$\partial E/\partial w^{(L)} = (\partial E/\partial u^{(L)})(\partial u^{(L)}/\partial w^{(L)}) \quad (1)$$

where, $z^{(L-1)} \cdot \partial \partial^{(L)} = L)^{(L)}$, so if $(\partial E/\partial u^{(L)}) = \delta^{(L)}$, the above equation (1) can be shown by the following equation:

[Equation 3]

$$\partial E/\partial w^{(L)} = \delta^{(L)} \cdot z^{(L-1)} \quad (2)$$

Here, if $u^{(L)}$ fluctuate, fluctuation of the error function E is caused through the change in the sum input values $u^{(L+1)}$ of the following layer, so $\delta^{(L)}$ can be expressed by the following equation:

[Equation 4]

$$\delta^{(L)} = (\partial E/\partial u^{(L)}) = \sum_{k=1}^{k} (\partial E/\partial u_k^{(L+1)})(\partial u_k^{(L+1)}/u^{(L)}) \quad (k=1,2\cdots) \quad (3)$$

where, if $z^{(L)} = f(u^{(L)})$, the input value $u_k^{(L+1)}$ appearing at the right side of the above equation (3) can be expressed by the following equation:

[Equation 5]

$$\text{Input value } u_k^{(L+1)} = \Sigma_{k=1}{}^k w_k^{(L+1)} \cdot z^{(L)} = \Sigma_{k=1}{}^k w_k^{(L+1)} \cdot f(u^{(L)}) \quad (4)$$

where, the first term $(\partial E/\partial u^{(L+1)})$ at the right side of the above equation (3) is $\delta^{(L+1)}$ and the second term $(\partial u_k^{(L+1)}/+1^{(L)})$ at the right side of the above equation (3) can be expressed by the following equation:

[Equation 6]

$$\partial(w_k^{(L+1)} \cdot z^{(L)})/\partial u^{(L)} = w_k^{(L+1)} \cdot \partial f(u^{(L)})/\partial L^{(L)} = w_k^{(L+1)} \cdot f'(u^{(L)}) \quad (5)$$

Therefore, $\delta^{(L)}$ is expressed by the following equation:

[Equation 7]

$$\delta^{(L)} = \sum_{k=1}^{k} w_k^{(L+1)} \cdot \delta^{(L+1)} \cdot f'(u^{(L)}) \quad (6)$$

$$\text{That is, } \delta^{(L-1)} = \sum_{k=1}^{k} w_k^{(L)} \cdot \delta^{(L)} \cdot f'(u^{(L-1)})$$

That is, if $\delta^{(L+1)}$ is found, it is possible to find $\delta^{(L)}$.

Now then, training data $y_t$ is found for certain input values. When the output value from the output layer corresponding to the input values is "y", if the square error is used as the error function, the square error E is found by $E=\frac{1}{2}(y-y_t)^2$. In this case, at the node of the output layer (L=4) of FIG. 2, the output value "y" becomes $f(u^{(L)})$, therefore, in this case, the value of $\delta^{(L)}$ at the node of the output layer (L=4) becomes like in the following equation:

[Equation 8]

$$\delta^{(L)}=\partial L/\partial u^{(L)}=(\partial L/\partial L)(\partial L/\partial u^{(L)})=(y-y_t)\cdot f'(u^{(L)}) \quad (7)$$

In this regard, in the embodiments of the present invention, as explained above, $f(u^{(L)})$ is an identity function and $f'(u^{(L)})=1$. Therefore, $\delta^{(L)}=y-y_t$ and $\delta^{(L)}$ are found.

If $\delta^{(L)}$ is found, the above equation (6) is used to find the $\delta^{(L-1)}$ of the previous layer. The $\delta$'s of the previous layer are successively found in this way. Using these values of $\delta$'s, from the above equation (2), the differential of the error function E, that is, the gradient $\partial E/\partial w^{(L)}$, is found for the weights "w". If the gradient $\partial E/\partial w^{(L)}$ is found, this gradient $\partial E/\partial w^{(L)}$ is used to update the values of the weights "w" so that the value of the error function E decreases. That is, the values of the weights "w" are learned. Note that, when the output layer (L=4) has a plurality of nodes, if making the output values from the nodes $y_1, y_2 \ldots$ and making the corresponding training data $y_{t1}, y_{t2} \ldots$, as the error function E, the following square sum error E is used:

[Equation 9]

$$\text{Error sum of squares } E = \frac{1}{n}\sum_{k=1}^{k}\frac{1}{2}(y_k - y_t)^2 \quad (8)$$

(k = 1, 2..., n is number of nodes of output layer)

Embodiments According to Present Invention

Next, referring to FIG. 7A to FIG. 10, a first embodiment of the machine learning system according to the present invention will be explained. In this first embodiment according to the present invention, as shown in FIG. 4A, a neural network comprised of a single input layer (L=1), a single layer of a hidden layer (L=2), and a single output layer (L=3) is used. Further, this first embodiment shows the case of using the neural network such as shown in FIG. 4A for learning the weights of the neural network so that the output value "y" is expressed by a quadratic function of an input value "x". Note that, in each of FIG. 7A to FIG. 8B, the broken line shows the waveform of a true quadratic function, the blacked out dots show the training data, the ring-shaped dots show the output value "y" after learning the weights of the neural network so that the difference between the output value "y" corresponding to the input value "x" and the training data becomes smaller, and the solid line curve shows the relationship between the input value "x" and the output value "y" after finishing learning. Further, in each of FIG. 7A to FIG. 8B, A to B, that is, R, shows a preset range of the input value "x".

Figure 7A:
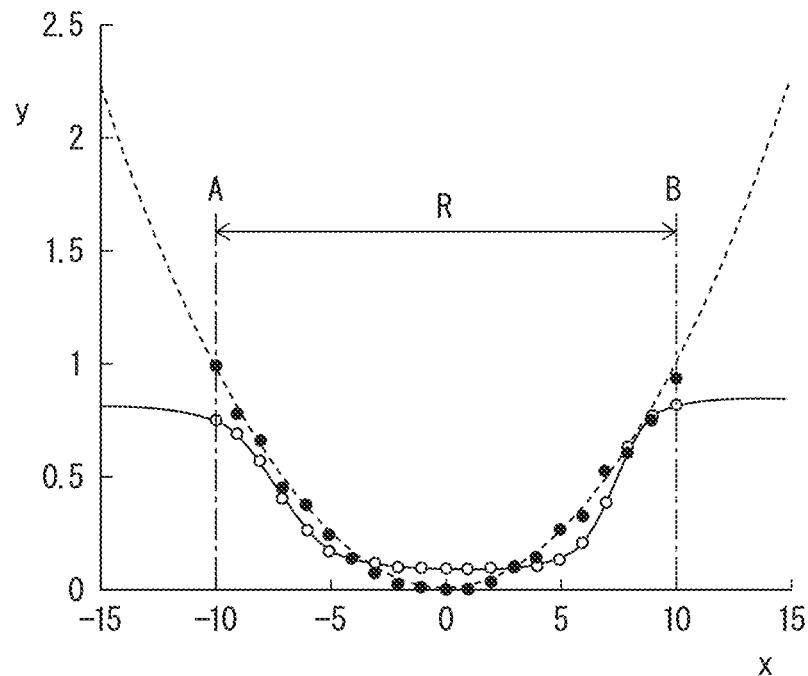
FIG. 7A and FIG. 7B are views for explaining the technical problem to be solved by the present invention.
Figure 7B:
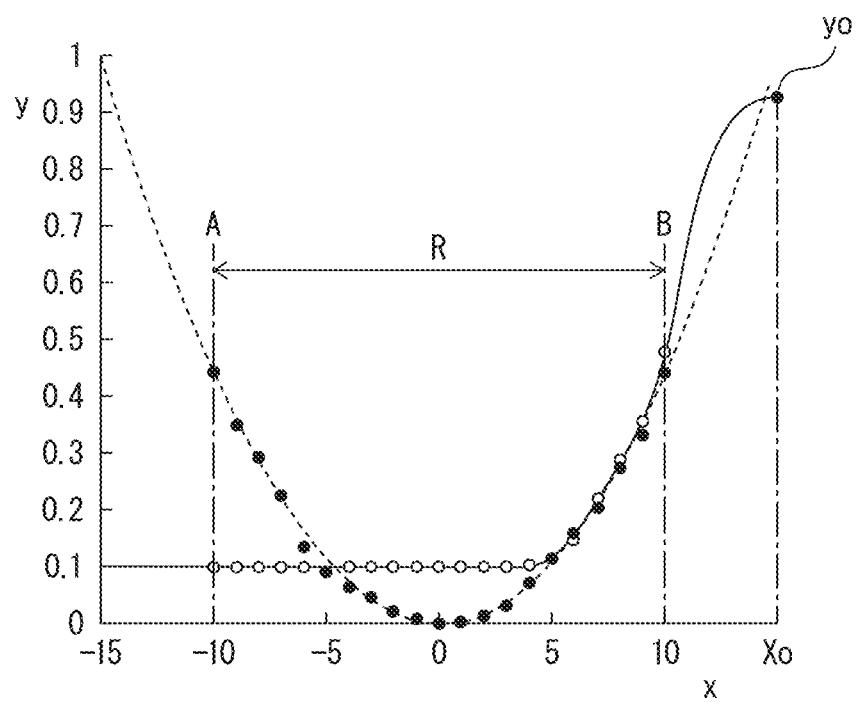

Now then, FIG. 7A and FIG. 7B are views for explaining the technical problem to be solved by the present invention. Therefore, first, while referring to FIG. 7A and FIG. 7B, the technical problem to be solved by the present invention will be explained. FIG. 7A shows the case where, as shown in FIG. 4A, a neural network having two nodes at the hidden layer (L=2) is used to learn the weights of the neural network so that the output amount "y" becomes a quadratic function $y=ax^2$ ("a" is a constant) of the input value "x" for an input value "x" in the preset range R. As shown in FIG. 7A, even if the hidden layer (L=2) of the neural network only has two nodes, if the input value "x" is in the preset range R, as shown by the solid line, a function close to a quadratic function is expressed.

That is, if learning is performed for the preset range R of the input value "x", in the preset range R, by using a suitable combination of the curved parts of a plurality of Sigmoid functions σ, the output value "y" is expressed as a function close to a quadratic function. However, outside of the preset range R of the input value "x", learning is not performed, so as shown by the solid line, the straight line parts at the two ends of the curved part where the Sigmoid function σ greatly changes appear as they are as the output value "y". Therefore, the output value "y" after finishing learning, as shown by the solid line in FIG. 7A, appears in the form of a function close to a quadratic function in the preset range R of the input value "x", while appears in a form close to a straight line not changing much at all with respect to the input value "x" at the outside of the preset range R of the input value "x". Therefore, as shown in FIG. 7A, outside of the preset range R of the input value "x", the output value "y" greatly deviates from the quadratic curve shown by the broken line.

On the other hand, FIG. 7B shows the case where, when the input value "x", for example, as shown in FIG. 7B by $x_0$, ends up becoming outside of the preset range R of the input value "x", the weights of the neural network are learned with the output value $y_0$ when the input value "x" is $x_0$ included in the training data. If in this way learning is performed including also the output value $y_0$ outside of the preset range R of the input value "x", the straight line part where $z_1=1$ in the Sigmoid function σ shown by $z_1$ in FIG. 4B rises to include the output value $y_0$, the Sigmoid function σ shown by $z_2$ in FIG. 4B moves overall to the right, and the value of the Sigmoid function σ becomes lower overall, so as shown by the solid line in FIG. 7B, in the preset range R, the value of the output value "y" after the end of learning ends up greatly deviating from the quadratic curve. If in this way the value ends up becoming outside the preset range R of the input value "x", a suitable output value "y" cannot be obtained.

Figure 8A:
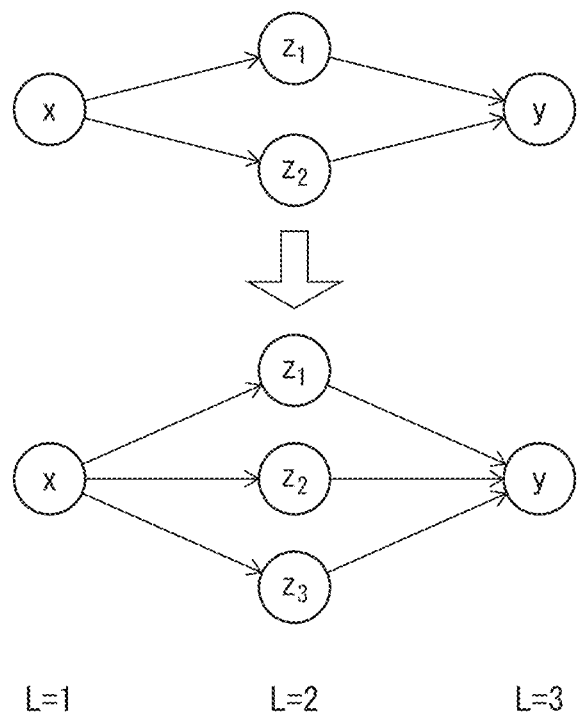
FIG. 8A and FIG. 8B respectively are views showing a neural network and the relationship between an input value and output value of the neural network.
Figure 8B:
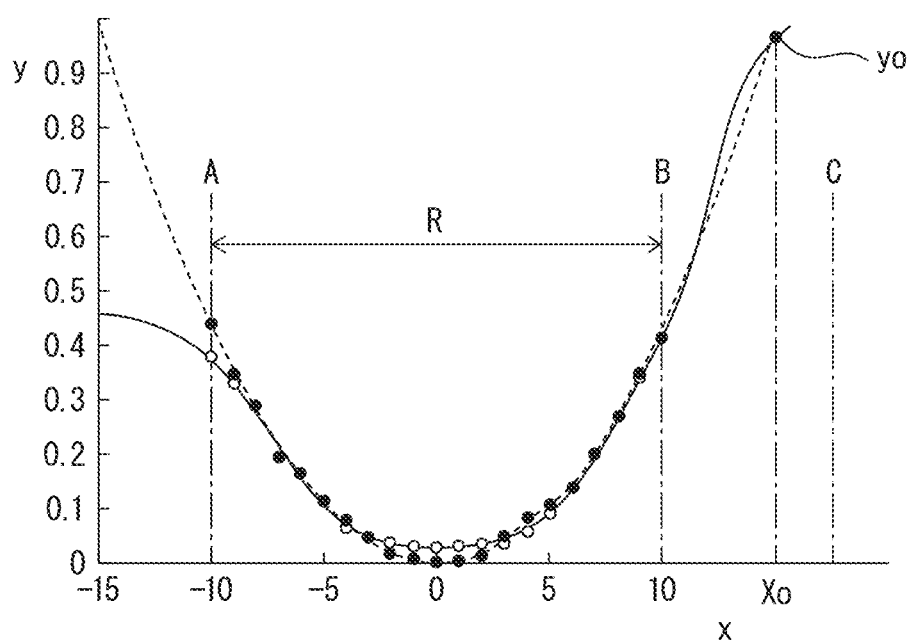

In this regard, however, in this case, if increasing the number of nodes of the hidden layer (L=2) of the neural network, even if the input value "x" becomes outside the presumed range of use R, it was revealed that a suitable output value "y" was obtained. Next, this will be explained while referring to FIG. 8A and FIG. 8B showing the first embodiment according to the present invention. FIG. 8B shows the result of learning when learning the weights of the neural network including also in the training data the output value $y_0$ when the input value "x" is $x_0$ in the state increasing the number of nodes of the hidden layer (L=2) of the neural network from two to three as shown in FIG. 8A. If the number of nodes of the hidden layer (L=2) of the neural network is made to increase in this way, as shown by the solid line in FIG. 8B, the values of the output value "y" becomes superposed over the quadratic curve shown by the broken line. Therefore, as shown in FIG. 8B, it will be understood that even if the input value "x" becomes outside the estimated range of use R, a suitable output value "y" is obtained by increasing the number of nodes of the hidden layer (L=2) of the neural network. Therefore, in the first embodiment according to the present invention, when the input value "x" is outside the estimated range of use R, the number of nodes of the hidden layer (L=2) of the neural network is made to increase.

Next, a specific example of the input value "x" and the output value "y" shown in FIG. 7A to FIG. 8B will be explained. In the field of internal combustion engines, when the value of a specific type of operating parameter relating to the internal combustion engine is defined as the input value "x", sometimes the actual output amount "y" will take the form of a quadratic function of the input value "x". As one example of such a case, there is the case where the value of the specific type of operating parameter relating to the internal combustion engine, that is, the input value "x", is the engine speed N (rpm) and the output amount "y" is the amount of exhaust loss. In this case, if the engine is determined, the range of use of the engine speed N is determined accordingly, therefore, the range of engine speed N is preset. On the other hand, the amount of exhaust loss shows the amount of heat energy exhausted from the engine combustion chambers. This is proportional to the amount of exhaust gas discharged from the engine combustion chambers and is proportional to the temperature difference between the temperature of the exhaust gas discharged from the engine combustion chambers and the outside air temperature. This amount of exhaust loss is calculated based on the detected values of the gas temperature etc. when actually operating an engine. Therefore, this calculated amount of exhaust loss shows a value obtained by actual measurement.

As one specific example, when the input value "x", that is, the engine speed N, is in a preset range R, the training data obtained by actual measurement is used to learn the weights of the neural network so that the difference between the output value "y" and the training data corresponding to the input value "x" becomes smaller. That is, when the value of a specific type of operating parameter relating to an internal combustion engine is in a preset range R, the training data obtained by actual measurement is used to learn the weights of the neural network so that the difference between the output value "y" and the training data corresponding to the value of the specific type of operating parameter relating to the internal combustion engine becomes smaller. On the other hand, when the input value "x", that is, the engine speed N, is outside the preset range, the number of nodes of the hidden layers of the neural network is increased and the training data obtained by actual measurement for the newly acquired input value "x", that is, the engine speed N, is used to learn the weights of the neural network so that the difference between the output value "y" and the training data corresponding to the input value "x" becomes smaller. That is, when the value of a specific type of operating parameter relating to an internal combustion engine is outside the preset range, the number of nodes of the hidden layers of the neural network is increased and the training data obtained by actual measurement for the newly acquired value of the specific type of operating parameter relating to the internal combustion engine is used to learn the weights of the neural network so that the difference between the output value "y" and the training data corresponding to the specific type of operating parameter relating to the internal combustion engine becomes smaller. Therefore, in this case, even when the engine speed N becomes higher than the preset range R, it becomes possible to relatively accurately estimate the amount of exhaust loss.

Figure 9:
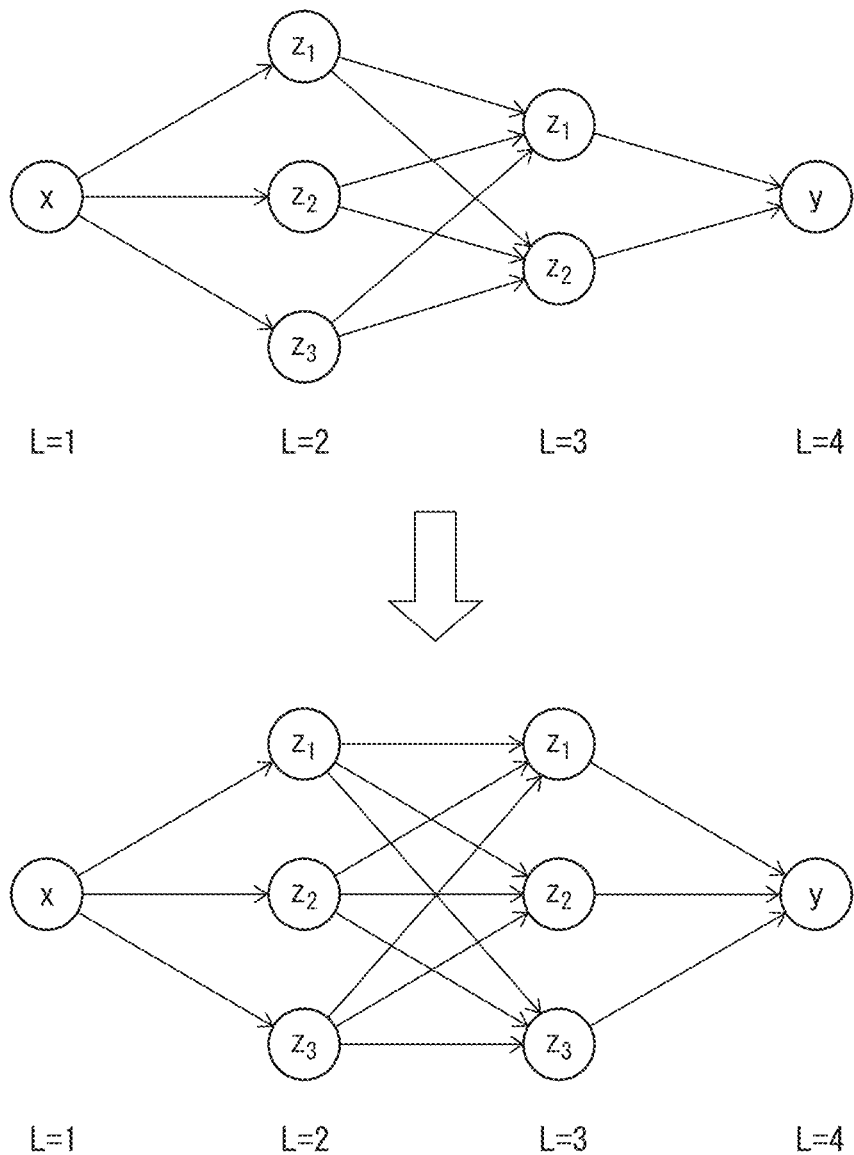
FIG. 9 is a view showing a neural network.

Note that, the first embodiment according to the present invention can also be applied to a neural network having a plurality of hidden layers (L=2 and L=3) such as shown in FIG. 9. In the neural network such as shown in FIG. 9, the shape of the function output from the output layer (L=4) is determined by the output values $z_1$ and $z_2$ of the nodes of the hidden layer (L=3) one layer before the output layer (L=4). That is, by what kind of function the output value "y" can be expressed is governed by the number of nodes of the hidden layer (L=3) one layer before the output layer (L=4). Therefore, in a neural network such as shown in FIG. 9, when increasing the number of nodes of the hidden layers, as shown in FIG. 9, the number of nodes of the hidden layer (L=3) one layer before the output layer (L=4) is made to increase.

Figure 10:
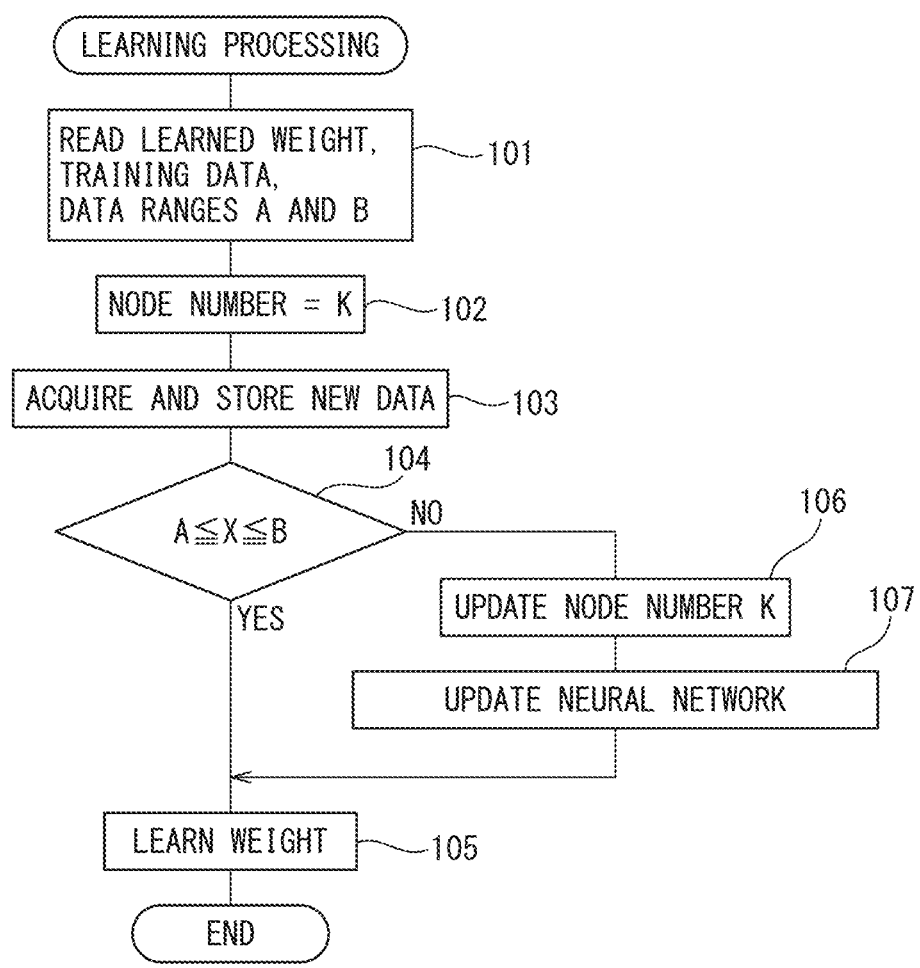
FIG. 10 is a flow chart for performing learning processing.

In the above-mentioned first embodiment, the amounts of exhaust loss actually measured for the various input values "x" in the preset range R are found in advance as training data, that is, training data is found in advance by actual measurement for values of the specific type of operating parameter relating to the internal combustion engine in the preset range R. The structure of the neural network is determined by these values of the specific type of operating parameter relating to the internal combustion engine and training data. The weights of the neural network are learned in advance so that the difference between the output value "y" and the training data corresponding to value of the specific type of operating parameter relating to the internal combustion engine becomes smaller. The training data found in advance by actual measurement for values of the specific type of operating parameter relating to the internal combustion engine in the preset range R is stored in the storage unit of the electronic control unit 30. In this first embodiment, a neural network of the same structure as the neural network used in advance learning is used and the weights of the neural network when learning is finished are used for further learning onboard during vehicle operation. FIG. 10 shows the learning processing routine of the first embodiment performed onboard. Note that, the learning processing routine shown in FIG. 10 is executed by interruption every fixed time period, for example, every second.

Referring to FIG. 10, first, at step 101, the learned weights stored in the storage unit of the electronic control unit 30, the training data which had been used in the advance learning, that is, the training data is found in advance by actual measurement for values of the specific type of operating parameter relating to the internal combustion engine in the preset range R, and values A and B showing the range R of input data, that is, the preset range of the value of the specific type of operating parameter relating to the internal combustion engine, are read. The learned weights are used as the initial values of the weights. Next, at step 102, the number of nodes K of the hidden layer one layer before the output layer of the neural network which had been used in the advance learning is read. Next, the routine proceeds to step 103 where a new input value "x", that is, the value of the specific type of operating parameter relating to the internal combustion engine, is acquired. This new input value "x", that is, the value of the specific type of operating parameter relating to the internal combustion engine, is stored in the storage unit of the electronic control unit 30. Furthermore, at step 103, the actually measured value of the amount of exhaust loss corresponding to the new input value "x" is stored as training data in the storage unit of the electronic control unit 30. That is, at step 103, training data obtained by actual measurement for the newly acquired value of the specific type of operating parameter relating to the internal combustion engine is stored in the storage unit of the electronic control unit 30.

Next, at step 104, it is judged if the new input value "x", that is, the newly acquired value of the specific type of operating parameter relating to the internal combustion engine, is between A and B showing the preset range R, that is, if the new input value "x" is A or more and B or less. When the new input value "x" is between A and B showing the preset range R, the routine proceeds to step 105 where the input value "x", that is, the newly acquired value of the specific type of operating parameter relating to the internal combustion engine, is input to a node of the input layer of neural network. Based on the output value "y" output from the node of the output layer of the neural network and the training data obtained by actual measurement for the newly acquired value of the specific type of operating parameter relating to the internal combustion engine, using the error backpropagation algorithm, the weights of the neural network are learned so that the difference between the output value "y" and the training data becomes smaller.

On the other hand, when at step 104 it is judged that the new input value "x", that is, the newly acquired value of the specific type of operating parameter relating to the internal combustion engine, is not between A and B showing the preset range R, the routine proceeds to step 106 where the number of nodes K of the hidden layer one layer before the output layer of the neural network is updated and the number of nodes K of the hidden layer one layer before the output layer is made to increase. At this time, in the first embodiment, the number of nodes K of the hidden layer one layer before the output layer is increased by just 1. Next, at step 107, the neural network is updated so as to make the number of nodes K of the hidden layer one layer before the output layer increase, then the routine proceeds to step 105. At step 105, the training data newly obtained corresponding to the new input value "x" is also included in the training data and the weights of the updated neural network are learned so that the difference between the output value "y" and the training data becomes smaller. That is, at step 105, the training data obtained by actual measurement for the newly acquired value of the specific type of operating parameter relating to the internal combustion engine and the training data found in advance by actual measurement for the value of the specific type of operating parameter relating to the internal combustion engine in the preset range R are used to update the weights of the updated neural network so that the difference between the output value "y" changing in accordance with the value of the specific type of operating parameter relating to the internal combustion engine inside the preset range and outside the preset range and the training data corresponding to the value of the specific type of operating parameter relating to the internal combustion engine becomes smaller.

In this case, when the newly acquired value of the specific type of operating parameter relating to the internal combustion engine is outside the preset range, it is also possible to make the number of nodes of the hidden layer one layer before the output layer of the neural network increase if the number of the training data obtained by actual measurement for the newly acquired value of the specific type of operating parameter relating to the internal combustion engine is a two or more certain number or more. Therefore, in the first embodiment, when the newly acquired value of the specific type of operating parameter relating to the internal combustion engine is outside the preset range, the number of nodes of the hidden layer one layer before the output layer of the neural network is increased in accordance with the number of training data obtained by actual measurement for the newly acquired value of the specific type of operating parameter relating to the internal combustion engine.

Further, when there are a plurality of training data obtained by actual measurement for the newly acquired value of the specific type of operating parameter relating to the internal combustion engine outside of the preset range, it is possible to make the number of nodes of the hidden layer one layer before the output layer of the neural network increase in accordance with the increase of the data density of the training data in the preset range of the value of the operating parameter shown between B and C in FIG. 8B. Note that, in FIGS. 8B, B and C respectively show the minimum value and maximum value of the preset range of the value of the operating parameter. Therefore, strictly speaking, the number of nodes of the hidden layer one layer before the output layer of the neural network can be made to increase in accordance with the increase in the data density obtained by dividing the number of training data by the value of the difference (C−B) of the maximum value C and minimum value B showing the preset range of the value of the operating parameter.

Now then, the internal combustion engine used in this embodiment of the present invention, as shown in FIG. 1, is provided with an electronic control unit 30. This electronic control unit 30 is provided with a parameter acquiring unit acquiring a value of an operating parameter of the internal combustion engine, a processing unit using a neural network comprised of an input layer, hidden layers, and an output layer to perform processing, and a storage unit. Here, the input port 35 shown in FIG. 1 forms the above parameter acquiring unit, the CPU 34 forms the above-mentioned processing unit, and the ROM 32 and RAM 33 form the above-mentioned storage unit. Note that, at the CPU 34, that is, the above-mentioned processing unit, the value of the operating parameter of the internal combustion engine is input to the input layer, while an output value changing in accordance with the value of the operating parameter of the engine is output from the output layer. Further, the range R preset for the value of the specific type of operating parameter relating to the internal combustion engine is stored in advance in the ROM 32, that is, in the above-mentioned storage unit. Furthermore, the learned weights and the training data found in advance by actual measurement for the value of the specific type of operating parameter relating to the internal combustion engine in the preset range R are stored in the RAM 33, that is, the above-mentioned storage unit.

FIG. 11 shows a modification of the neural network used in the first embodiment according to the present invention. In this modification, the output layer (L=4) has two nodes. In this modification, in the same way as the example shown in FIG. 9, the input value "x" is made the engine speed N (rpm). On the other hand, in this modification, one output amount $y_1$, in the same way as the example shown in FIG. 9, is made the amount of exhaust loss, while the other output amount $y_2$ is made any amount becoming a quadratic function of the input value "x", for example, the fuel consumption rate. In this modification as well, at the nodes of the output layer (L=4), an identity function is used as the activation function. If in this way, the output layer (L=4) has a plurality of nodes, as mentioned above, as the error function E, the error sum of squares E shown in the above equation (8) (where the output values from the nodes are $y_1$, $y_2$ . . . and the corresponding training data are $y_{t1}$, $y_{t2}$ . . . ) is used. In this case, as will be understood from the above equation (7), for one node, the error sum of squares E is partially differentiated by $y_1$, so becomes $(\partial E/\partial y_1)$. The value of $\delta^{(L)}$ for that one node becomes $\delta^{(L)}=y_1-y_{t1}$. For the other node, the error sum of squares E is partially differentiated by $y_2$, so becomes $(\partial E/\partial_{y2})$. The value of $\delta^{(L)}$ for the other node becomes $\delta^{(L)}=y_2-y_{t12}$. For the nodes of the output layer (L=4), if $\delta^{(L)}$ is found, the above equation (6) is used to find the $\delta^{(L-1)}$ of the previous layer. In this way, the $\delta$'s of the previous layer are successively found. The values of these $\delta$'s are used to find the differential of the error function E, that is, the gradient $\partial E/\partial^{(L)}$, for the weights "w" from the above equation (2). If the gradient $\partial E/\partial w^{(L)}$ is found, this gradient $\partial E/\partial w^{(L)}$ is used to update the values of the weights "w" so that the value of the error function E is decreased.

As shown in FIG. 11, even if the output layer (L=4) of the neural network has a plurality of nodes, the form of the function output from the nodes of the output layer (L=4) is determined by the output values $z_1$, $z_2$ of the nodes of the hidden layer (L=3) one layer before the output layer (L=4). That is, by what kind of function the output values $y_1$, $y_2$ can be expressed is governed by the number of nodes of the hidden layer (L=3) one layer before the output layer (L=4). Therefore, in the neural network such as shown in FIG. 11, when increasing the number of nodes of the hidden layers, as shown in FIG. 11, the number of nodes of the hidden layer (L=3) one layer before the output layer (L=4) is made to increase.

Figure 12:
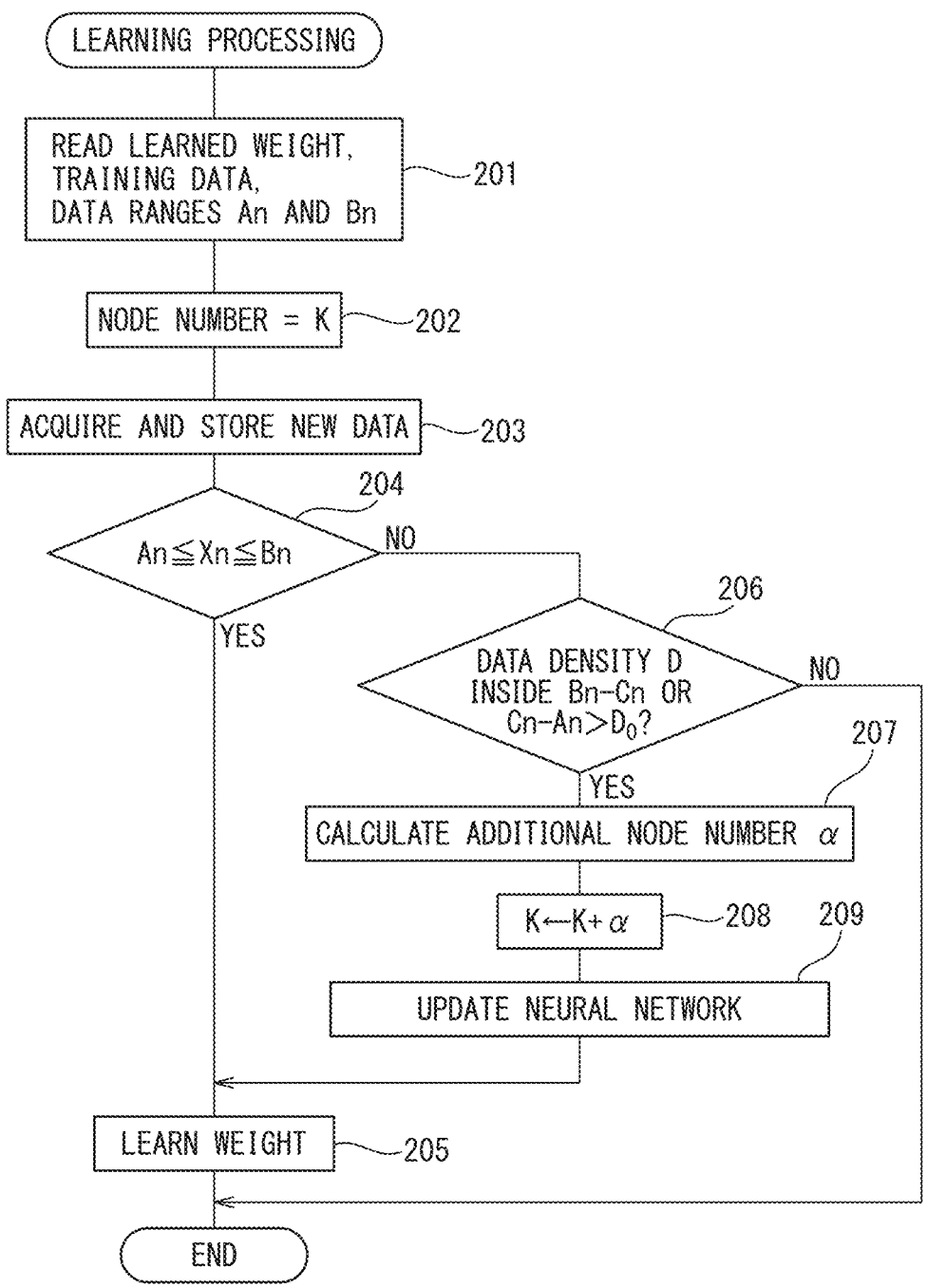
FIG. 12 is a flow chart showing another embodiment for performing learning processing.
Figure 13:
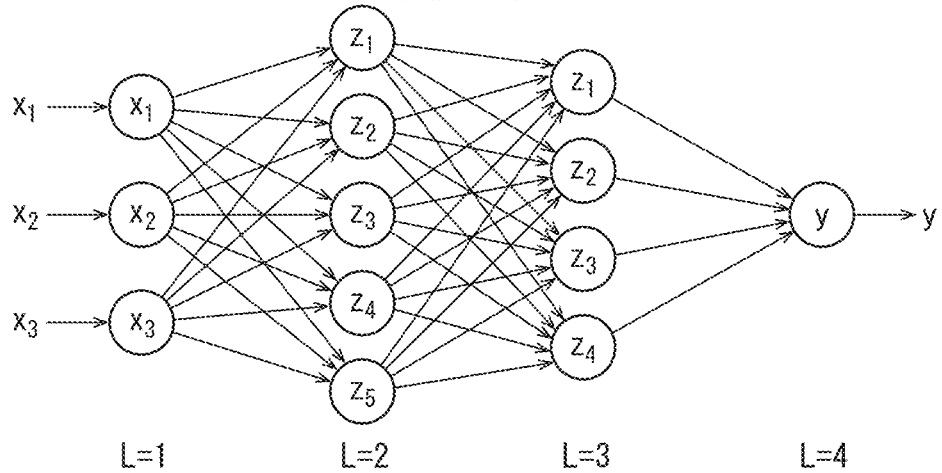
FIG. 13 is a view showing a neural network.

FIG. 12 to FIG. 14B show a second embodiment of the machine learning system according to the present invention. In this second embodiment, instead of the operating parameter relating to the internal combustion engine, there are a plurality of types of operating parameters. The weights of the neural network are learned based on the values of the plurality of types of operating parameters relating to the internal combustion engine. As one specific example, the case is shown of preparing a neural network model where the operating parameters of the internal combustion engine are comprised of the engine speed, accelerator opening degree (amount of depression of accelerator), and outside air temperature, and an output torque of the internal combustion engine is estimated based on the values of these operating parameters of the internal combustion engine. In this one specific example, as shown in FIG. 13, the input layer (L=1) of the neural network is comprised of three nodes. To these nodes, an input value $x_1$ showing the engine speed, an input value $x_2$ showing the accelerator opening degree, and an input value $x_3$ showing the outside air temperature are input. Further, the number of the hidden layers (L=2 and L=3) can be made one layer or any number of layers. The numbers of nodes of the hidden layers (L=2 and L=3) can also be made any numbers. Note that, in the example shown in FIG. 13, the number of nodes of the output layer (L=4) is made a single node.

Figure 14A:
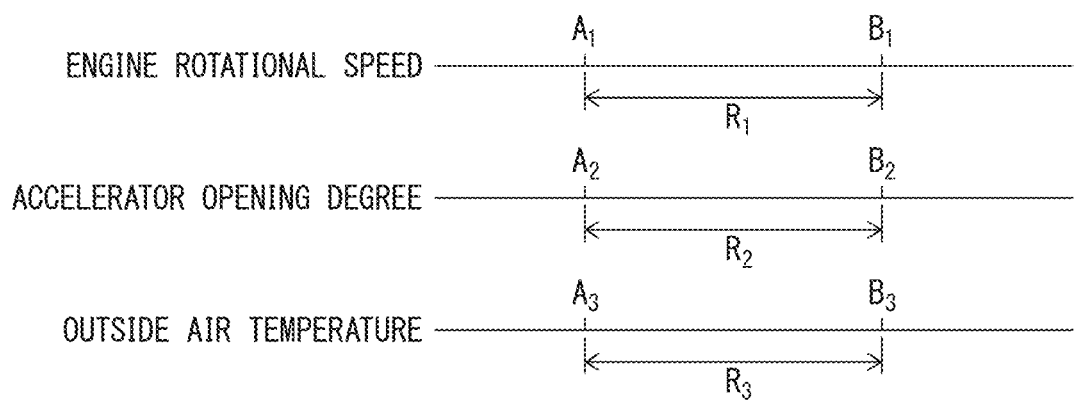
FIG. 14A and FIG. 14B are views showing preset ranges of engine speed etc.

On the other hand, in FIG. 14A, $A_1$ to $B_1$, that is, $R_1$, shows the preset range of the engine speed, $A_2$ to $B_2$, that is, $R_2$, shows the preset range of the accelerator opening degree, and $A_3$ to $B_3$, that is, $R_3$, shows the preset range of the outside air temperature. Note that, in FIG. 14B as well, in the same way as FIG. 14A, $A_1$ to $B_1$ shows the preset range of the engine speed, $A_2$ to $B_2$ shows the preset range of the accelerator opening degree, and $A_3$ to $B_3$ shows the preset range of the outside air temperature. Note that, in this second embodiment, the accelerator opening degree is detected by the load sensor 41, while the outside air temperature is detected by the atmospheric temperature sensor 24. Further, in this second embodiment, for example, the output torque of the engine is actually measured by a torque sensor attached to the engine crankshaft. The torque obtained by this actual measurement is made the training data.

In this second embodiment as well, the engine output torques actually measured for the various input values $x_n$(n=1, 2, 3) in the preset ranges Rn are found in advance as training data. That is, the training data is found in advance by actual measurement for the values of the plurality of types of operating parameters relating to the internal combustion engine in the preset ranges Rn. From the values of the plurality of types of operating parameters relating to the internal combustion engine and the training data, the structure of the neural network is determined. The weights of the neural network are learned in advance so that the difference between the output value "y" and the training data corresponding to the values of the plurality of types of operating parameters relating to the internal combustion engine becomes smaller. The training data found in advance by actual measurement for the values of the plurality of types of operating parameters relating to the internal combustion engine in the preset ranges Rn are stored in the storage unit of the electronic control unit 30. In this second embodiment as well, a neural network of the same structure as the neural network used in the advance learning and the weights of the neural network when learning is finished are used for further learning onboard during vehicle operation. FIG. 12 shows the learning processing routine of the second embodiment performed onboard. This learning processing routine is executed by interruption every fixed time period, for example, every second.

Referring to FIG. 12, first, at step 201, the learned weights stored in the storage part of the electronic control unit 30, the training data used in the advance learning, that is, the training data found in advance by actual measurement for the values of the plurality of types of operating parameters relating to the internal combustion engine in the preset ranges Rn, and values An and Bn (n=1, 2, 3) showing the ranges of the input data, that is, the preset ranges of the values of the plurality of types of operating parameters relating to the internal combustion engine (FIG. 13A), are read. The learned weights are used as the initial values of the weights. Next, at step 202, the number of nodes K of the hidden layer one layer before the output layer of the neural network used in the advance learning is read. Next, the routine proceeds to step 203 where new input values "x", that is, new values of the plurality of types of operating parameters relating to the internal combustion engine, are acquired. The new input values "x", that is, the new values of the plurality of types of operating parameters relating to the internal combustion engine, are stored in the storage unit of the electronic control unit 30. Furthermore, at step 203, the actually measured values of the engine output torque corresponding to the new input values "x" are stored as training data in the storage unit of the electronic control unit 30. That is, at step 203, the training data obtained by actual measurement for the newly acquired values of the plurality of types of operating parameters relating to the internal combustion engine is stored in the storage unit of the electronic control unit 30.

Next, at step 204, it is judged whether new input values $x_n$, that is, the newly acquired values of the plurality of types of operating parameters relating to the internal combustion engine, are in preset ranges Rn (between An and Bn), that is, whether the new input values $x_n$ are An or more and Bn or less. When the new input values $x_n$ are in the preset ranges Rn, the routine proceeds to step 205 where the input values $x_n$, that is, the newly acquired values of the plurality of types of operating parameters relating to the internal combustion engine, are input to the corresponding nodes of the input layer of the neural network. Based on the output value "y"

output from the node of the output layer of the neural network and the training data found by actual measurement for the newly acquired values of the plurality of types of operating parameters relating to the internal combustion engine, the error backpropagation algorithm is used to learn the weights of the neural network so that the difference between the output value "y" and the training data becomes smaller.

Figure 14B:
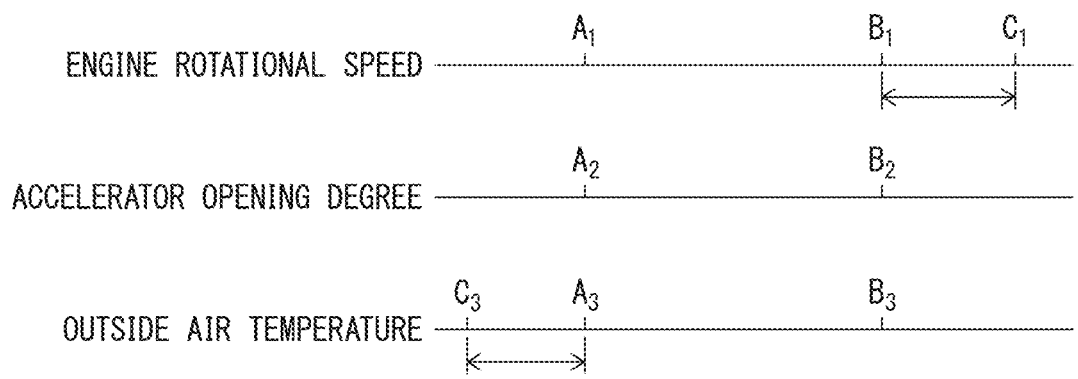

On the other hand, when at step 204 it is judged that a new input value $x_n$, that is, the value of at least one type of operating parameter among the newly acquired values of the plurality of types of operating parameters relating to the internal combustion engine, is not in the preset ranges Rn (between An and Bn), for example, when in FIG. 14B, the input value $x_1$ showing the engine speed is in the preset range ($B_1$ to $C_1$) from $B_1$ to $C_1$ ($B_1 < C_1$) or when in FIG. 13B the input value $x_3$ showing the outside air temperature is in the preset range ($C_3$ to $A_3$) from $C_3$ to $A_3$ ($C_3 < A_3$), the routine proceeds to step 206. At step 206, first the density D of the training data (=number of training data/($C_n$–$B_n$) or number of training data/($A_n$–$C_n$)) with respect to a new input value $x_n$ in the range ($B_n$ to $C_n$) or the range ($C_n$ to $A_n$) in which the new input value $x_n$ falls is calculated.

In this regard, in FIG. 14B, $B_1$ and $C_1$ respectively shown the minimum value and maximum value of the preset range of the engine speed, that is, the minimum value and maximum value of the preset range of the value of the operating parameter, while the training data density D shows the value obtained by dividing the number of training data by the value of the difference ($C_1$–$B_1$) of the maximum value $C_1$ and the minimum value $B_1$ showing the preset range of the value of the operating parameter. Further, in FIG. 14B, $C_3$ and $A_3$ respectively show the minimum value and maximum value of the preset range of the outside air temperature, that is, the minimum value and maximum value of the preset range of the value of the operating parameter, while training data density D shows the value obtained by dividing the number of training data by the value of the difference ($C_3$–$A_3$) of the maximum value $C_3$ and the minimum value $A_3$ showing the preset range of the value of the operating parameter. At step 206, if the training data density D is calculated, it is judged if the training data density D becomes higher than a preset data density $D_0$. If the training data density D is lower than the preset data density $D_0$, the processing cycle ends.

On the other hand, when at step 206 it is judged that the training data density D becomes higher than the predetermined data density $D_0$, the routine proceeds to step 207. In this case, when D (=number of training data/($A_n$–$C_n$))>$D_0$, the number a of additional nodes is calculated by the following equation:

Number α of additional nodes=round{(K/(Bn−An))·(An−Cn)}

On the other hand, when D (=number of training data/($C_n$–$B_n$))>$D_0$, the number α of additional nodes is calculated by the following equation:

Number α of additional nodes=round{(K/(Bn−An))·(Cn−Bn)}

Note that, in the above equations, "K" shows the number of nodes, while "round" means to round off.

If at step 207 the number of additional nodes a is calculated, the routine proceeds to step 208 where the number K of nodes of the hidden layer one layer before the output layer of the neural network is updated and the number K of nodes of the hidden layer one layer before the output layer is made to increase by exactly the number of additional nodes α(K←K+α). In this way, in this second embodiment, if the data density obtained by dividing the number of training data by the value of the difference of the maximum value and the minimum value showing the preset range of the value of the operating parameter increases, the number of nodes of the hidden layer one layer before the output layer of the neural network is increased. That is, in this second embodiment, the number of nodes of the hidden layer one layer before the output layer of the neural network is increased in accordance with the increase in the data density obtained by dividing the number of training data by the value of the difference of the maximum value and minimum value showing the preset range of the value of the operating parameter.

On the other hand, as explained above, the routine proceeds from step 206 to step 207 when the training data density D reaches a preset data density Do. Therefore, at step 207, the value of ($A_n$–$C_n$) and the value of ($C_n$–$B_n$) used for calculation of the number of additional nodes a is proportional to the number of the teacher data. Therefore, as will be understood from the above equation, the number of additional nodes a becomes proportional to the number of training data in the range ($B_n$ to $C_n$) or range ($C_n$ to $A_n$) in which the new input value $x_n$ falls. That is, in this second embodiment, the number of nodes of the hidden layer one layer before the output layer of the neural network is increased in accordance with an increase of the number of training data obtained by actual measurement for the newly acquired values of the plurality of types of operating parameters relating to the internal combustion engine.

If at step 208 the number K of nodes of the hidden layer one layer before the output layer is made to increase by exactly the number of additional nodes α(K←K+α), the routine proceeds to step 209 where the neural network is updated so that the number K of nodes of the hidden layer one layer before the output layer is made to increase. Next, the routine proceeds to step 205. At step 205, the weights of the updated neural network are learned so that the difference between the output value "y" and the training data in which the training data newly obtained for the new input value "x" is also included, becomes smaller. That is, at step 205, the training data obtained by actual measurement for the newly acquired values of the plurality of types of operating parameters relating to the internal combustion engine and the training data found in advance by actual measurement of the values for the plurality of types of operating parameters relating to the internal combustion engine in the preset ranges Rn are used to learn the weights of the updated neural network so that the difference between the output value "y" changing in accordance with the values of the plurality of types of operating parameters relating to the internal combustion engine inside the preset ranges and outside the preset ranges and the training data corresponding to the values of the plurality of types of operating parameters relating to this internal combustion engine becomes smaller.

Now then, in the second embodiment of the present invention, the values An, Bn showing the preset ranges of the values of the plurality of types of operating parameters relating to the internal combustion engine are stored in advance in the ROM 32, that is, the above-mentioned storage unit. Further, learned weights and the training data found in advance by actual measurement of the values for the plurality of types of operating parameters relating to the internal combustion engine in the preset range Rn are stored in the RAM 33, that is, the above-mentioned storage unit.

Figure 15:
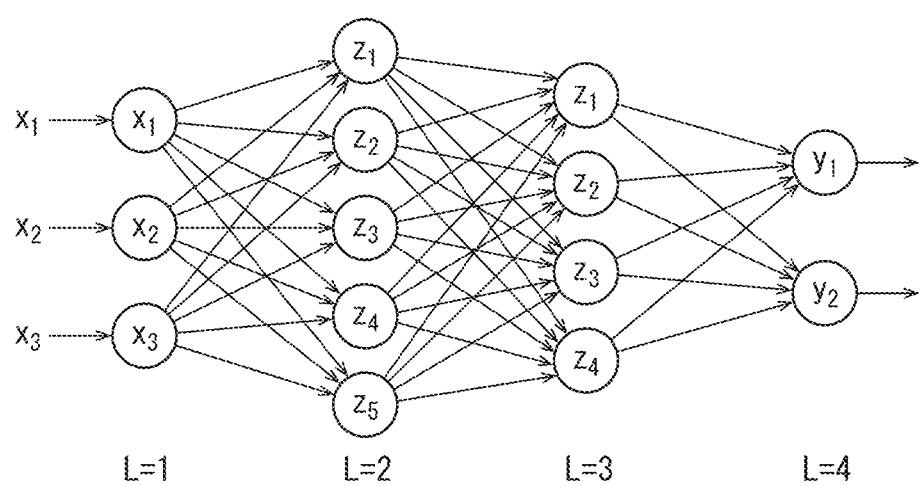
FIG. 15 is a view showing a modification of a neural network.

FIG. 15 shows a modification of the neural network used in the second embodiment according to the present invention. In this modification, the output layer (L=4) has two nodes. In this modification, in the same way as the example shown in FIG. 13, the input value $x_1$ is made the engine speed, the input value $x_2$ is made the accelerator opening degree, and the input value $x_3$ is made the outside air temperature. On the other hand, in this modification, one output amount $y_1$, in the same way as the example shown in FIG. 13, is made the output torque of the internal combustion engine, while the other output amount $y_2$ is made the thermal efficiency of the internal combustion engine. This thermal efficiency is calculated based on values detected at the time of actual operation of the engine such as the engine speed, engine load, intake air pressure, intake air temperature, exhaust gas pressure, exhaust gas temperature, and engine cooling water temperature. Therefore, this thermal efficiency shows the value obtained by actual measurement. In this modification as well, at the nodes of the output layer (L=4), an identity function is used as the activation function. Further, in this modification, as the error function E, the error sum of squares E shown by the above equation (8) having the actually measured value of the output torque of the internal combustion engine and the actually measured value of the thermal efficiency as training data is used. The error backpropagation algorithm is used to update the values of the weights "w" so that the value of the error function E is decreased.

As shown in FIG. 15, even if the output layer of the neural network (L=4) has a plurality of nodes, the form of the function output from the nodes of the output layer (L=4) is determined by the output value $z_1$, $z_2$, $z_3$, $z_4$ of the nodes of the hidden layer (L=3) one layer before the output layer (L=4). That is, by what kind of function the output values $y_1$, $y_2$ can be expressed is governed by the number of nodes of the hidden layer (L=3) one layer before the output layer (L=4). Therefore, in the neural network such as shown in FIG. 15, when increasing the number of the nodes of the hidden layers, the number of the nodes of the hidden layer (L=3) one layer before the output layer(L=4) is made to increase.

Figure 16:
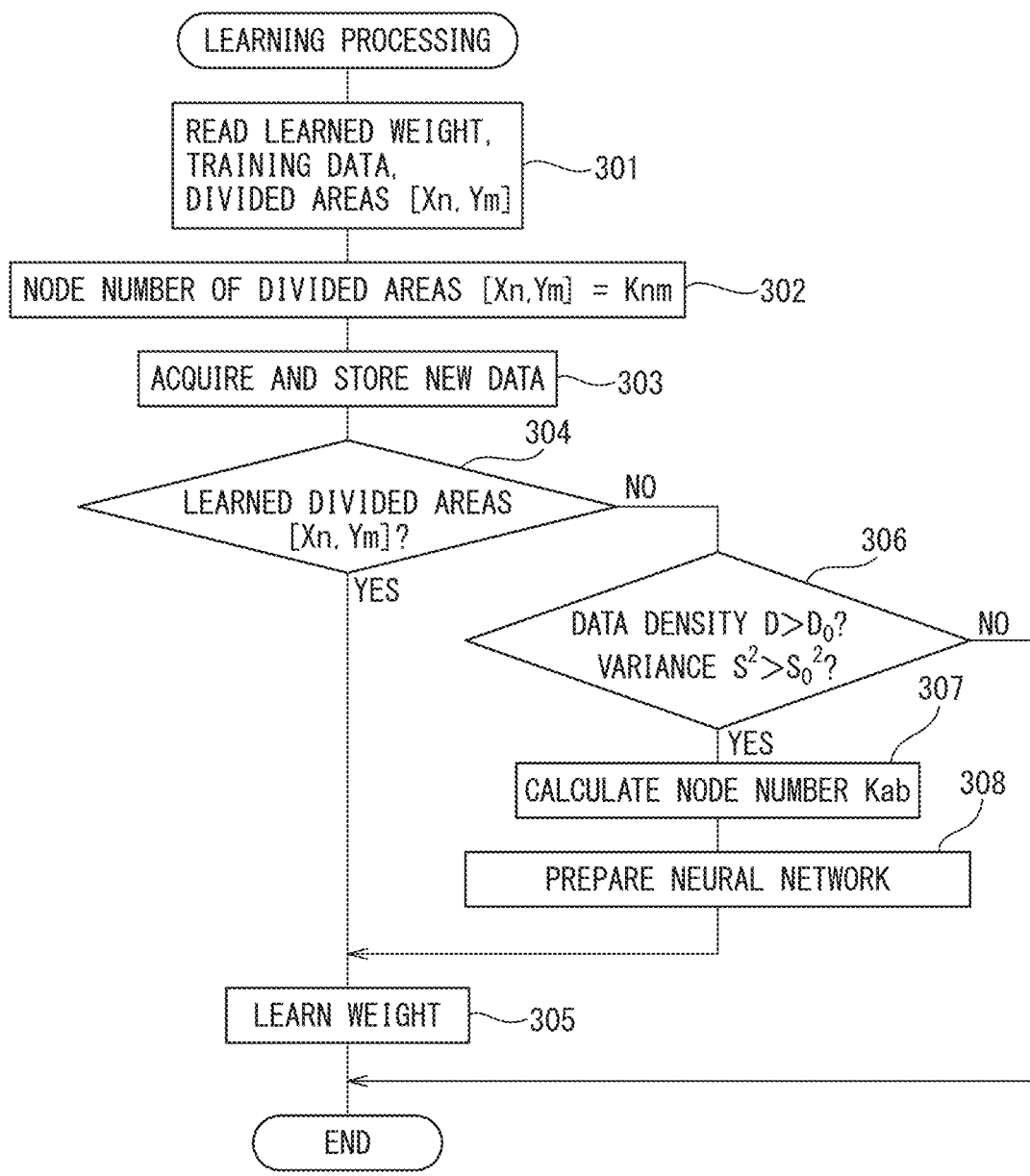
FIG. 16 is a flow chart showing still another embodiment for performing learning processing.
Figure 17:
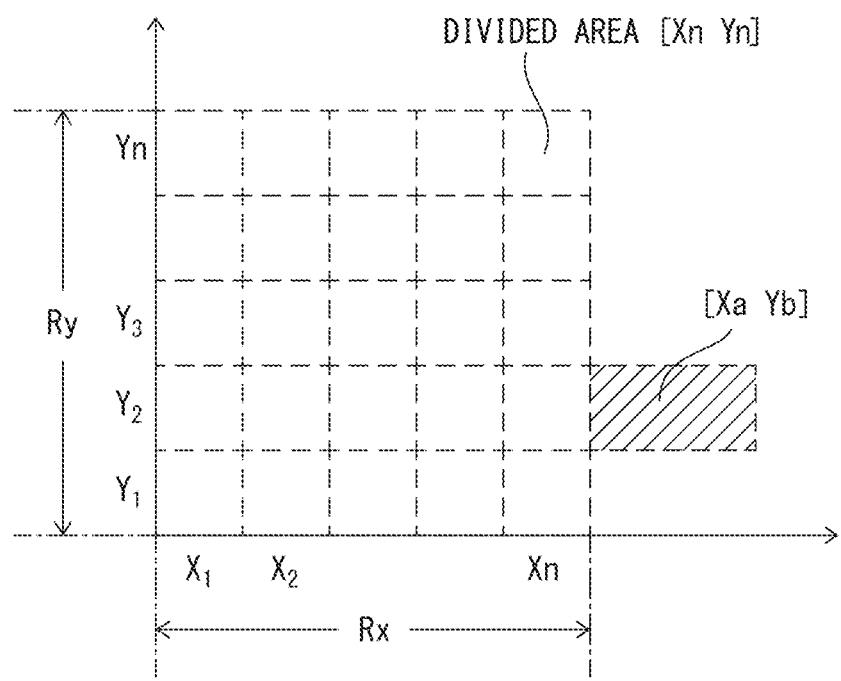
FIG. 17 is a view showing learned divided areas divided according to values of the operating parameters of the engine.

FIG. 16 and FIG. 17 show a third embodiment of a machine learning system according to the present invention. In this third embodiment as well, instead of the operating parameter relating to the internal combustion engine, there are a plurality of types of operating parameters. The weights of the neural network are learned based on the values of the plurality of types of operating parameters relating to the internal combustion engine. In this third embodiment as well, the ranges of values of the types of operating parameters are set for the plurality of types of operating parameters relating to the internal combustion engine. FIG. 17 shows as one example the case where the operating parameters relating to the internal combustion engine are comprised of two types of operating parameters. In FIG. 17, the preset range of the value of one type of operating parameter is shown by Rx, while the preset range of the value of the other type of operating parameter is shown by Ry. In this third embodiment, as shown in FIG. 17, the preset ranges Rx, Ry of the values of the types of operating parameters are divided into a plurality of sections and a plurality of divided areas [Xn, Ym] (n=1, 2 . . . n, m=1, 2 . . . m) defined by combinations of divided ranges in which the values of the types of operating parameters are divided are preset.

Note that, in FIG. 17, X1, X2 . . . Xn and Y1, Y2 . . . Yn respectively show divided ranges of values of types of operating parameters. Further, in this third embodiment, as a specific example, the case is shown where the operating parameters of the internal combustion engine are comprised of the engine speed and the outside air temperature and where a neural network model is constructed for estimating the amount of HC emission from the internal combustion engine based on the values of these operating parameters of the internal combustion engine. In this case, X1, X2 . . . Xn, for example, show the engine speed divided into 1000 rpm sections (1000 rpm≤X1<2000 rpm, 2000 rpm≤X2<3000 rpm . . . ), while Y1, Y2 . . . Yn, for example, show the outside air temperature divided into 10° C. sections (−30° C.≤Y1<−20° C., −20° C.≤Y2<−10° C. . . . ).

In this third embodiment, an independent neural network is prepared for each divided area [Xn, Ym]. In each of these neural networks, the input layer (L=1) is comprised of two nodes. At the nodes of the input layer (L=1), an input value $x_1$ showing the engine speed and an input value $x_2$ showing the outside air temperature are input. Further, the number of the hidden layers (L=2 and L=3) may be made one or any other number. The numbers of the nodes of the hidden layers (L=2 and L=3) can also be made any numbers. Note that, in each neural network, the number of nodes of the output layer (L=4) is made one node. Note that, in this third embodiment as well, as the modification, the number of nodes of the output layer (L=4) can be made two. In this case, for example, the output amount from one node of the output layer (L=4) is made the amount of HC emission from the internal combustion engine, while the output amount from the other node of the output layer (L=4) is made the amount of NOx emission from the internal combustion engine.

In this third embodiment, the number of nodes of the hidden layer (L=3) differs for each neural network. Below, the number of nodes of the hidden layer one layer before the output layer of the neural network of the divided area [Xn, Ym] will be indicated by "Knm". This number Knm of nodes of the hidden layer is set in advance in accordance with the complexity of change of the training data for the change of the input values in the divided area [Xn, Ym]. Note that, in this third embodiment, instead of the $NO_X$ sensor 23 shown in FIG. 1, an HC sensor is arranged in the exhaust passage. In this third embodiment, the amount of HC emission from the engine is actually measured by this HC sensor, and the amount of HC emission obtained by this actual measurement is made the training data. Note that, in the above modification of the third embodiment, an HC sensor is arranged in the exhaust passage in addition to the $NO_X$ sensor 23 shown in FIG. 1.

In this third embodiment, the amounts of HC emission actually measured for the various input values $x_1$, $x_2$ in each divided area [Xn, Ym] (n=1, 2 . . . n, m=1, 2 . . . m) formed in the preset ranges Rx, Ry of values of the plurality of types of operating parameters relating to the internal combustion engine are found in advance as training data. That is, the training data is found in advance by actual measurement of the values of a plurality of types of operating parameters relating to the internal combustion engine in the preset ranges Rx, Ry. From these values of the plurality of types of operating parameters relating to the internal combustion engine and training data, the structure of the neural network for each divided area [Xn, Ym], including also the number Knm of nodes of the hidden layers, is determined. The weights of the neural network of each divided area [Xn, Ym] are learned in advance so that the difference between the output value "y" and the training data corresponding to the values of the plurality of types of operating parameters relating to the internal combustion engine becomes smaller. Therefore, in this third embodiment, the divided areas [Xn, Ym] (n=1, 2 ... n, m=1, 2 ... m) learned in advance will be referred to below as "learned divided areas [Xn, Ym]". Note that, the training data found in advance by actual measurement for the values of the plurality of operating parameters relating to the internal combustion engine in the preset ranges Rx, Ry is stored in the storage unit of the electronic control unit 30. In this third embodiment as well, for each of the divided areas [Xn, Ym], a neural network of the same structure as the neural network used in the advance learning is used and the weights of the neural network when learning has finished are used for further learning onboard during vehicle operation. FIG. 16 shows the learning processing routine of the third embodiment performed onboard. This learning processing routine is executed by interruption every fixed time period, for example, every second.

Referring to FIG. 16, first, at step 301, the learned weights stored in the storage unit of the electronic control unit 30, the training data used in the advance learning, that is, the training data found in advance by actual measurement for the values of the plurality of types of operating parameters relating to the internal combustion engine in the preset ranges Rx, Ry, and the learned divided areas [Xn, Ym] (n=1, 2 ... n, m=1, 2 ... m) are read. The learned weights are used as the initial values of the weights. Next, at step 302, the number of nodes Knm of the hidden layer one layer before the output layer which had been used in the advance learning for each learned divided area [Xn, Ym] is read. Next, the routine proceeds to step 303 where new input values $x_1$, $x_2$, that is, new values of the plurality of types of operating parameters relating to the internal combustion engine, are acquired. The new input values $x_1$, $x_2$, that is, the new values of the plurality of types of operating parameters relating to the internal combustion engine, are stored in the storage part of the electronic control unit 30. Furthermore, at step 303, the actually measured values of the amounts of HC emission for the new input values $x_1$, $x_2$ are stored as training data in the storage unit of the electronic control unit 30. That is, at step 303, the training data obtained by actual measurement for the newly acquired values of the plurality of types of operating parameters relating to the internal combustion engine is stored in the storage unit of the electronic control unit 30.

Next, at step 304, it is judged if the new input values $x_1$, $x_2$ are in the learned divided area [Xn, Ym], that is, if the newly acquired values of the plurality of types of operating parameters relating to the internal combustion engine are in the preset ranges Rx, Ry. When the new input values $x_1$, $x_2$ are in the learned divided area [Xn, Ym], that is, when the newly acquired values of the plurality of types of operating parameters relating to the internal combustion engine are in the preset ranges Rx, Ry, the routine proceeds to step 305 where the input values $x_1$, $x_2$, that is, the newly acquired values of the plurality of types of operating parameters relating to the internal combustion engine, are input to the nodes of the input layer of the neural network of the learned divided area [Xn, Ym] in which the newly acquired values of the plurality of types of operating parameters relating to the internal combustion engine fall. Based on the output value "y" output from the node of the output layer of the neural network and the training data found by actual measurement for the newly acquired values of the plurality of types of operating parameters relating to the internal combustion engine, the error backpropagation algorithm is used to further learn the weights of the neural network of the learned divided area [Xn, Ym] in which the newly acquired values of the plurality of types of operating parameters relating to the internal combustion engine fall so that the difference between the output value "y" and the training data becomes smaller.

On the other hand, when at step 304 it is judged that the new input values $x_1$, $x_2$ are not inside the learned divided area [Xn, Ym], for example, in FIG. 17, a not yet learned area [Xa, Yb] in which the input values x1, x2 fall and defined by the combination of the preset ranges of the input values x1, x2 is set outside of the learned divided areas [Xn, Ym]. That is, in other words, when the value of at least one type of operating parameter among the newly acquired values of the plurality of types of operating parameters relating to the internal combustion engine is outside the preset ranges Rx, Ry, a not yet learned area [Xa,Yb] in which the value of each type of operating parameter falls and defined by the combination of the preset range of each type of operating parameter is set outside the preset range Rx, Ry.

The example shown in FIG. 17 shows the case of falling in the divided range Y2 where the newly acquired value of one type of operating parameter relating to the internal combustion engine is outside the preset range Rx and the newly acquired value of another type of operating parameter relating to the internal combustion engine is inside the preset range Ry. In this case, this not yet learned area [Xa, Yb] is set adjoining the learned divided area [Xn, Ym] inside the divided range Y2 at the outside of the range Rx present for the value of one type of operating parameter and at the inside of the divided range Y2 in which the value of the other type of operating parameter falls.

If a not yet learned area [Xa, Yb] is set, the routine proceeds to step 306. At step 306, first, the training data density D in the not yet learned area [Xa, Yb] in which the new input values x1, x2 fall is calculated. This training data density D (=number of training data/[Xa, Yb]) shows the value obtained by dividing the number of training data by the area of the not yet learned area [Xa, Yb], that is, the product of the preset ranges of the values of the types of the operating parameters. Next, it is judged if the training data density D becomes higher than a predetermined data density $D_0$ and if a variance $S^2$ of training data in the new area [Xa, Yb] in which the new input values $x_1$, $x_2$ fall is larger than a predetermined variance $S^2_0$. If the training data density D is lower than the preset data density $D_0$ or if the variance $S^2$ of the training data is smaller than the preset variance $S^2_0$, the processing cycle is completed.

On the other hand, when at step 306 it is judged that the training data density D is higher than the predetermined data density $D_0$ or if the variance $S^2$ of the training data is larger than the predetermined variance $S^2_0$, the processing cycle proceeds to step 307. Note that, at step 306, it is possible to omit judgment of whether the variance $S^2$ is greater than the preset variance $S^2_0$ and judge only if the training data density D becomes higher than the preset data density $D_0$. In this case, if the training data density D is lower than the preset data density $D_0$, the processing cycle ends, while if the training data density D is higher than the preset data density $D_0$, the routine proceeds to step 307. At step 307, based on the following equation for calculation of the number of nodes, the number Kab of nodes for the not yet learned area [Xa, Yb] is calculated from the mean value of the numbers Knm of nodes at the learned divided areas [Xn, Ym] around the not yet learned area [Xa, Yb]:

$$\text{Number } K_{ab} \text{ of nodes} = 1/N \Sigma\Sigma K_{ij}(i=(a-1) \text{ to } (a+1), j=(b-1) \text{ to } (b+1))$$

Note that, in the above equation, N shows the number of learned divided areas [Xn, Ym] present around the not yet learned area [Xa, Yb]. In this case, if, among the divided areas [Xn, Ym] around the not yet learned area [Xa, Yb], there is a still not used divided area [Xn, Ym], that is, a divided area [Xn, Ym] with no number Knm of nodes, that divided area [Xn, Ym] is excluded from calculation of the number N. For example, explaining this by the example shown in FIG. 15, the mean value of the number of nodes Kn1 of the learned divided area [Xn, $Y_1$], the number of nodes Kn2 of the learned divided area [Xn, $Y_2$], and the number of nodes Kn3 of the learned divided area [Xn, $Y_3$] around the not yet learned area [Xa, Yb] is made the number of nodes Kab for the not yet learned area [Xa, Yb].

In this regard, if the relationship of the change of training data with respect to a change of an input value in each divided area [Xn, Ym] is simple, it is possible to sufficiently perform learning even if the number of nodes Knm of the hidden layer is reduced, but if the relationship of the change of the training data with respect to a change in an input value in each divided area [Xn, Ym] is complicated, it is not possible to sufficiently perform learning unless increasing the number of nodes Knm of the hidden layer. Therefore, as explained above, the number of nodes Knm of a hidden layer of a neural network at a learned divided area [Xn, Ym] is set corresponding to the complexity of the change of the training data with respect to a change in an input value in each learned divided area [Xn, Ym]. In this regard, when two divided areas [Xn, Ym] are close, the relationships of the change of training data with respect to a change of an input value are similar between these divided areas [Xn, Ym]. Therefore, when the two divided areas [Xn, Ym] are close, it is possible to use the same number as the number of nodes Knm of the hidden layer. Therefore, in this third embodiment, the mean value of the numbers of nodes Knm at the learned divided areas [Xn, Ym] around the not yet learned area [Xa, Yb] is made the number of nodes Kab for the not yet learned area [Xa, Yb].

Here, as a modification of the third embodiment, a method taking into consideration the number of training data at the not yet learned area [Xa, Yb] to find the number of nodes Kab for the not yet learned area [Xa, Yb] will be simply explained. That is, if the number of training data in the not yet learned area [Xa, Yb] is greater than the number of training data in the learned divided areas [Xn, Ym] around the not yet learned area [Xa, Yb], the number of nodes Kab for the not yet learned area [Xa, Yb] is preferably made larger than the numbers of nodes Knm at the learned divided areas [Xn, Ym] around the not yet learned area [Xa, Yb]. Therefore, in this modification, the mean value MD of the numbers of training data at the learned areas [Xn, Ym] around the not yet learned area [Xa, Yb] is found and the number of input data Mn in the not yet learned area [Xa, Yb] is divided by the mean value MD to find the rate of increase of number of nodes RK (=MN/MD). The number of nodes Kab for the not yet learned area [Xa, Yb] found from the above equation for calculation of number of nodes is multiplied with this rate of increase of number of nodes RK to obtain the final number of nodes Kab for the final not yet learned area [Xa, Yb].

If at step 307 the number of nodes Kab of the not yet learned area [Xa, Yb] is calculated, the routine proceeds to step 308 where a new neural network is prepared for the not yet learned area [Xa, Yb]. In this new neural network, the number of nodes is made two nodes for the input layer, is made Kab number for the hidden layer one layer before the output layer, and is made one or more for the output layer. Next, the routine proceeds to step 305. At step 305, the weight of the neural network prepared for the not yet learned area [Xa, Yb] is learned so that in the not yet learned area [Xa, Yb], the difference between the output value "y" and training data becomes smaller.

Next, referring to FIG. 18A to FIG. 19B, a specific example of application of the machine learning system according to the present invention to a special internal combustion engine for low load use will be explained. In this specific example, as shown in FIG. 12, a neural network in which the hidden layer (L=3) has four nodes is used to prepare a model outputting an output value "y" showing the amount of $NO_X$ emission from the opening degree of the throttle valve 12, engine speed, and ignition timing. Note that, in the internal combustion engine used in this specific example, the range of use of the opening degree of the throttle valve 12 is set to 5.5° to 11.5° (opening degree of throttle valve 12 at maximum valve closing position designated as) 0°. The range of use of the engine speed is set to 1600 (rpm) to 3000 (rpm), while the range of use of the ignition timing is set to 0° (compression top dead center) to 40° ATDC (after compression top dead center).

Figure 18A:
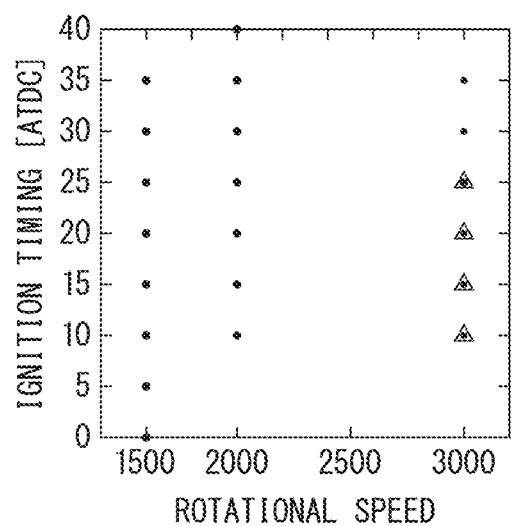
FIG. 18A, FIG. 18B, and FIG. 18C respectively are views showing the distribution of training data with respect to the engine speed and the ignition timing, the distribution of training data with respect to the ignition timing and the throttle opening degree, and the relationship of the training data and a learned output value.
Figure 18B:
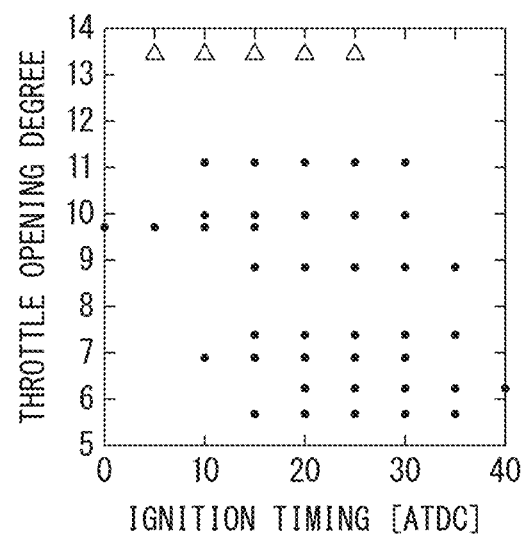

FIG. 18A shows the distribution of training data with respect to the ignition timing and engine speed, while FIG. 18B shows the distribution of training data with respect to the throttle valve opening degree and ignition timing. Note that, in FIG. 18A and FIG. 18B, the black circles show the locations of existence of the training data acquired in advance, while the triangle marks show the locations where training data is not obtained in advance. From FIG. 18A and FIG. 18B, it will be understood for what kinds of throttle valve opening degrees, what kinds of engine speeds, and what kinds of ignition timings the training data is acquired in advance. For example, it will be understood that in FIG. 18A, the training data is acquired in advance when the engine speed N is 2000 (rpm) and the ignition timing is ATDC20°, while as shown in FIG. 18B, the training data is acquired in advance for various throttle valve opening degrees when the ignition timing is ATDC20°.

Figure 18C:
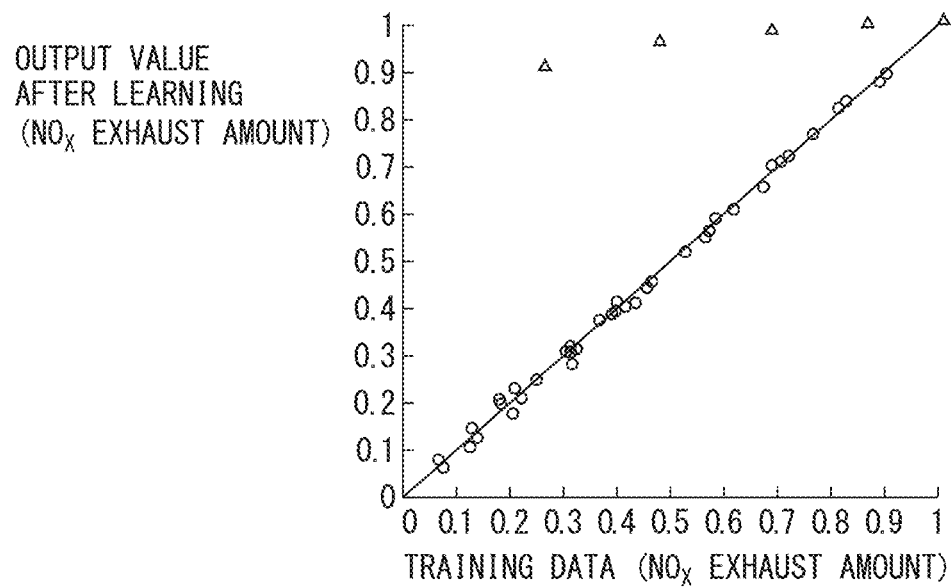
Figure 19A:
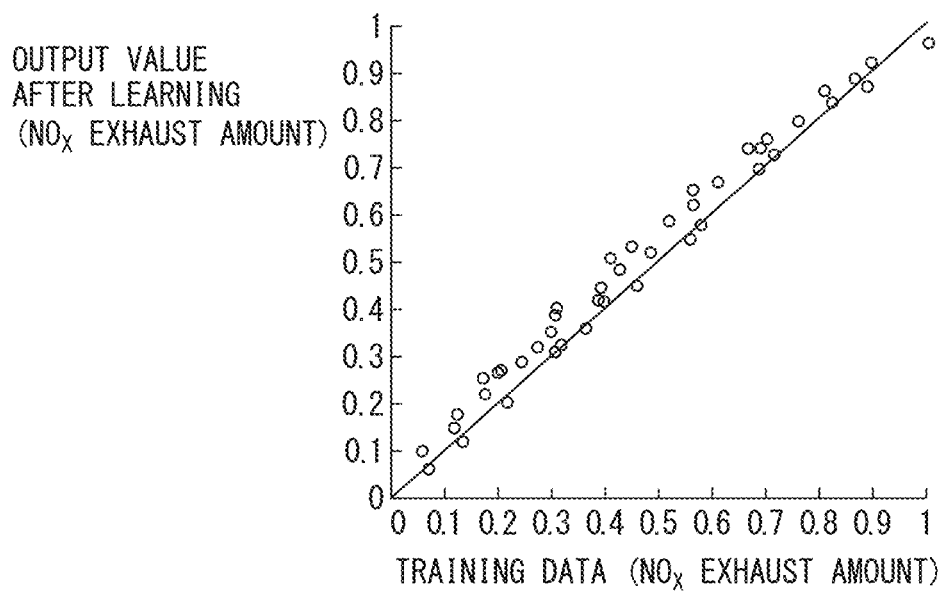
FIG. 19A and FIG. 19B are views showing the relationships between training data and learned output values.
Figure 19B:
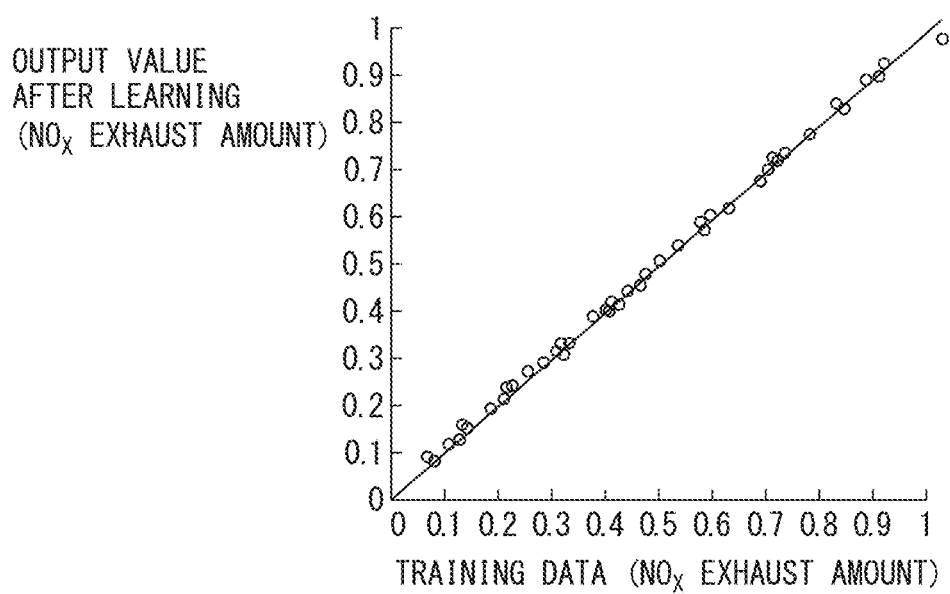

On the other hand, in this specific example, the throttle valve opening degree, engine speed, and ignition timing are input to the nodes of the input layer (L=1) of the neural network and the weights of the neural network are learned so that the difference between the output value "y" and the training data showing the amount of $NO_X$ emission detected by the $NO_X$ sensor 23 becomes smaller. The relationship between the learned output value "y" and the training data is shown in FIG. 18C, FIG. 19A, and FIG. 19B. Note that, in FIG. 18C, FIG. 19A, and FIG. 19B, the values of the learned output value "y" and training data are shown normalized so that their maximum values become 1.

Now then, as explained above, in the internal combustion engine used in this specific example, the range of use of the opening degree of the throttle valve 12 is set from 5.5° to 11.5°, the range of use of the engine speed N is set from 1600 (rpm) to 3000 (rpm), and the range of use of the ignition timing is set from 0° (compression top dead center) to ATDC40°. FIG. 18C shows by circle marks the relationship between the learned output value "7" and the training data when the amount of $NO_X$ emission when the throttle valve opening degree, engine speed N, and ignition timing are used in these ranges of use is acquired in advance as training data and the weights of the neural network are learned so that the difference between the output value "y" and the previously acquired training data becomes smaller.

As shown in FIG. 18C, the circle marks showing the relationship between the learned output value "y" and the training data cluster about a single straight line. Therefore, it will be understood that the learned output value "y" is made to match the training data. In this regard, for example, if mentioning the opening degree of the throttle valve 12 as an example, the opening degree of the throttle valve 12 will sometimes end up deviating from the proper opening degree due to individual differences in engines and aging. Even if the range of use of the opening degree of the throttle valve 12 were set to from 5.5° to 11.5°, in actuality the opening degree of the throttle valve 12 would sometimes end up exceeding the preset range of use. The triangle marks shown in FIG. 18A and FIG. 18B show the locations of training data newly acquired when the opening degree of the throttle valve 12 exceeds the preset range of use and ends up becoming 13.5°.

The triangle marks of FIG. 18C show the case of not using the training data newly acquired when the opening degree of the throttle valve 12 exceeds a preset range of use and ends up becoming 13.5°, but just using the training data acquired in advance to learn the weights of the neural network. In this case, it will be understood that the estimated value of the amount of $NO_X$ emission when the opening degree of the throttle valve 12 exceeds a preset range of use and ends up becoming 13.5° ends up greatly deviating from the actually measured value. On the other hand, the circle marks in FIG. 19A show the case of using both training data of the new teacher data acquired when the opening degree of the throttle valve 12 exceeds a preset range of use and ends up becoming 13.5° and the training data acquired in advance to learn the weights of the neural network. In this case, it will be understood that the estimated value of the amount of $NO_X$ emission ends up deviating from the actually measured value overall.

As opposed to this, the circle marks in FIG. 19B, in the same way as FIG. 19A, show the case of using both training data of the new teacher data acquired when the opening degree of the throttle valve 12 exceeds a preset range of use and ends up becoming 13.5° and the training data acquired in advance and, unlike in FIG. 19A, increasing the number of nodes of the hidden layer (L=3) of the neural network from four to seven, then learning the weights of the neural network. In this case, it will be understood that the estimated value of the amount of $NO_X$ emission matches the actually measured value with a good precision. When in this way the newly acquired value of an operating parameter of the engine is outside the preset range, it is possible to make the number of nodes of the hidden layer one layer before the output layer of the neural network increase so as to raise the precision of estimation.

FIG. 20 to FIG. 25 show a fourth embodiment of the case of application of the machine learning system according to the present invention to automatic regulation of an air-conditioner (AC). In this embodiment, the optimal flow rate, flow direction, and operating time of the air-conditioner are automatically set from the air temperature, humidity, position, and size of the room in which the air-conditioner is installed. In this case, the range of conditions and location at which the air-conditioner is used, that is, the ranges of use of the values of the air temperature, humidity, position, size of the room in which the air-conditioner is installed, and other operating parameters can be estimated in advance in accordance with the type of the air-conditioner. Therefore, usually, the weights of the neural network are learned in advance for the preset ranges of the values of the operating parameters of the air-conditioner so that the differences between the output value of the neural network and the optimum flow rate, flow direction, and operating time of the air-conditioner becomes smaller.

However, in this case as well, sometimes the values of the operating parameters of the air-conditioner are outside the preset ranges. In this case, learning based on actual values is not performed outside the preset ranges, so the output values calculated using the neural network sometimes end up greatly deviating from the actual values. Therefore, in this embodiment as well, when the newly acquired values of the operating parameters relating to the air-conditioner are outside the preset ranges, the number of nodes of the hidden layer one layer before the output layer of the neural network is made to increase or the number of neural networks is increased and the training data obtained for the newly acquired values of the operating parameters relating to the air-conditioner and the training data obtained for values of the operating parameters relating to the air-conditioner in the preset ranges are used to learn the weights of the neural network.

Figure 20:
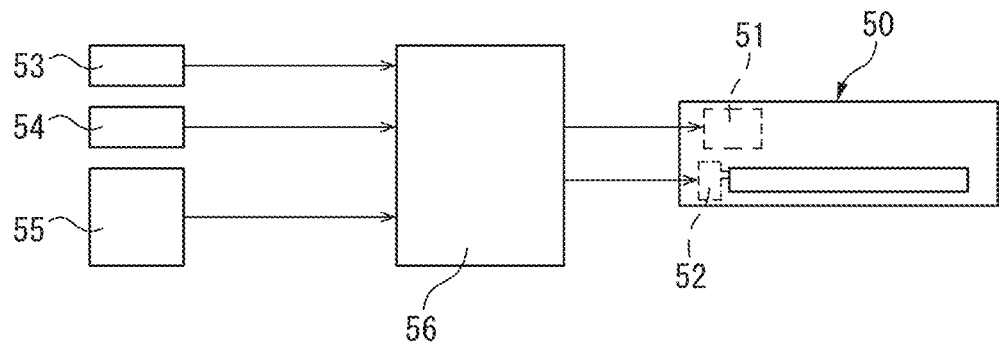
FIG. 20 is an overview of a machine learning system for automatic regulation of an air-conditioner.

Next, this fourth embodiment will be specifically explained. Referring to FIG. 20, 50 indicates an air-conditioner body, 51 indicates a blower motor arranged in the air-conditioner body 50, 52 indicates a flow direction adjustment motor arranged inside the air-conditioner body 50, 53 indicates a thermometer for detecting the air temperature, 54 indicates a hydrometer for detecting the humidity of the atmosphere, 55 indicates a GPS for detecting the position at which the air-conditioner is installed, and 56 indicates an electronic control unit having a configuration similar to the electronic control unit 30 shown in FIG. 1. As shown in FIG. 20, the air temperature detected by the thermometer 53, the humidity of the atmosphere detected by the hydrometer 54, and the positional information detected by the GPS 55 are input to the electronic control unit 56. The electronic control unit 56 outputs a drive signal of the blower motor 51 for obtaining the optimal flow rate of the air-conditioner and a drive signal of the flow direction adjustment motor 52 for obtaining the optimal direction of flow of the air-conditioner. Note that, the size of the room in which the air-conditioner is installed is, for example, manually input to the electronic control unit 56.

Figure 21:
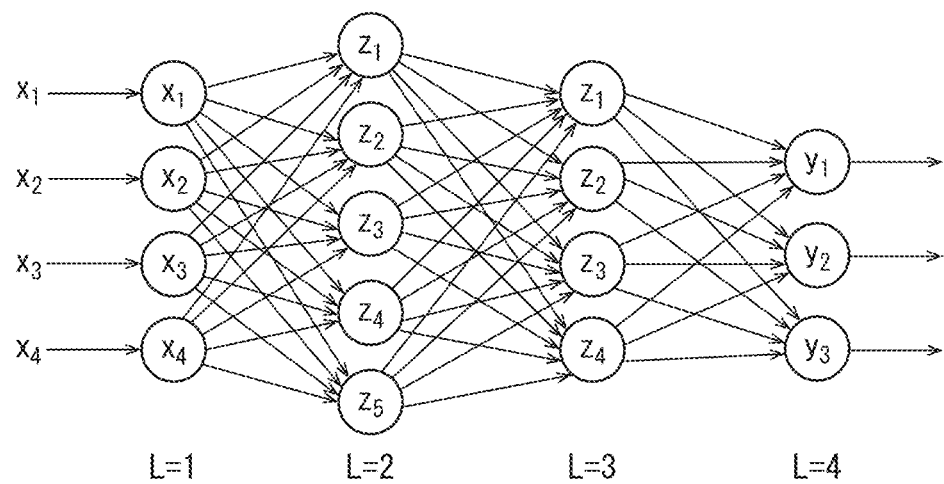
FIG. 21 is a view showing a neural network.

FIG. 21 shows the neural network used in this fourth embodiment. In this fourth embodiment, as shown in FIG. 21, the input layer (L=1) of the neural network is comprised of four nodes. Each node receives as input the input value $x_1$ showing the air temperature, the input value $x_2$ showing the humidity, the input value $x_3$ showing the position, and the input value $x_4$ showing the size of the room in which the air-conditioner is installed. Further, the number of hidden layers (L=2, L=3) may be made one or any other number, while the number of nodes of the hidden layers s(L=2, L=3) may also be made any number. Further, in this fourth embodiment, the output layer (L=4) is comprised of three nodes. The nodes output the output value $y_1$ showing the flow rate of the air-conditioner, the output value $y_2$ showing the direction of flow of the air-conditioner, and the output value $y_3$ showing the operating time of the air-conditioner.

On the other hand, in FIG. 22A, $A_1$ to $B_1$, that is, $R_1$, shows the preset range of the air temperature (for example, −5° C. to 40° C.), $A_2$ to $B_2$, that is, $R_2$, shows the preset range of the humidity (for example, 30% to 90%), $A_3$ to $B_3$, that is, $R_3$, shows the preset range of the position (for example, north latitude 20 degrees and 46 degrees), and $A_4$ to $B_4$, that is, $R_4$, shows the preset range of the size of the room in which the air-conditioner is installed. Note that, in FIG. 22B as well, in the same way as FIG. 22A, $A_1$ to $B_1$ shows the preset range of the air temperature, $A_2$ to $B_2$ shows the preset range of the humidity, $A_3$ to $B_3$, shows the preset range of the position, and $A_4$ to $B_4$ shows the preset range of the size of the room in which the air-conditioner is installed.

In this fourth embodiment as well, for the various input values $x_n$ (n=1, 2, 3, 4) in the preset ranges Rn, the actually measured optimal flow rate, flow direction, and operating time of the air-conditioner are found in advance as training data. That is, the training data is found in advance by actual measurement for the values of the plurality of types of operating parameters relating to the air-conditioner in the preset ranges Rn. The structure of the neural network is determined from these values of the plurality of types of operating parameters relating to the air-conditioner and training data. The weights of the neural network are learned in advance so that the differences between the output values $y_1$, $y_2$, $y_3$ and the training data corresponding to the values of the plurality of types of operating parameters relating to the air-conditioner become smaller. The training data found in advance by actual measurement for the values of the plurality of types of operating parameters relating to the air-conditioner in the preset ranges Rn is stored in the storage unit of the electronic control unit 56.

Figure 23:
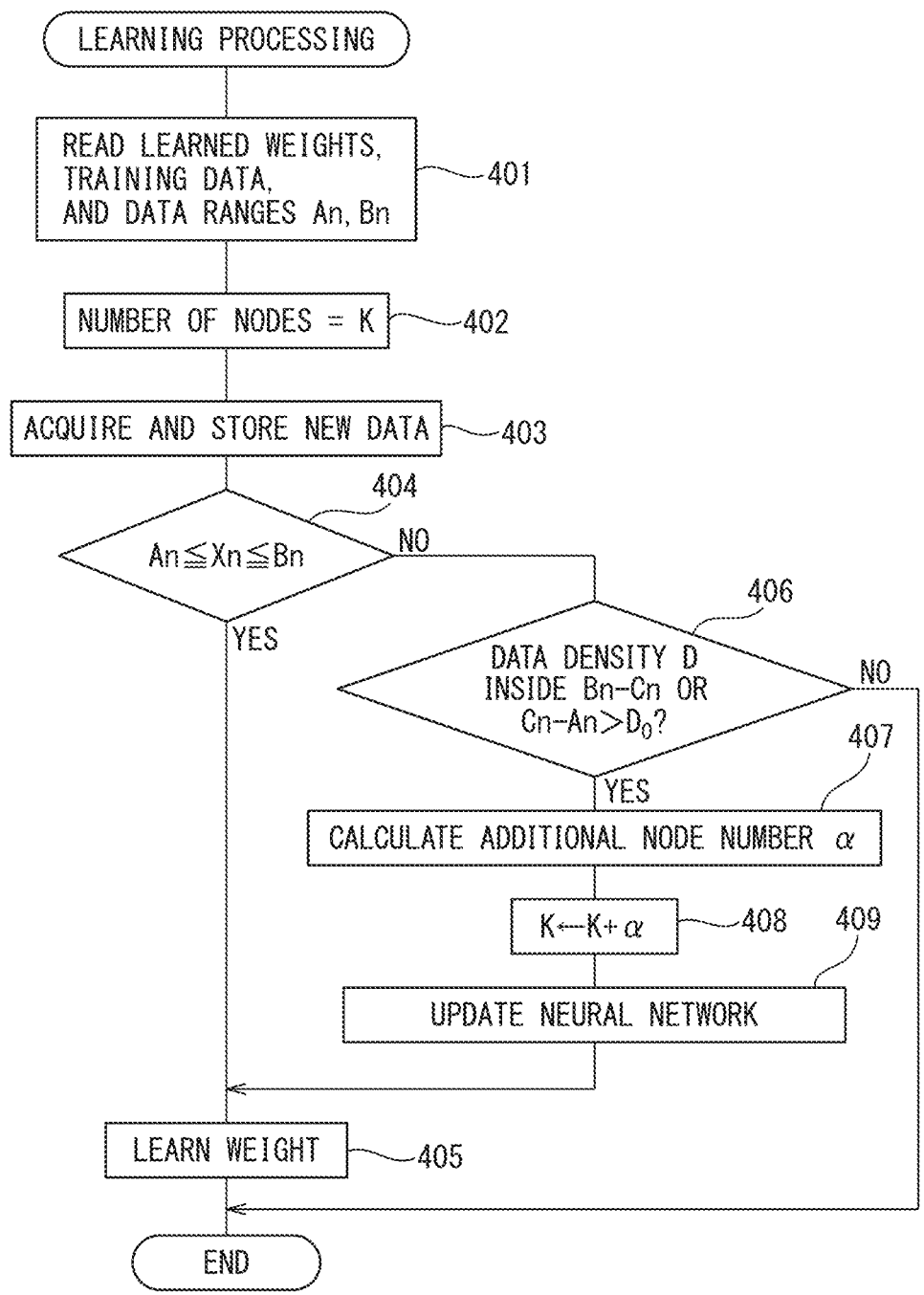
FIG. 23 is a flow chart showing still another embodiment for performing learning processing.

In this fourth embodiment as well, a neural network of the same structure as the neural network used in the advance learning is used and the weights of the neural network when learning is finished are used for further learning during the operation of the air-conditioner. FIG. 23 shows the learning processing routine of the fourth embodiment performed during the operation of the air-conditioner. This learning processing routine is performed by interruption every certain time interval, for example, every second. Note that, the processing performed at the steps of the learning processing routine shown in FIG. 23 is the same as the processing performed at the steps of the learning processing routine shown in FIG. 12 except for the types of the input values and the number of the input values and for the types of the output values and the number of the output values.

That is, referring to FIG. 23, first, at step 401, the learned weights stored in the storage part of the electronic control unit 56, the training data used in the advance learning, that is, the training data found in advance by actual measurement for the values of the plurality of types of operating parameters relating to the air-conditioner in the preset ranges Rn, and the ranges of the input data, that is, the values An, Bn (n=1, 2, 3, 4) showing the preset ranges of the values of the plurality of types of operating parameters relating to the air-conditioner (FIG. 22A), are read. The learned weights are used as initial values of the weights. Next, at step 402, the number K of nodes of the hidden layer one layer before the output layer of the neural network used in the advance learning is read. Next, the routine proceeds to step 403 where new input values "x", that is, new values of the plurality of types of operating parameters relating to the air-conditioner, are acquired. The new input values "x", that is, the new values of the plurality of types of operating parameters relating to the air-conditioner, are stored in the storage unit of the electronic control unit 56. Further, at step 403, the actually measured values of the flow rate, flow direction, and operating time of the air-conditioner for the new input values "x" are stored as training data in the storage unit of the electronic control unit 56. That is, at step 403, the training data obtained by actual measurement for the newly acquired values of the plurality of types of operating parameters relating to the air-conditioner is stored in the storage unit of the electronic control unit 56.

Next, at step 404, it is judged if the new input values $x_n$, that is, the newly acquired values of the plurality of types of operating parameters relating to the air-conditioner, are in the preset ranges Rn (between An and Bn), that is, if the new input values $x_n$ are An or more and Bn or less. When the new input values $x_n$ are inside the preset ranges Rn, the routine proceeds to step 405 where the input values $x_n$, that is, the newly acquired values of the plurality of types of operating parameters relating to the air-conditioner, are input to the corresponding nodes of the input layer of the neural network. Based on the output values $y_1$, $y_2$, $y_3$ output from the nodes of the output layer of the neural network and the training data found by actual measurement for the newly acquired values of the plurality of types of operating parameters relating to the air-conditioner, the error backpropagation algorithm is used to learn the weights of the neural network so that the differences between the output values $y_1$, $y_2$, $y_3$ and the training data become smaller.

On the other hand, when at step 404 it is judged that a new input value $x_n$, that is, the value of at least one type of operating parameter among the newly acquired values of the plurality of types of operating parameters relating to the air-conditioner, is not in the preset range Rn (between An and Bn), for example, when in FIG. 22B the input value $x_1$ showing the air temperature is in the preset range ($B_1$ to $C_1$) from $B_1$ to $C_1$ ($B_1 < C_1$) or when in FIG. 22B the input value $x_3$ showing the position is in the preset range ($C_3$ to $A_3$) from $C_3$ to $A_3$ ($C_3 < A_3$), the routine proceeds to step 406. At step 406, first the density D of the training data with respect to the new input values $x_n$ in the range ($B_n$ to $C_n$) or the range ($C_n$ to $A_n$) of the new input values $x_n$ (=number of training data/($C_n - B_n$) or number of training data/($A_n - C_n$)) is calculated. The definition of this training data density D is as explained above. If at step 406 the training data density D is calculated, it is judged if the training data density D becomes higher than the preset data density $D_0$. If the training data density D is lower than the preset data density $D_0$, the processing cycle ends.

On the other hand, when at step 406 it is judged that the training data density D becomes higher than the preset data density $D_0$, the routine proceeds to step 407. In this case, when D (=number of training data/($A_n - C_n$))>$D_0$, the following equation is used to calculate the number of additional nodes α:

Number of additional nodes α=round{($K$/($Bn-An$))·($An-Cn$)}

On the other hand, when D (=number of training data/($C_n - B_n$))>$D_0$, the following equation is used to calculate the number of additional nodes α:

Number of additional nodes α=round{($K$/($Bn-An$))·($Cn-Bn$)}

Note that, in the above equations, "K" shows the number of nodes, while "round" means to round off.

If at step 407 the number of additional nodes α is calculated, the routine proceeds to step 408 where the number K of nodes of the hidden layer one layer before the output layer of the neural network is updated and the number K of nodes of the hidden layer one layer before the output layer is made to increase by exactly the number of additional nodes α (K←K+α). In this way, in this fourth embodiment, if the data density obtained by dividing the number of training data by the value of the difference of the maximum value and minimum value showing the preset range of the value of the operating parameter increases, the number of nodes of the hidden layer one layer before the output layer of the neural network is increased. That is, in this fourth embodiment, the number of nodes of the hidden layer one layer before the output layer of the neural network is increased in accordance with the increase of the data density obtained by dividing the number of training data by the value of the difference of the maximum value and minimum value showing the preset range of the value of the operating parameter.

If at step 408 the number K of nodes of the hidden layer one layer before the output layer is made to increase by exactly the number of additional nodes α (K←K+α), the routine proceeds to step 409 where the neural network is updated so as to make the number K of nodes of the hidden layer one layer before the output layer increase. At step 405, the weights of the updated neural network are learned so that the differences of the output values $y_1$, $y_2$, $y_3$ and training data in which the training data newly obtained for the new input values "x" is included become smaller. That is, at step 405, the training data obtained by actual measurement for the newly acquired values of the plurality of types of operating parameters relating to the air-conditioner and the training data found in advance by actual measurement for the values of the plurality of types of operating parameters relating to the air-conditioner in the preset ranges Rn are used to learn the weights of the updated neural network so that the differences between the output values $y_1$, $y_2$, $y_3$ changing in accordance with the values of the plurality of types of operating parameters relating to the air-conditioner inside of the preset ranges and outside of the preset ranges and the training data corresponding to the values of the plurality of types of operating parameters relating to the air-conditioner become smaller.

Figure 24:
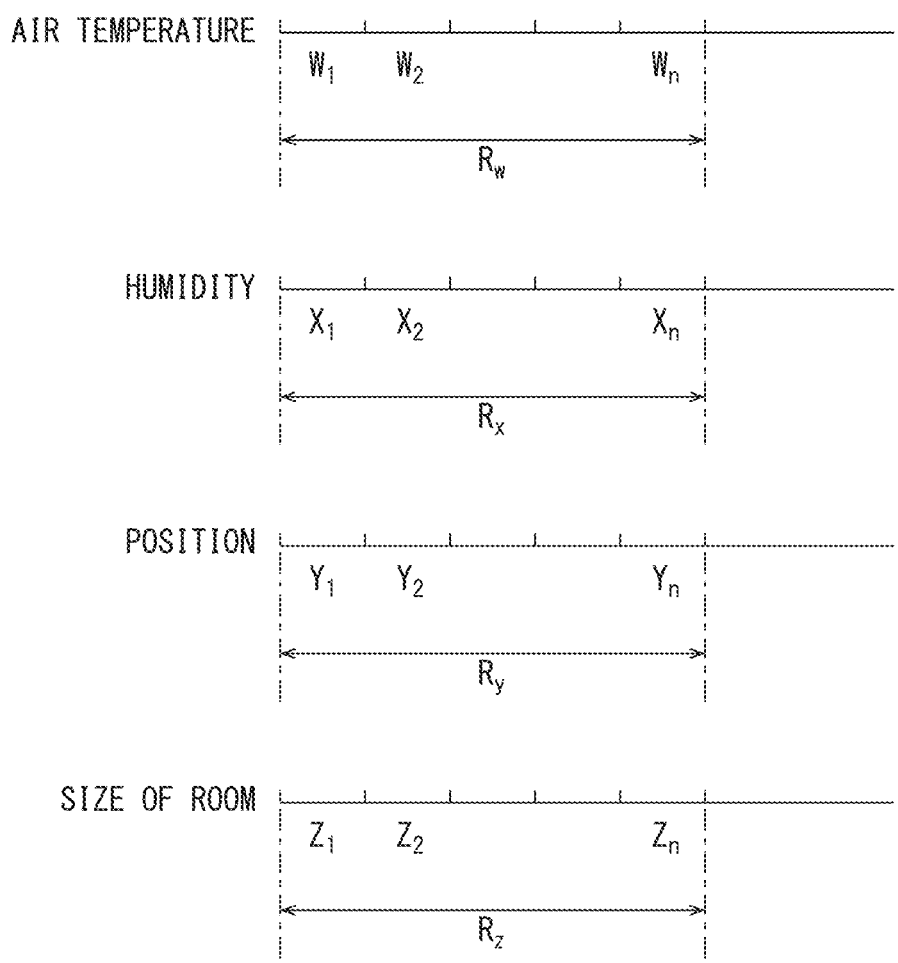
FIG. 24 is a view showing preset ranges of air temperature etc.
Figure 25:
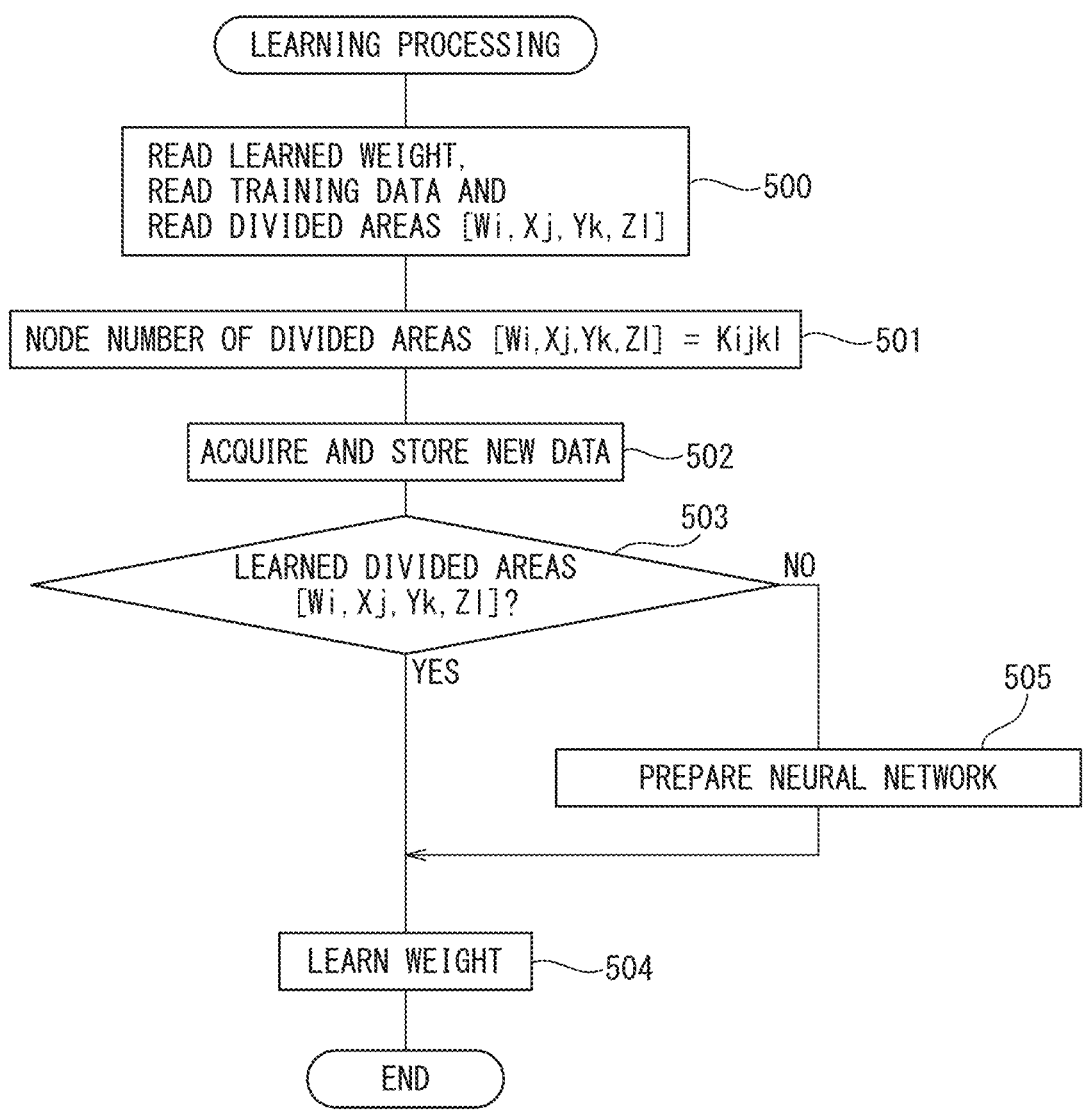
FIG. 25 is a flow chart showing still another embodiment for performing learning processing.

FIG. 24 and FIG. 25 show a modification of the fourth embodiment. In this modification, the preset ranges of the values of the types of operating parameters relating to the air-conditioner are divided into pluralities of sections. That is, Rw, Rx, Ry, and Rz in FIG. 24 respectively show the preset ranges of the air temperature, humidity, position, and size of the room in which the air-conditioner is installed. As shown in FIG. 24, the preset ranges of the air temperature, humidity, position, and size of the room in which the air-conditioner is installed are divided into pluralities of sections. Note that, in FIG. 24, $W_1$, $W_2$ ... $W_n$, $X_1$, $X_2$ ... $X_n$, $Y_1$, $Y_2$ ... $Y_n$, $Z_1$, $Z_2$ ... $Z_n$ show the divided ranges of values of the respective types of operating parameters.

Furthermore, in this modification, the plurality of divided areas [Wi, Xj, Yk, Zl] (i=1, 2 ... n, j=1, 2 ... n, k=1, 2 ... n, l=1, 2 ... n) defined by the combinations of divided ranges dividing the values of the types of operating parameters are set in advance. An independent neural network is respectively prepared for each of the divided areas [Wi, Xj, Yk, Zl]. These neural networks have the structures shown in FIG. 22. In this case, the numbers of nodes of the hidden layers (L=3) differ with each neural network. Below, the numbers of nodes of the hidden layers one layer before the output layers of the neural networks at the divided areas [Wi, Xj, Yk, Zl] will be expressed as Ki,j,k,l. The numbers Ki,j,k,l of the nodes of the hidden layers are set in advance in accordance with the complexity of the changes in the training data with respect to the changes in the input values in the divided areas [Wi, Xj, Yk, Zl].

In this modification, the flow rate, flow direction, and operating time of the air-conditioner actually measured for the various input values x1, x2, x3, x4 in the divided areas [Wi, Xj, Yk, Zl] formed in the preset ranges Rw, Rx, Ry, Rz, that is, the air temperature, humidity, position, and size of the room in which the air-conditioner is installed, are found in advance as training data. That is, the training data is found in advance by actual measurement for the values of the plurality of types of operating parameters relating to the air-conditioner in the preset ranges Rw, Rx, Ry, Rz. From the values of the plurality of types of operating parameters relating to the air-conditioner and training data, the structures of the neural networks for the divided areas [Wi, Xj, Yk, Zl] including also the numbers Ki, j, k, l of the nodes of the hidden layers are determined. The weights of the neural networks of the divided areas [Wi, Xj, Yk, Zl] are learned in advance so that the differences between the output values $y_1$, $y_2$, $y_3$ and the corresponding training data become smaller.

Therefore, in this modification, the divided areas [Wi, Xj, Yk, Zl] learned in advance will sometimes be referred to below as the "learned divided areas [Wi, Xj, Yk, Zl]". Note that, the training data found in advance by actual measurement for the values of the plurality of types of operating parameters relating to the air-conditioner in the preset ranges Rw, Rx, Ry, Rz are stored in the storage part of the electronic control unit 56. In this modification as well, for the divided areas [Wi, Xj, Yk, Zl], neural networks of the same structures as the neural networks which had been used in the advance learning are used. The weights of the neural networks for which learning has finished are used for further learning during the operation of the air-conditioner. FIG. 25 shows the learning processing routine of the modification performed during the operation of the air-conditioner. This learning processing routine is performed by interruption every certain time interval, for example, every second.

Referring to FIG. 25, first, at step 500, the learned weights stored in the storage unit of the electronic control unit 56 and the training data used in the advance learning, that is, the training data found in advance by actual measurement for the values of the plurality of types of operating parameters relating to the air-conditioner in the preset ranges Rw, Rx, Ry, Rz, and the learned divided areas [Wi, Xj, Yk, Zl] are read. The learned weights are used as the initial values of the weights. Next, at step 501, the numbers Ki, j, k, l of the nodes of the hidden layers one layer before the output layer which had been used in the advance learning for the learned divided areas [Wi, Xj, Yk, Zl] are read. Next, the routine proceeds to step 502 where new input values x1, x2, x3, x4, that is, the air temperature, humidity, position, and size of the room in which the air-conditioner is installed, are acquired. The new input values x1, x2, x3, x4, that is, the new values of the plurality of types of operating parameters relating to the air-conditioner, are stored in the storage unit of the electronic control unit 56. Further, at step 502, the flow rate, flow direction, and operating time for the new input values x1, x2, x3, x4 are stored as training data in the storage unit of the electronic control unit 56. That is, at step 502, the training data obtained by actual measurement for the newly acquired values of the plurality of types of operating parameters relating to the air-conditioner is stored in the storage unit of the electronic control unit 56.

Next, at step 503, it is judged whether the new input values x1, x2, x3, x4 are in the learned divided areas [Wi, Xj, Yk, Zl], that is, whether the newly acquired values of the plurality of types of operating parameters relating to the air-conditioner are in the preset ranges Rw, Rx, Ry, Rz. When the new input values x1, x2, x3, x4 are in the learned divided areas Rw, Rx, Ry, Rz, that is, when the newly acquired values of the plurality of types of operating parameters relating to the air-conditioner are in the preset ranges Rw, Rx, Ry, Rz, the routine proceeds to step 504 where the new input values x1, x2, x3, x4, that is, the newly acquired values of the plurality of types of operating parameters relating to the air-conditioner, are input to the nodes of the input layers of the neural networks of the learned divided areas [Wi, Xj, Yk, Zl] in which the newly acquired values of the plurality of types of operating parameters relating to the air-conditioner fall. Based on the output values $y_1$, $y_2$, $y_3$ output from the nodes of the output layers of the neural networks and the training data found by actual measurement for the newly acquired values of the plurality of types of operating parameters relating to the air-conditioner, the error backpropagation algorithm is used to further learn the weights of the neural networks of the learned divided areas [Wi, Xj, Yk, Zl] in which the newly acquired values of the plurality of types of operating parameters relating to the internal combustion engine fall so that the differences between the output values $y_1$, $y_2$, $y_3$ and the training data become smaller.

On the other hand, when at step 503 it is judged that the new input values x1, x2, x3, x4 are not in the learned divided areas [Wi, Xj, Yk, Zl], the routine proceeds to step 505 where first not yet learned areas defined by the new input values x1, x2, x3, x4 are set outside the preset ranges Rw, Rx, Ry, Rz. For example, when it is judged that the new input values x2, x3, x4 are inside the corresponding preset ranges Rx, Ry, Rz and the new input value x1 is not inside the corresponding preset range Rw, if designating the range in which the new input value x1 falls as "Wa", the not yet learned area [Wa, Xj, Yk, Zl] defined by the new input values x1, x2, x3, x4 is set. Further, when it is judged that the new input values x3, x4 are inside the corresponding preset ranges Ry, Rz and the new input values x1, x2 are not in the corresponding preset ranges Rw, Rx, if designating the range in which the new input value x1 falls as "Wa" and designating the range in which the new input value x2 falls as "Xb", the not yet learned area [Wa, Xb, Yk, Zl] defined by the new input values x1, x2, x3, x4 is set.

Next, at step 505, new neural networks for the not yet learned areas [Xa, Yb] are prepared. If at step 505 the new neural networks are prepared, the routine proceeds to step 504. At step 504, for the not yet learned areas, the weights of the new neural networks prepared for the not yet learned areas are learned so that the differences between the output values $y_1$, $y_2$, $y_3$ and the training data become smaller.

FIG. 26 to FIG. 33 show the fifth embodiment in the case of applying the machine learning system according to the present invention to estimation of the degree of deterioration of the secondary battery. In this embodiment, the degree of deterioration of the secondary battery is detected from the air temperature, the temperature of the secondary battery, the discharge time of the secondary battery, and the energy discharged per unit time of the secondary battery. In this case, the ranges of the conditions of use and modes of use of the secondary battery, that is, the ranges of use of the air temperature, the temperature of the secondary battery, the discharge time of the secondary battery, the energy discharged per unit time of the secondary battery, and other values of the operating parameters of the secondary battery can be predicted in advance in accordance with the type of the secondary battery. Therefore, normally, the weights of the neural network are learned in advance for the preset ranges of the values of the operating parameters of the secondary battery so that the difference between the output value of the neural network and the actually measured degree of deterioration of the secondary battery becomes smaller.

However, in this case as well, the values of the operating parameters of the secondary battery sometimes become outside the preset ranges. In this case, since learning based on actual values is not performed outside of the preset ranges, the output value calculated using the neural network will sometimes end up greatly deviating from the actual value. Therefore, in this embodiment as well, when the newly acquired value of an operating parameter relating to the secondary battery is outside the preset range, the number of nodes of the hidden layer one layer before the output layer of the neural network is made to increase or the number of neural networks is increased and the training data obtained for the newly acquired value of the operating parameter relating to the secondary battery and the training data obtained for the value of the operating parameter relating to the secondary battery in the preset range are used to learn the weights of the neural network.

Figure 26:
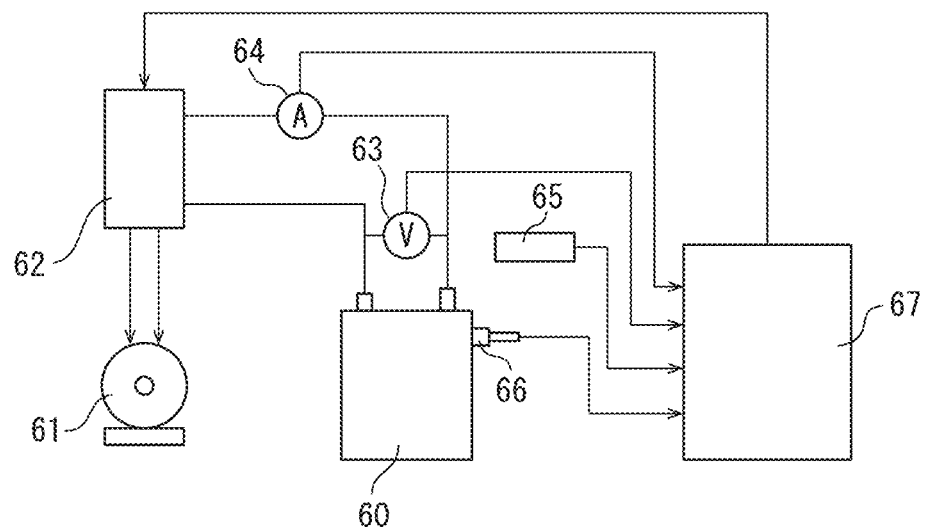
FIG. 26 is an overview of a machine learning system for estimating a degree of deterioration of a secondary battery.

Next, this fifth embodiment will be specifically explained. Referring to FIG. 26, 60 indicates a secondary battery, 61 an electric motor, 62 a drive control device of the electric motor 61, 63 a voltmeter for detecting the voltage across the output terminals of the secondary battery 60, 64 an ammeter for detecting the current supplied from the secondary battery 60 through the drive control device 62 to the electric motor 61, 65 a thermometer for detecting the air temperature, 66 a temperature sensor for detecting the temperature of the secondary battery 60, and 67 an electronic control unit having a configuration similar to the electronic control unit 30 shown in FIG. 1. As shown in FIG. 26, the current supplied to the electric motor 61 detected by the ammeter 53, the voltage across the output terminals of the secondary battery 60 detected by the voltmeter 64, the air temperature detected by the thermometer 65, and the temperature of the secondary battery 60 detected by the temperature sensor 66 are input to the electronic control unit 56. Inside the electronic control unit 56, the estimated value of the degree of deterioration of the secondary battery 60 is calculated. Note that, inside the electronic control unit 56, the discharge time of the secondary battery 60 is found based on the detected value of the ammeter 64 while the energy discharged per unit time of the secondary battery 60 (current voltage) is found based on the detected value of the ammeter 64 and the detected value of the voltmeter 63.

Figure 27:
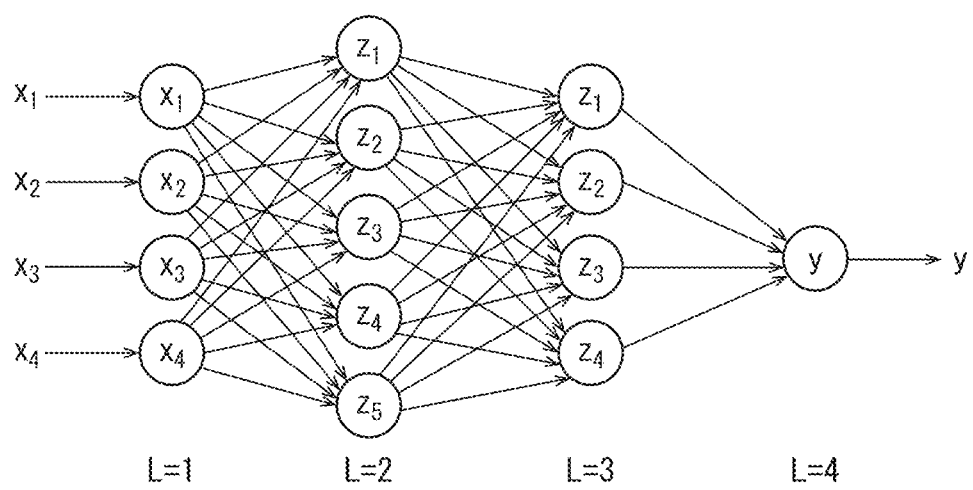
FIG. 27 is a view showing a neural network.

FIG. 27 shows a neural network used in this fifth embodiment. In this fifth embodiment, as shown in FIG. 27, the input layer (L=1) of the neural network is comprised of four nodes. To these nodes, an input value $x_1$ showing the air temperature, an input value $x_2$ showing the temperature of the secondary battery 60, an input value $x_3$ showing the temperature of the secondary battery 60, and an input value $x_4$ showing the energy discharged per unit time of the secondary battery 60 are input. Further, the number of the hidden layers (L=2 and L=3) can be made one layer or any number of layers. The numbers of nodes of the hidden layers (L=2 and L=3) can also be made any numbers. Further, in the fourth embodiment, the number of nodes of the output layer (L=4) is made a single node. An output value "y" showing the degree of deterioration of the secondary battery 20 is output from this node.

Figure 28A:
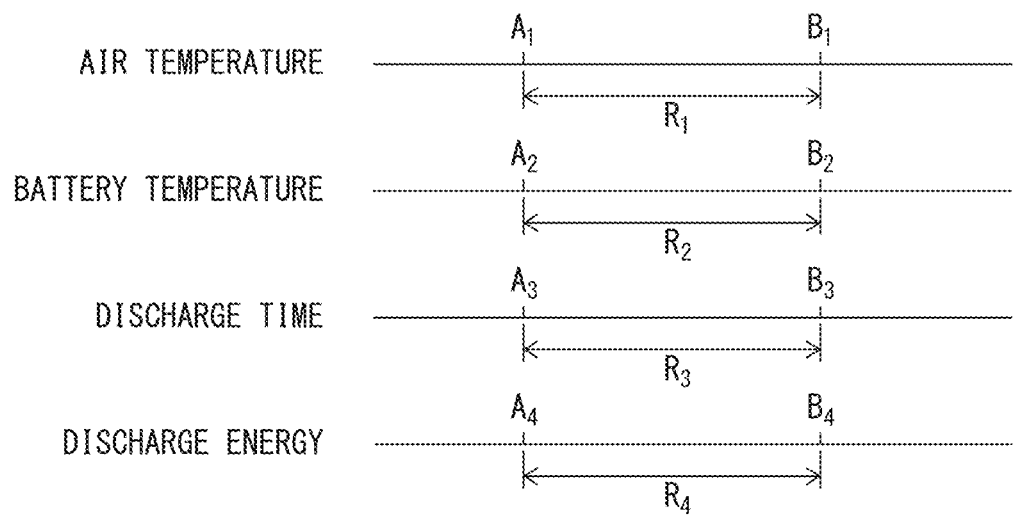
FIG. 28A and FIG. 28B are views showing preset ranges of air temperature etc.

On the other hand, in FIG. 28A, $A_1$ to $B_1$, that is, $R_1$, shows the preset range of the air temperature (for example, $-5°$ C. to $40°$ C.), $A_2$ to $B_2$, that is, $R_2$, shows the preset range of the temperature of the secondary battery 60 (for example, $-40°$ C. to $40°$ C.), $A_3$ to $B_3$, that is, $R_3$, shows the preset range of the discharge time of the secondary battery 60, and $A_4$ to $B_4$, that is, $R_4$, shows the preset range of the energy discharged per unit time of the secondary battery 60. Note that, in FIG. 28B as well, in the same way as FIG. 28A, $A_1$ to $B_1$ shows the preset range of the air temperature, $A_2$ to $B_2$ shows the preset range of the temperature of the secondary battery 60, $A_3$ to $B_3$ shows the preset range of the discharge time of the secondary battery 6, and $A_4$ to $B_4$ shows the preset range of the energy discharged per unit time of the secondary battery 60.

Here, the relationships of the air temperature, the temperature of the secondary battery 60, the discharge time of the secondary battery 60, and the energy discharged per unit time of the secondary battery 60 with the degree of deterioration of the secondary battery 60 will be briefly explained. Now then, the more the secondary battery 60 deteriorates, the higher the internal resistance. Therefore, it is possible to estimate the degree of deterioration of the secondary battery 60 from the change of the internal resistance. However, in actuality, it is difficult to detect the internal resistance. On the other hand, if the discharge current is constant, the higher the internal resistance, the more the amount of heat generated by the secondary battery 60 increases. Therefore, the higher the internal resistance, that is, the more the secondary battery 60 deteriorates, the higher the temperature of the secondary battery 60 becomes. Therefore, it is possible to estimate the degree of deterioration of the secondary battery 60 based on the amount of rise of the temperature of the secondary battery 60. In this case, the amount of rise of the temperature of the secondary battery 60 is affected by the air temperature and, further, is governed by the discharge time of the secondary battery 60 and the energy discharged per unit time of the secondary battery 60. Therefore, the degree of deterioration of the secondary battery 60 is found from the air temperature, the temperature of the secondary battery 60, the discharge time of the secondary battery 60, and the energy discharged per unit time of the secondary battery 60. Therefore, it is possible to estimate the degree of deterioration of the secondary battery 60 from the air temperature, the temperature of the secondary battery 60, the discharge time of the secondary battery 60, and the energy discharged per unit time of the secondary battery 60.

On the other hand, if the secondary battery 60 deteriorates, the amount of charge of the secondary battery 60 decreases. In this case, when the circuit of the secondary battery 60 is made a closed loop right after the secondary battery 60 finishes being charged, a voltage proportional to the amount of charge of the secondary battery 60 appears across the output terminals of the secondary battery 60. That is, the voltage across the output terminals of the secondary battery 60 detected by the voltmeter 64 right after the secondary battery 60 finishes being charged is proportional to the amount of charge of the secondary battery 60. Therefore, it is possible to detect the degree of deterioration of the secondary battery 60 from the voltage detected by the voltmeter 64 right after the secondary battery 60 finishes being charged. Therefore, in this fifth embodiment, the degree of deterioration of the secondary battery 60 detected from the detected value of the voltmeter 64 right after the secondary battery 60 finishes being charged is used as the training data of the output value "y".

Next, referring to FIG. 29 and FIG. 30, the routine for calculation of the discharge time of the secondary battery 60 etc. and the routine for processing for acquisition of the training data performed inside the electronic control unit 67 will be explained. If referring to FIG. 29 showing the calculation routine, at step 600, the discharge time of the secondary battery 60 is calculated from the output value of the ammeter 64. Next, at step 601, the energy discharged per unit time of the secondary battery 60 is calculated from the output value of the ammeter 64 and the output value of the voltmeter 63.

On the other hand, if referring to FIG. 30 showing the routine of processing for acquisition of the training data, first, at step 610, it is judged if processing for charging of the secondary battery 60 is being performed. If processing for charging of the secondary battery 60 is not being performed, the processing cycle ends. As opposed to this, when processing for charging of the secondary battery 60 is being performed, the routine proceeds to step 611 where it is judged if the secondary battery 60 has finished being charged. If it is judged that the secondary battery 60 has finished being charged, the routine proceeds to step 612 where it is judged if a training data request flag set when requesting training data is set. This training data request flag will be explained later. When the training data request flag is not set, the processing cycle is ended. As opposed to this, when the training data request flag is set, the routine proceeds to step 613 where the degree of deterioration of the secondary battery 60 is detected from the detected voltage of the voltmeter 64. Next, the routine proceeds to step 614 where the additional learning flag is set.

In this fifth embodiment as well, the degree of deterioration of the secondary battery 60 for the various input values $x_n$ (n=1, 2, 3, 4) in the preset ranges Rn, that is, the air temperature, the temperature of the secondary battery 60, the discharge time of the secondary battery 60, and the energy discharged per unit time of the secondary battery 60, is found in advance as training data. That is, training data is found in advance by actual measurement for the values of the plurality of types of operating parameters relating to the secondary battery 60 in the preset ranges Rn. The structure of the neural network is determined by the values of the plurality of types of operating parameters relating to the secondary battery 60 and training data. The weights of the neural network are learned in advance so that the differences between the output values "y" and the training data corresponding to the values of the plurality of types of operating parameters relating to the secondary battery 60 become smaller. The training data found in advance by actual measurement for the values of the plurality of types of operating parameters relating to the secondary battery 60 in this preset ranges Rn is stored in the storage part of the electronic control unit 67.

Figure 31:
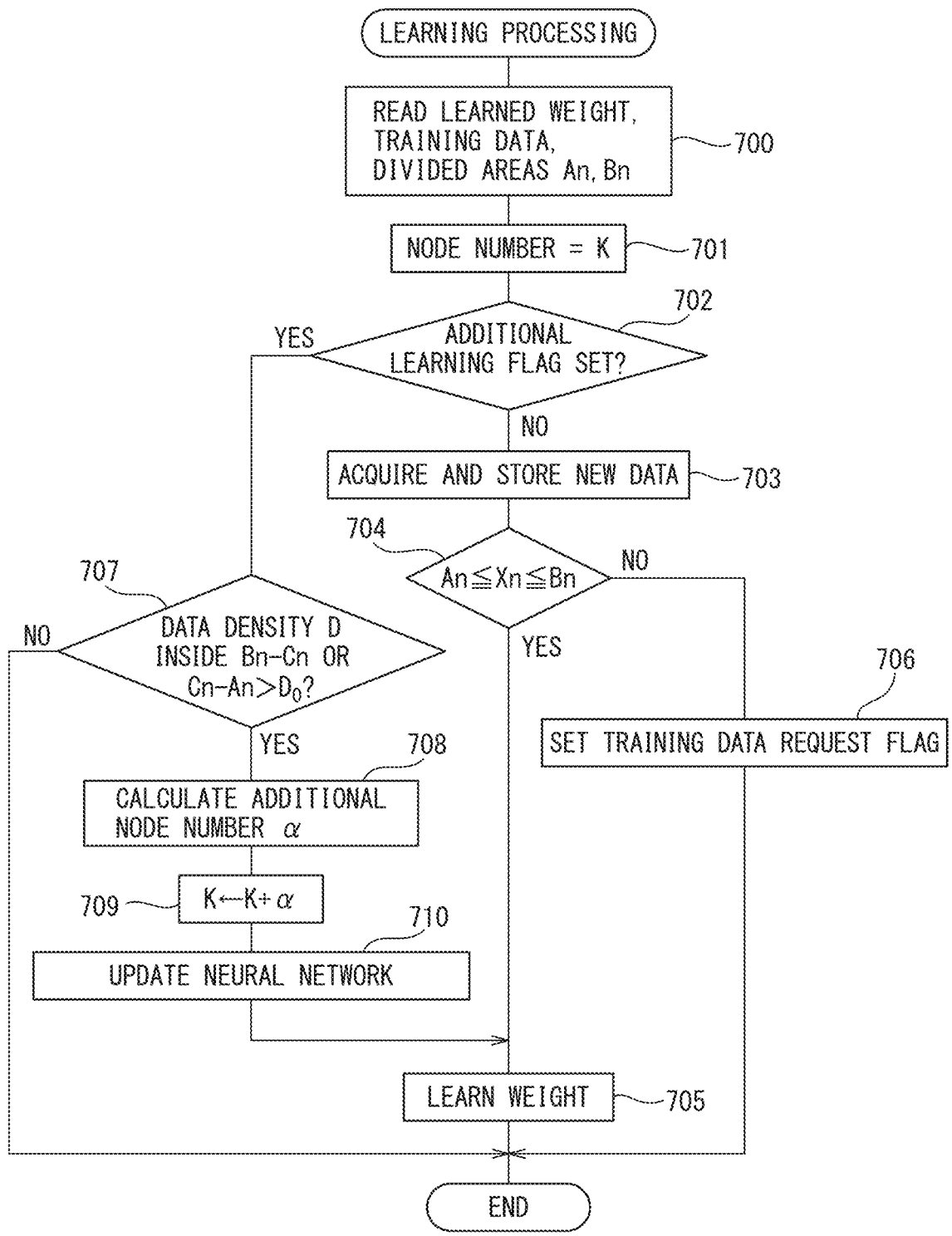
FIG. 31 is a flow chart showing still another embodiment for performing learning processing.

In this fifth embodiment as well, a neural network of the same structure as the neural network used in advance learning is used. The weights of the neural network when the learning is finished are used for further learning onboard during operation of the vehicle. FIG. 31 shows a learning processing routine of the fifth embodiment performed onboard. This learning processing routine is performed by interruption every certain time interval, for example, every second.

That is, referring to FIG. 31, first, at step 700, the learned weights stored in the storage part of the electronic control unit 67, the training data which used in the advance learning, that is, the training data found in advance by actual measurement for the values of the plurality of types of operating parameters relating to the secondary battery 60 in the preset ranges Rn, and the ranges of the input data, that is, the values An, Bn (n=1, 2, 3, 4) (FIG. 28A) showing the preset ranges of the values of the plurality of types of operating parameters relating to the secondary battery 60 are read. The learned weights are used as the initial values of the weights. Next, at step 701, the number K of nodes of the hidden layer one layer before the output layer of the neural network which had been used in advance learning is read. Next, at step 702, it is judged if the additional learning flag has been set. When the additional learning flag is not set, the routine proceeds to step 703.

At step 703, the new input values "x", that is, the new values of the plurality of types of operating parameters relating to the secondary battery 60, are acquired. The new input values "x", that is, the new values of the plurality of types of operating parameters relating to the secondary battery 60, are stored in the storage unit of the electronic control unit 67. Next, at step 704, it is judged if the new input values $x_n$, that is, the newly acquired values of the plurality of types of operating parameters relating to the secondary battery 60, are in the preset ranges Rn (An to Bn), that is, if the new input values $x_n$ are An or more and Bn or less. When the new input values $x_n$ are in the preset ranges Rn, the routine proceeds to step 705 where the input values $x_n$, that is, the newly acquired values of the plurality of types of operating parameters relating to the secondary battery 60, are input to the corresponding nodes of the input layer of the neural network. Based on the output values "y" output from the nodes of the output layer of the neural network and the training data found by actual measurement for the newly acquired values of the plurality of types of operating parameters relating to the secondary battery 60, the error back-propagation algorithm is used to learn the weights of the neural network so that the differences of the output values "y" and training data become smaller.

Figure 28B:
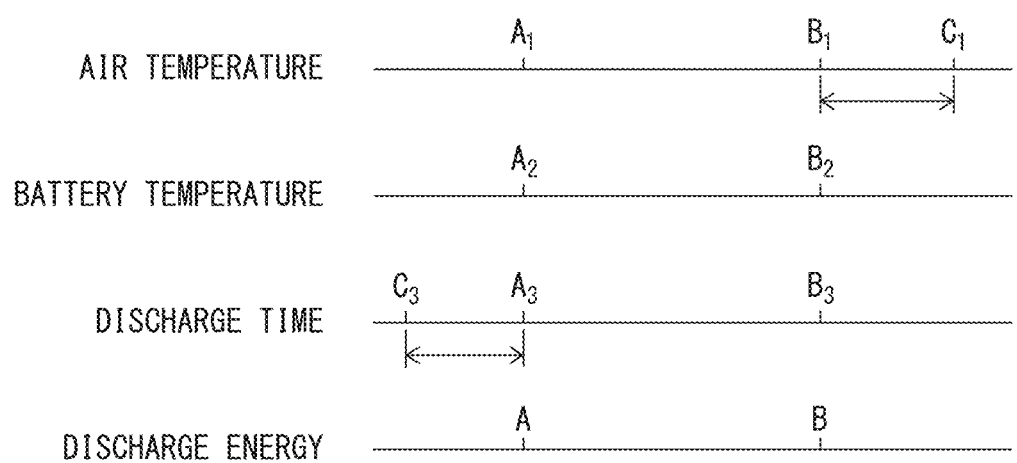

On the other hand, when at step 704 it is judged that a new input value $x_n$, that is, the value of at least one type of operating parameter among the newly acquired values of the plurality of types of operating parameters relating to the secondary battery 60, is not in the preset range Rn (An to Bn), for example, if in FIG. 28B, the input value $x_1$ showing the air temperature is in the preset range ($B_1$ to $C_1$) from $B_1$ to $C_1$ ($B_1 < C_1$), or if in FIG. 28B, the input value $x_3$ showing the discharge time of the secondary battery 60 is in the preset range ($C_3$ to $A_3$) from $C_3$ to $A_3$ ($C_3 < A_3$), the routine proceeds to step 706. At step 706, the training data request flag is set. The new input values $x_n$ acquired at this time are stored as new input values $x_n$ for use in additional learning. Next, the processing cycle is ended.

If the training data request flag is set, as will be understood from the training data acquisition processing routine of FIG. 30, when the secondary battery 60 finishes being charged, the degree of deterioration of the secondary battery 60 is detected and the degree of deterioration of the secondary battery 60 is stored as training data for use in additional learning. Next, the additional learning flag is set. Now then, if at step 706 the additional learning flag is set, at the next processing cycle, the routine proceeds from step 702 to step 707. At step 707, the new input value $x_n$ stored for use in the additional learning and the training data stored for use in the additional learning are read from the storage unit and the density D of the training data for the new input value $x_n$ (=number of training data/($C_n - B_n$) or number of training data/($A_n - C_n$)) in the range ($B_n$ to $C_n$) or range ($C_n$ to $A_n$) in which this new input value $x_n$ falls is calculated. The definition of the training data density D is as explained before. If at step 707 the training data density D is calculated, it is judged if the training data density D becomes higher than a preset data density $D_0$. If the training data density D is lower than the preset data density $D_0$, the processing cycle is ended.

On the other hand, when at step 707 it is judged that the training data density D becomes higher than the preset data density $D_0$, the routine proceeds to step 708. In this case, when D (=number of training data/($A_n - C_n$))>$D_0$, the following equation is used to calculate the number of additional nodes α:

Number of additional nodes α=round{(K/(Bn−An))· (An−Cn)}

On the other hand, when D (=number of training data/($C_n - B_n$))>$D_0$, the following equation is used to calculate the number of additional nodes α:

Number of additional nodes α=round{(K/(Bn−An))· (Cn·Bn)}

Note that, in the above equations, "K" shows the number of nodes, while "round" means to round off.

If at step 708 the number of additional nodes α is calculated, the routine proceeds to step 709 where the number K of nodes of the hidden layer one layer before the output layer of the neural network is updated and the number K of nodes of the hidden layer one layer before the output layer is made to increase by exactly the number of additional nodes α (K←K+α). In this way, in the fifth embodiment, if the data density obtained by dividing the number of training data by the value of the difference of the maximum value and the minimum value showing the preset range of the value of the operating parameter increases, the number of nodes of the hidden layer one layer before the output layer of the neural network is increased. That is, in this fifth embodiment, the number of nodes of the hidden layer one layer before the output layer of the neural network is increased in accordance with the increase of the data density obtained by dividing the number of training data by the value of the difference of the maximum value and the minimum value showing the preset range of the value of the operating parameter.

If at step 709 the number K of nodes of the hidden layer one layer before the output layer is made to increase by exactly the number of additional nodes α (K←K+α), the routine proceeds to step 710 where the neural network is updated so as to make the number K of nodes of the hidden layer one layer before the output layer increase. Next, the routine proceeds to step 705. At step 705, the weights of the updated neural network are learned so that the difference between the output value "y" and the training data in which the training data newly obtained for the new input value "x" is included becomes smaller. That is, at step 705, the training data obtained by actual measurement for the newly acquired values of the plurality of types of operating parameters relating to the secondary battery 60 and the training data found in advance by actual measurement for the values of the plurality of types of operating parameters relating to the secondary battery 60 in the preset ranges Rn are used to learn the weights of the updated neural network so that the difference between the output value "y" changing in accordance with the values of the plurality of types of operating parameters relating to the secondary battery 60 inside the preset ranges and outside the preset ranges and the training data corresponding to the values of the plurality of types of operating parameters relating to this secondary battery 60 becomes smaller.

Figure 33:
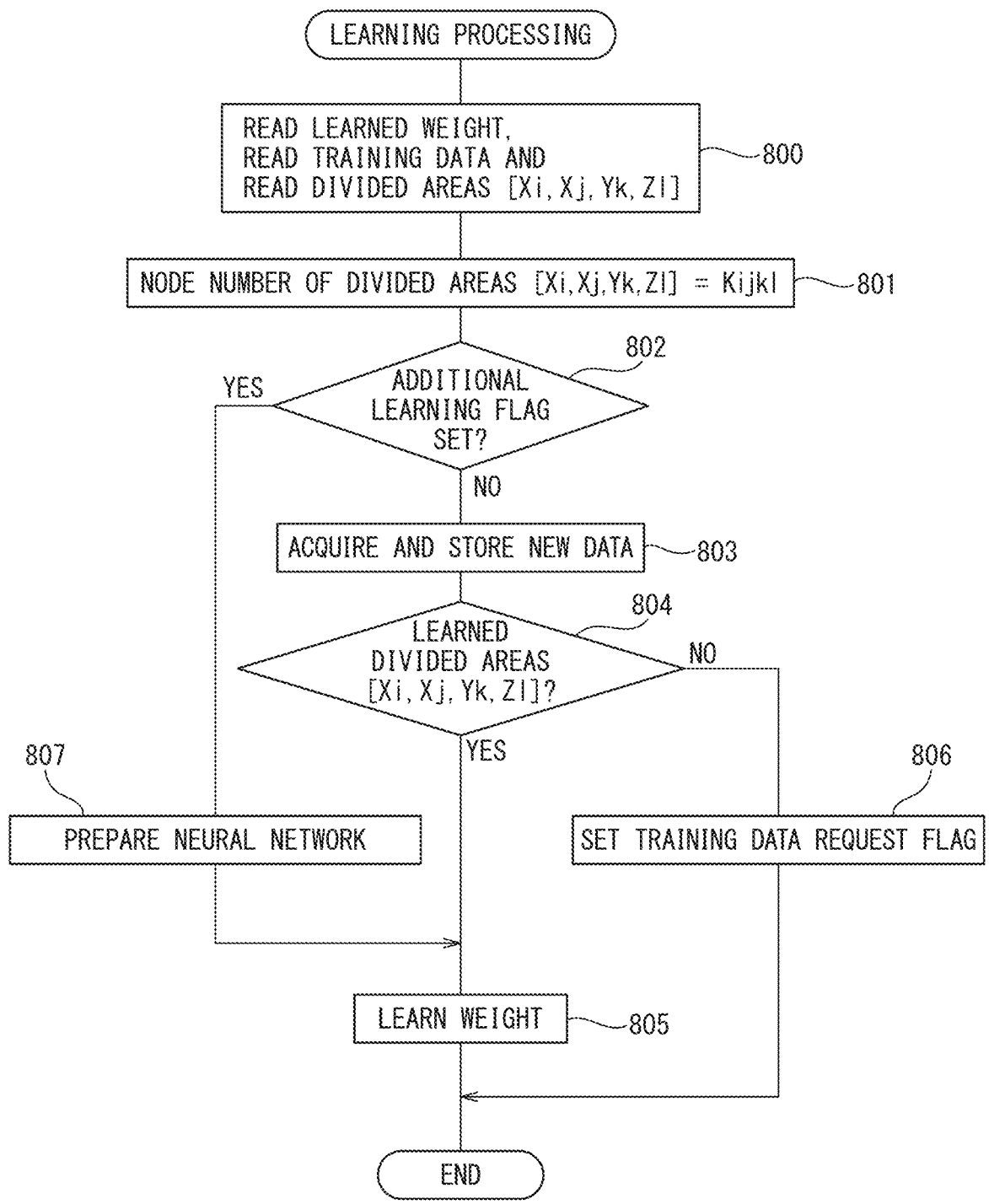
FIG. 33 is a flow chart showing still another embodiment for performing learning processing.

FIG. 32 and FIG. 33 show a modification of the fifth embodiment. In this modification, the preset ranges of the values of the types of operating parameters relating to the secondary battery 60 are divided into pluralities of sections. That is, Rw, Rx, Ry, and Rz in FIG. 32 respectively show the preset ranges of the air temperature, the temperature of the secondary battery 60, the discharge time of the secondary battery 60, and the energy discharged per unit time of the secondary battery 60. As shown in FIG. 24, the preset ranges of the air temperature, the temperature of the secondary battery 60, the discharge time of the secondary battery 60, and the energy discharged per unit time of the secondary battery 60 are divided into pluralities of sections. Note that, in FIG. 32, $W_1, W_2 \ldots W_n, X_1, X_2 \ldots X_n, Y_1, Y_2 \ldots Y_n, Z_1, Z_2 \ldots Z_n$ show the divided ranges of values of the respective types of operating parameters.

Furthermore, in this modification, the plurality of divided areas [Wi, Xj, Yk, Zl] (i=1, 2 . . . n, j=1, 2 . . . n, k=1, 2 . . . n, l=1, 2 . . . n) defined by the combinations of divided ranges dividing the values of the types of operating parameters are set in advance. An independent neural network is respectively prepared for each of the divided areas [Wi, Xj, Yk, Zl]. These neural networks have the structures shown in FIG. 27. In this case, the number of nodes of the hidden layers (L=3) differs for each neural network. Below, the numbers of nodes of the hidden layers one layer before the output layers of the neural networks at the divided areas [Wi, Xj, Yk, Zl] will be expressed as Ki, j, k, l. The numbers Ki, j, k, l of the nodes of the hidden layers are set in advance in accordance with the complexity of the changes in the training data with respect to the changes in the input values in the divided areas [Wi, Xj, Yk, Zl].

In this modification, the various input values x1, x2, x3, x4 in the divided areas [Wi, Xj, Yk, Zl] formed in the preset ranges Rw, Rx, Ry, Rz of the values of the plurality of types of operating parameters relating to the secondary battery 60, that is, the air temperature, the temperature of the secondary battery 60, the discharge time of the secondary battery 60, and the degree of deterioration of the secondary battery 60 actually measured for the energy discharged per unit time of the secondary battery 60, are found in advance as training data. That is, training data is found in advance by actual measurement for the values of the plurality of types of operating parameters relating to the secondary battery 60 in the preset ranges Rw, Rx, Ry, Rz. The structures of the neural networks for the divided areas [Wi, Xj, Yk, Zl], including also the numbers Ki, j, k, l of the nodes of the hidden layers, are determined from the values of the plurality of types of operating parameters relating to the secondary battery 60 and training data. The weights of the neural networks of the divided areas [Wi, Xj, Yk, Zl] are learned in advance so that the differences between the output values $y_1$, $y_2$, $y_3$ and corresponding training data become smaller.

Therefore, in this modification, the previously learned divided areas [Wi, Xj, Yk, Zl] will below be called the "learned divided areas [Wi, Xj, Yk, Zl]". Note that, the training data found in advance by actual measurement for the values of the plurality of types of operating parameters relating to the secondary battery 60 in the preset ranges Rw, Rx, Ry, Rz are stored in the storage unit of the electronic control unit 56. In this modification as well, for the divided areas [Wi, Xj, Yk, Zl], neural networks of the same structures as the neural networks used in the advance learning are used. The weights of the neural networks when learning is finished are used for further learning onboard during vehicle operation. FIG. 33 shows this learning processing routine of a modification performed onboard. This learning processing routine is performed by interruption every certain time, for example, every second.

Referring to FIG. 33, first, at step 800, the learned weights stored in the storage unit of the electronic control unit 56, the training data which had been used in the advance learning, that is, the training data found in advance by actual measurement for the values of the plurality of types of operating parameters relating to the secondary battery 60 in the preset ranges Rw, Rx, Ry, Rz, and the learned divided areas [Wi, Xj, Yk, Zl] are read. This learned weights are used as the initial values of the weights. Next, at step 801, the numbers Ki, j, k, l of the nodes of the hidden layers one layer before the output layer which had been used in the advance learning for the learned divided areas [Wi, Xj, Yk, Zl] are read. Next, at step 802, it is judged if the additional learning flag is set. When the additional learning flag is not set, the routine proceeds to step 803.

At step 803, the new input values x1, x2, x3, x4, that is, the air temperature, the temperature of the secondary battery 60, the discharge time of the secondary battery 60, and the energy discharged per unit time of the secondary battery 60, are acquired. The new input values x1, x2, x3, x4, that is, the values of the plurality of types of operating parameters relating to the new secondary battery 60, are stored in the storage unit of the electronic control unit 56. Next, at step 804, it is judged if the new input values x1, x2, x3, x4 are in the learned divided areas [Wi, Xj, Yk, Zl], that is, if the newly acquired values of the plurality of types of operating parameters relating to the secondary battery 60 are in the preset ranges Rw, Rx, Ry, Rz. When the new input values x1, x2, x3, x4 are in the learned divided areas Rw, Rx, Ry, Rz, that is, when the newly acquired values of the plurality of types of operating parameters relating to the secondary battery 60 are in the preset ranges Rw, Rx, Ry, Rz, the routine proceeds to step 805 where input values x1, x2, x3, x4, that is, the newly acquired values of the plurality of types of operating parameters relating to the secondary battery 60, are input to the nodes of the input layers of the neural networks of the learned divided areas [Wi, Xj, Yk, Zl] in which the newly acquired values of the plurality of types of operating parameters relating to the secondary battery 60 fall. Based on the output values "y" output from the nodes of the output layers of the neural networks and the training data found by actual measurement for the newly acquired values of the plurality of types of operating parameters relating to the secondary battery 60, the error backpropagation algorithm is used to further learn the weights of the neural networks of the learned divided areas [Wi, Xj, Yk, Zl] in which the newly acquired values of the plurality of types of operating parameters relating to the secondary battery 60 fall so that the differences between the output values "y" and the training data become smaller.

On the other hand, when at step 804 it is judged that the new input values x1, x2, x3, x4 are not in the learned divided areas [Wi, Xj, Yk, Zl], the routine proceeds to step 806. At step 806, the training data request flag is set. The new input values $x_n$ acquired at this time are stored as new input values $x_n$ for use in the additional learning. Next, the processing cycle is ended.

If the training data request flag is set, as will be understood from the training data acquisition processing routine of FIG. 30, when the secondary battery 60 finishes being charged, the degree of deterioration of the secondary battery 60 is detected. This degree of deterioration of the secondary battery 60 is stored as training data for use in the additional learning. Next, the additional learning flag is set. Now then, if at step 806 the additional learning flag is set, at the next processing cycle, the routine proceeds from step 802 to step 807. At step 807, the new input values $x_n$ stored for use in the additional learning and the training data stored for use in the additional learning are read from the storage unit and the not yet learned areas defined by the new input values x1, x2, x3, x4 stored for use in additional learning are set outside the preset ranges Rw, Rx, Ry, Rz. For example, if it is judged that the new input values x2, x3, x4 are in the corresponding preset ranges Rx, Ry, Rz and the new input value x1 is not in the corresponding preset range Rw, if designating the range in which the new input value x1 falls as "Wa", the not yet learned area [Wa, Xj, Yk, Zl] defined by the new input values x1, x2, x3, x4 is set. Further, if it is judged that the new input values x3, x4 are in the corresponding preset ranges Ry, Rz and the new input values x1, x2 are not in the corresponding preset ranges Rw, Rx, if designating the range in which the new input value x1 falls as "Wa" and designating the range in which the new input value x2 falls as "Xb", the not yet learned area [Wa, Xb, Yk, Zl] defined by the new input values x1, x2, x3, x4 is set.

Next, at step 807, new neural networks for the not yet learned areas are prepared. If at step 807 new neural networks are prepared, the routine proceeds to step 805. At step 805, for the not yet learned areas, the weights of the new neural networks prepared for the not yet learned areas are learned so that the differences between the output values "y" and the training data stored for use for additional learning become smaller.

From the above explanation, in the embodiment according to the present invention, there is provided a machine learning system using a neural network to output an output value corresponding to a value of an operating parameter of a machine, wherein a range of a value of a specific type of operating parameter relating to the machine is set in advance, and numbers of nodes of hidden layers of the neural network are set in advance corresponding to the range of the value of the specific type of operating parameter relating to the machine. When a newly acquired value of the specific type of operating parameter relating to the machine is outside a preset range, the number of nodes of the hidden layer one layer before the output layer of the neural network is made to increase, and training data obtained by actual measurement for the newly acquired value of the specific type of operating parameter relating to the machine and training data obtained by actual measurement for the value of the operating parameter of the machine in the preset range are used to learn weights of the neural network. An output value corresponding to the value of the specific type of operating parameter relating to the machine is output by using the neural network with the learned weights.

In this case, in this embodiment of the present invention, the machine learning system is provided with an electronic control unit. The electronic control unit is provided with a parameter acquiring unit acquiring a value of the specific type of operating parameter relating to the machine, a processing unit using a neural network comprised of an input layer, hidden layers, and an output layer to perform processing, and a storage unit, the value of the specific type of operating parameter relating to the machine is input to the input layer, and an output value changing in accordance with the value of the specific type of operating parameter relating to the machine is output from the output layer. The range of the value of the specific type of operating parameter relating to the machine is set in advance, the numbers of nodes of the hidden layers of the neural network are set in advance corresponding to the above range of value of a specific type of operating parameter relating to the machine, and training data found in advance by actual measurement for the value of the specific type of operating parameter relating to the machine in the preset range is stored in the storage unit. When the newly acquired value of the specific type of operating parameter relating to the machine is in the preset range, the training data obtained by actual measurement for the newly acquired value of the specific type of operating parameter relating to the machine is used in the processing unit to learn the weights of the neural network so that the difference between the output value changing in accordance with the newly acquired value of the specific type of operating parameter relating to the machine and the training data obtained by actual measurement for the newly acquired value of the specific type of operating parameter relating to the machine becomes smaller. When the value of the specific type of operating parameter relating to the machine newly acquired by the parameter acquiring part is outside of the preset range, the number of nodes of the hidden layer one layer before the output layer of the neural network is made to increase corresponding to the increase in the number of training data acquired by actual measurement for the newly acquired value of the specific type of operating parameter relating to the machine or the increase in a data density obtained by dividing the number of training data by the value of the difference of the maximum value and minimum value showing the preset range of the value of the operating parameter, and the training data obtained by actual measurement for the newly acquired value of the specific type of operating parameter relating to the machine and the training data found in advance are used in the processing unit to learn the weights of the neural network so that the difference between the output value changing in accordance with the value of the specific type of operating parameter relating to the machine inside the preset range and outside the preset range and the training data corresponding to the value of the specific type of operating parameter relating to the machine becomes smaller. An output value corresponding to the value of the specific type of operating parameter relating to the machine is output by using the neural network with the learned weights.

Alternatively, in this case, in this embodiment according to the present invention, the electronic control unit is provided with a parameter acquiring unit acquiring a value of the specific type of operating parameter relating to the machine, a processing unit using a neural network comprised of an input layer, hidden layers, and an output layer to perform processing, and a storage unit, the value of the specific type of operating parameter relating to the machine is input to the input layer, and a plurality of output values changing in accordance with the value of the specific type of operating parameter relating to the machine are output from the output layer. The range of the value of the specific type of operating parameter relating to the machine is set in advance, the numbers of nodes of the hidden layers of the neural network are set in advance corresponding to the range of value of a specific type of operating parameter relating to the machine, and training data found in advance by actual measurement for the value of the specific type of operating parameter relating to the machine in the preset range is stored in the storage part. When the value of the operating parameter of the machine newly acquired by the parameter acquiring part is in the preset range, the training data obtained by actual measurement for the newly acquired value of the specific type of operating parameter relating to the machine is used in the processing unit to learn the weights of the neural network so that the differences between the plurality of output values changing in accordance with the value of the specific type of operating parameter relating to the machine and the training data corresponding to the value of the specific type of operating parameter relating to the machine become smaller. When the value of the specific type of operating parameter relating to the machine newly acquired by the parameter acquiring unit is outside of the preset range, the number of nodes of the hidden layer one layer before the output layer of the neural network is made to increase corresponding to the increase in the number of training data acquired by actual measurement for the newly acquired value of the specific type of operating parameter relating to the machine or the increase in a data density obtained by dividing the number of training data by the value of the difference of the maximum value and minimum value showing the preset range, and the training data obtained by actual measurement for the newly acquired value of the specific type of operating parameter relating to the machine inside of the preset range and outside the preset range and the training data found in advance are used in the processing unit to learn the weights of the neural network so that the difference between the plurality of output values changing in accordance with the value of the specific type of operating parameter relating to the machine and the training data corresponding to the value of the specific type of operating parameter relating to the machine becomes smaller. A plurality of output values corresponding to the value of the specific type of operating parameter relating to the machine are output by using the neural network with the learned weights.

Alternatively, in an embodiment of the present invention, there is provided a machine learning system using a neural network to output an output value corresponding to values of operating parameters of a machine, wherein ranges of values of a plurality of types of operating parameters relating to the machine are set in advance, and numbers of nodes of hidden layers of the neural network are set in advance corresponding to the ranges of values of the plurality of types of operating parameters relating to the machine. When newly acquired values of the plurality of types of operating parameters relating to the machine are outside the preset ranges, the number of nodes of the hidden layer one layer before the output layer of the neural network is made to increase, and training data obtained by actual measurement for the newly acquired values of the plurality of types of operating parameters relating to the machine and training data obtained by actual measurement for the values of the operating parameters of the machine in the preset ranges are used to learn weights of the neural network. An output value corresponding to the values of the plurality of types of operating parameters relating to the machine is output by using the neural network with the learned weights.

In this case, in an embodiment according to the present invention, the machine learning system is provided with an electronic control unit. This electronic control unit is provided with a parameter acquiring unit acquiring values of the plurality of types of operating parameters relating to the machine, a processing unit using a neural network comprised of an input layer, hidden layers, and an output layer to perform processing, and a storage unit, values of the plurality of types of operating parameters relating to the machine are input to the input layer, and an output value changing in accordance with the values of the plurality of types of operating parameters relating to the machine is output from the output layer. For each of the plurality of types of operating parameters relating to the machine, the range of the value of the type of operating parameter is set in advance, the numbers of nodes of the hidden layers of the neural network are set in advance corresponding to the ranges of values of the plurality of types of operating parameters relating to the machine, and training data found in advance by actual measurement for the values of the plurality of types of operating parameters, in which training data, the values of the different types of operating parameters being in preset ranges, are stored in the storage unit. When the values of the plurality of types of operating parameters of the machine newly acquired by the parameter acquiring unit are in the preset ranges, the training data obtained by actual measurement for the newly acquired values of the plurality of types of operating parameters relating to the machine are used in the processing unit to learn the weights of the neural network so that the difference between the output value changing in accordance with the values of the plurality of types of operating parameters relating to the machine and the training data corresponding to the values of the plurality of types of operating parameters relating to the machine becomes smaller. When the value of at least one of the types of operating parameters among the plurality of types of operating parameters relating to the machine newly acquired by the parameter acquiring unit is outside of the preset range, the number of nodes of the hidden layer one layer before the output layer of the neural network is made to increase corresponding to the increase in the number of training data obtained by actual measurement for the newly acquired values of the plurality of types of operating parameters relating to the machine or the increase in a data density obtained by dividing the number of training data by the value of the difference of the maximum value and minimum value showing the preset range, and the training data obtained by actual measurement for the newly acquired values of the plurality of types of operating parameters relating to the machine inside the preset ranges and outside the preset ranges and the training data found in advance are used in the processing unit to learn the weights of the neural network so that the difference between the output value changing in accordance with the values of the plurality of types of operating parameters relating to the machine and the training data corresponding to the values of the plurality of types of operating parameters relating to the machine becomes smaller. An output value corresponding to the values of the plurality of types of operating parameters relating to the machine is output by using the neural network with the learned weights.

Further, in this case, in an embodiment according to the present invention, the electronic control unit is provided with a parameter acquiring unit acquiring values of the plurality of types of operating parameters relating to the machine, a processing unit using a neural network comprised of an input layer, hidden layers, and an output layer to perform processing, and a storage unit, values of the plurality of types of operating parameters relating to the machine are input to the input layer, and a plurality of output values changing in accordance with the values of the plurality of types of operating parameters relating to the machine are output from the output layer. For each of the plurality of types of operating parameters relating to the machine, the range of the value of the type of operating parameter is set in advance, the numbers of nodes of the hidden layers of the neural network are set in advance corresponding to the ranges of values of the plurality of types of operating parameters relating to the machine, and training data found in advance by actual measurement for the values of the plurality of types of operating parameters, in which training data, the values of the different types of operating parameters being in preset ranges, are stored in the storage unit. When the values of the plurality of operating parameters of the machine newly acquired by the parameter acquiring unit respectively are in the preset ranges, the training data obtained by actual measurement for the newly acquired values of the plurality of types of operating parameters relating to the machine are used in the processing unit to learn the weights of the neural network so that the differences between the plurality of output values changing in accordance with the values of the plurality of types of operating parameters relating to the machine and the training data corresponding to the values of the plurality of types of operating parameters relating to the machine become smaller. When the value of at least one of the types of operating parameters among the plurality of types of operating parameters relating to the machine newly acquired by the parameter acquiring unit is outside of the preset range, the number of nodes of the hidden layer one layer before the output layer of the neural network is made to increase corresponding to the increase in the number of training data acquired by actual measurement for the newly acquired values of the plurality of types of operating parameters relating to the machine or the increase in a data density obtained by dividing the number of training data by the value of the difference of the maximum value and minimum value showing the preset range, and the training data obtained by actual measurement of the newly acquired values of the plurality of types of operating parameters relating to the machine inside the preset ranges and outside the preset ranges and the training data found in advance are used in the processing unit to learn the weights of the neural network so that the differences between the plurality of output values changing in accordance with the values of the plurality of types of operating parameters relating to the machine and the training data corresponding to the values of the plurality of types of operating parameters relating to the machine become smaller. A plurality of output values corresponding to the values of the plurality of types of operating parameters relating to the machine are output by using the neural network with the learned weights.

On the other hand, in this embodiment according to the present invention, there is provided a machine learning system using a neural network to output an output value corresponding to values of operating parameters of a machine, wherein ranges of values of a plurality of types of operating parameters relating to the machine are set in advance, and neural networks corresponding to the ranges of the values of the plurality of types of operating parameters relating to the machine are formed in advance. When a value of at least one type of operating parameter among newly acquired values of the plurality of types of operating parameters relating to the machine is outside a preset range, a new neural network is formed, training data obtained by actual measurement for the newly acquired values of the plurality of types of operating parameters relating to the machine is used to learn weights of the new neural network. An output value corresponding to the values of the plurality of types of operating parameters relating to the machine is output by using the neural network with the learned weights.

In this case, in this embodiment according to the present invention, the machine learning system is provided with an electronic control unit. This electronic control unit is provided with a parameter acquiring unit acquiring values of the plurality of types of operating parameters relating to the machine, a processing unit using a neural network comprised of an input layer, hidden layers, and an output layer to perform processing, and a storage unit. The values of the plurality of types of operating parameters relating to the machine are input to the input layer, and an output value changing in accordance with the values of the plurality of types of operating parameters relating to the machine is output from the output layer. For each of the plurality of types of operating parameters relating to the machine, the range of the value of the type of operating parameter is set in advance, preset ranges of the values of the types of the operating parameters are divided into plurality of sections, and a plurality of divided areas defined by combinations of the divided ranges of the values of the types of the operating parameters are set in advance. A neural network is prepared for each divided area, and the numbers of nodes of the hidden layers of the neural networks are set in advance for each divided area. The training data found in advance by actual measurement for the values of the plurality of types of operating parameters is stored in the storage part. When the values of the plurality of types of operating parameters relating to the machine newly acquired by the parameter acquiring unit are in the preset ranges, the training data obtained by actual measurement of the newly acquired values of the plurality of types of operating parameters relating to the machine is used in the processing unit to learn the weights of the neural networks of the divided areas in which the newly acquired values of the plurality of types of operating parameters relating to the machine fall so that the differences between the output values changing in accordance with the values of the plurality of types of operating parameters relating to the machine and the training data corresponding to the values of the plurality of types of operating parameters relating to the machine become smaller. When the values of the plurality of types of operating parameters relating to the machine newly acquired by the parameter acquiring unit are outside the preset ranges, a new area defined by combinations of the preset ranges of the values of the types of operating parameters and in which the value of at least one type of the operating parameter falls is set, and a new neural network is prepared for the new area. Training data obtained by actual measurement of the newly acquired values of the plurality of types of operating parameters relating to the machine is used in the processing unit to learn the weights of the neural networks so that the differences between the output values changing in accordance with the values of the plurality of types of operating parameters relating to the machine and the training data corresponding to the values of the plurality of types of operating parameters relating to the machine become smaller. Output values corresponding to the values of operating parameters of the machine are output by using the neural network with the learned weights.

The invention claimed is:

1. A machine learning system, wherein the system is provided with an electronic control unit, the electronic control unit is provided with a parameter acquiring unit acquiring a value of the specific type of operating parameter relating to the machine, a processing unit using a neural network comprised of an input layer, hidden layers, and an output layer to perform processing, and a storage unit, the value of the specific type of operating parameter relating to the machine is input to the input layer, and an output value changing in accordance with the value of the specific type of operating parameter relating to the machine is output from the output layer, wherein the range of the value of the specific type of operating parameter relating to the machine is set in advance, the numbers of nodes of the hidden layers of the neural network are set in advance corresponding to the above range of value of a specific type of operating parameter relating to the machine, training data found in advance by actual measurement for the value of the specific type of operating parameter relating to the machine in the preset range is stored in the storage unit, when the newly acquired value of the specific type of operating parameter relating to the machine is in the preset range, the training data obtained by actual measurement for the newly acquired value of the specific type of operating parameter relating to the machine is used in the processing unit to learn the weights of the neural network so that the difference between the output value changing in accordance with the newly acquired value of the specific type of operating parameter relating to the machine and the training data obtained by actual measurement for the newly acquired value of the specific type of operating parameter relating to the machine becomes smaller, when the value of the specific type of operating parameter relating to the machine newly acquired by the parameter acquiring part is outside of the preset range, the number of nodes of the hidden layer one layer before the output layer of the neural network is made to increase corresponding to the increase in the number of training data acquired by actual measurement for the newly acquired value of the specific type of operating parameter relating to the machine or the increase in a data density obtained by dividing the number of training data by the value of the difference of the maximum value and minimum value showing the preset range of the value of the operating parameter, and the training data obtained by actual measurement for the newly acquired value of the specific type of operating parameter relating to the machine and the training data found in advance are used in the processing unit to learn the weights of the neural network so that the difference between the output value changing in accordance with the value of the specific type of operating parameter relating to the machine inside the preset range and outside the preset range and the training data corresponding to the value of the specific type of operating parameter relating to the machine becomes smaller, and an output value corresponding to the value of the specific type of operating parameter relating to the machine is output by using the neural network with the learned weights.

2. A machine learning system, wherein the system is provided with an electronic control unit, the electronic control unit is provided with a parameter acquiring unit acquiring a value of the specific type of operating parameter relating to the machine, a processing unit using a neural network comprised of an input layer, hidden layers, and an output layer to perform processing, and a storage unit, the value of the specific type of operating parameter relating to the machine is input to the input layer, and a plurality of output values changing in accordance with the value of the specific type of operating parameter relating to the machine are output from the output layer, wherein the range of the value of the specific type of operating parameter relating to the machine is set in advance, the numbers of nodes of the hidden layers of the neural network are set in advance corresponding to the range of value of a specific type of operating parameter relating to the machine, training data found in advance by actual measurement for the value of the specific type of operating parameter relating to the machine in the preset range is stored in the storage part, when the value of the operating parameter of the machine newly acquired by the parameter acquiring part is in the preset range, the training data obtained by actual measurement for the newly acquired value of the specific type of operating parameter relating to the machine is used in the processing unit to learn the weights of the neural network so that the differences between the plurality of output values changing in accordance with the value of the specific type of operating parameter relating to the machine and the training data corresponding to the value of the specific type of operating parameter relating to the machine become smaller, when the value of the specific type of operating parameter relating to the machine newly acquired by the parameter acquiring unit is outside of the preset range, the number of nodes of the hidden layer one layer before the output layer of the neural network is made to increase corresponding to the increase in the number of training data acquired by actual measurement for the newly acquired value of the specific type of operating parameter relating to the machine or the increase in a data density obtained by dividing the number of training data by the value of the difference of the maximum value and minimum value showing the preset range, and the training data obtained by actual measurement for the newly acquired value of the specific type of operating parameter relating to the machine inside of the preset range and outside the preset range and the training data found in advance are used in the processing unit to learn the weights of the neural network so that the difference between the plurality of output values changing in accordance with the value of the specific type of operating parameter relating to the machine and the training data corresponding to the value of the specific type of operating parameter relating to the machine becomes smaller, and a plurality of output values corresponding to the value of the specific type of operating parameter relating to the machine are output by using the neural network with the learned weights.

3. A machine learning system, wherein the system is provided with an electronic control unit, the electronic control unit is provided with a parameter acquiring unit acquiring values of the plurality of types of operating parameters relating to the machine, a processing unit using a neural network comprised of an input layer, hidden layers, and an output layer to perform processing, and a storage unit, values of the plurality of types of operating parameters relating to the machine are input to the input layer, and an output value changing in accordance with the values of the plurality of types of operating parameters relating to the machine is output from the output layer, wherein for each of the plurality of types of operating parameters relating to the machine, the range of the value of the type of operating parameter is set in advance, and the numbers of nodes of the hidden layers of the neural network are set in advance corresponding to the ranges of values of the plurality of types of operating parameters relating to the machine, training data found in advance by actual measurement for the values of the plurality of types of operating parameters, in which training data, the values of the different types of operating parameters being in preset ranges, are stored in the storage unit, when the values of the plurality of types of operating parameters of the machine newly acquired by the parameter acquiring unit are in the preset ranges, the training data obtained by actual measurement for the newly acquired values of the plurality of types of operating parameters relating to the machine are used in the processing unit to learn the weights of the neural network so that the difference between the output value changing in accordance with the values of the plurality of types of operating parameters relating to the machine and the training data corresponding to the values of the plurality of types of operating parameters relating to the machine becomes smaller, when the value of at least one of the types of operating parameters among the plurality of types of operating parameters relating to the machine newly acquired by the parameter acquiring unit is outside of the preset range, the number of nodes of the hidden layer one layer before the output layer of the neural network is made to increase corresponding to the increase in the number of training data obtained by actual measurement for the newly acquired values of the plurality of types of operating parameters relating to the machine or the increase in a data density obtained by dividing the number of training data by the value of the difference of the maximum value and minimum value showing the preset range, and the training data obtained by actual measurement for the newly acquired values of the plurality of types of operating parameters relating to the machine inside the preset ranges and outside the preset ranges and the training data found in advance are used in the processing unit to learn the weights of the neural network so that the difference between the output value changing in accordance with the values of the plurality of types of operating parameters relating to the machine and the training data corresponding to the values of the plurality of types of operating parameters relating to the machine becomes smaller, and an output value corresponding to the values of the plurality of types of operating parameters relating to the machine is output by using the neural network with the learned weights.

4. A machine learning system, wherein the system is provided with an electronic control unit, the electronic control unit is provided with a parameter acquiring unit acquiring values of the plurality of types of operating parameters relating to the machine, a processing unit using a neural network comprised of an input layer, hidden layers, and an output layer to perform processing, and a storage unit, values of the plurality of types of operating parameters relating to the machine are input to the input layer, and a plurality of output values changing in accordance with the values of the plurality of types of operating parameters relating to the machine are output from the output layer, wherein for each of the plurality of types of operating parameters relating to the machine, the range of the value of the type of operating parameter is set in advance, and the numbers of nodes of the hidden layers of the neural network are set in advance corresponding to the ranges of values of the plurality of types of operating parameters relating to the machine, training data found in advance by actual measurement for the values of the plurality of types of operating parameters, in which training data, the values of the different types of operating parameters being in preset ranges, are stored in the storage unit, when the values of the plurality of operating parameters of the machine newly acquired by the parameter acquiring unit respectively are in the preset ranges, the training data obtained by actual measurement for the newly acquired values of the plurality of types of operating parameters relating to the machine are used in the processing unit to learn the weights of the neural network so that the differences between the plurality of output values changing in accordance with the values of the plurality of types of operating parameters relating to the machine and the training data corresponding to the values of the plurality of types of operating parameters relating to the machine become smaller, when the value of at least one of the types of operating parameters among the plurality of types of operating parameters relating to the machine newly acquired by the parameter acquiring unit is outside of the preset range, the number of nodes of the hidden layer one layer before the output layer of the neural network is made to increase corresponding to the increase in the number of training data acquired by actual measurement for the newly acquired values of the plurality of types of operating parameters relating to the machine or the increase in a data density obtained by dividing the number of training data by the value of the difference of the maximum value and minimum value showing the preset range, and the training data obtained by actual measurement of the newly acquired values of the plurality of types of operating parameters relating to the machine inside the preset ranges and outside the preset ranges and the training data found in advance are used in the processing unit to learn the weights of the neural network so that the differences between the plurality of output values changing in accordance with the values of the plurality of types of operating parameters relating to the machine and the training data corresponding to the values of the plurality of types of operating parameters relating to the machine become smaller, and a plurality of output values corresponding to the values of the plurality of types of operating parameters relating to the machine are output by using the neural network with the learned weights.

5. A machine learning system, wherein the system is provided with an electronic control unit, the electronic control unit is provided with a parameter acquiring unit acquiring values of the plurality of types of operating parameters relating to the machine, a processing unit using a neural network comprised of an input layer, hidden layers, and an output layer to perform processing, and a storage unit, the values of the plurality of types of operating parameters relating to the machine are input to the input layer, and an output value changing in accordance with the values of the plurality of types of operating parameters relating to the machine is output from the output layer, wherein for each of the plurality of types of operating parameters relating to the machine, the range of the value of the type of operating parameter is set in advance, preset ranges of the values of the types of the operating parameters are divided into plurality of sections, and a plurality of divided areas defined by combinations of the divided ranges of the values of the types of the operating parameters are set in advance, a neural network is prepared for each divided area, and the numbers of nodes of the hidden layers of the neural networks are set in advance for each divided area, the training data found in advance by actual measurement for the values of the plurality of types of operating parameters is stored in the storage part, when the values of the plurality of types of operating parameters relating to the machine newly acquired by the parameter acquiring unit are in the preset ranges, the training data obtained by actual measurement of the newly acquired values of the plurality of types of operating parameters relating to the machine is used in the processing unit to learn the weights of the neural networks of the divided areas in which the newly acquired values of the plurality of types of operating parameters relating to the machine fall so that the differences between the output values changing in accordance with the values of the plurality of types of operating parameters relating to the machine and the training data corresponding to the values of the plurality of types of operating parameters relating to the machine become smaller, when the values of the plurality of types of operating parameters relating to the machine newly acquired by the parameter acquiring unit are outside the preset ranges, a new area defined by combinations of the preset ranges of the values of the types of operating parameters and in which the value of at least one type of the operating parameter falls is set, and a new neural network is prepared for the new area, training data obtained by actual measurement of the newly acquired values of the plurality of types of operating parameters relating to the machine is used in the processing unit to learn the weights of the neural networks so that the differences between the output values changing in accordance with the values of the plurality of types of operating parameters relating to the machine and the training data corresponding to the values of the plurality of types of operating parameters relating to the machine become smaller, and output values corresponding to the values of operating parameters of the machine are output by using the neural network with the learned weights.

6. The machine learning system 5, wherein
the operating parameters relating to the machine are comprised of two types of operating parameters, and
when the value of one type of operating parameter among the operating parameters relating to the internal combustion engine newly acquired by the parameter acquiring unit is outside the preset range and the value of the other type of operating parameter is inside the preset range, the new area is set outside the preset range for the value of said one type of operating parameter, inside the same range as the divided area in which the value of the other type of operating parameter falls, and adjoining the divided area in which the value of the other type of operating parameter falls.

7. The machine learning system 5, wherein the number of nodes of the hidden layer one layer before the output layer of the new neural network is set based on the mean value of the numbers of nodes of the hidden layers one layer before the output layers of the neural networks of the divided areas other than divided areas where numbers of nodes of the hidden layers one layer before the output layers of the neural networks are not set among the divided areas adjoining the new area.

8. The machine learning system 7, wherein the number of nodes of the hidden layer one layer before the output layer of the neural network of the new area is made to increase in accordance with the increase of the number of values of operating parameters relating to the new area input to the input layer.

* * * * *